(12) United States Patent
Collett et al.

(10) Patent No.: US 12,444,562 B2
(45) Date of Patent: Oct. 14, 2025

(54) SWITCHBOARD AND ASPECTS OF A POWER DISTRIBUTION SYSTEM

(71) Applicant: Basis NZ Limited, Auckland (NZ)

(72) Inventors: Julyan Collett, Auckland (NZ); Daniel Purcell, Auckland (NZ); James Michael Allen, Auckland (NZ); Brendon Hale, Christchurch (NZ)

(73) Assignee: Basis NZ Limited, Auckland (NZ)

( * ) Notice: Subject to any disclaimer, the term of this patent is extended or adjusted under 35 U.S.C. 154(b) by 180 days.

(21) Appl. No.: 18/017,639

(22) PCT Filed: Jul. 26, 2021

(86) PCT No.: PCT/IB2021/056694
§ 371 (c)(1),
(2) Date: Jan. 23, 2023

(87) PCT Pub. No.: WO2022/018704
PCT Pub. Date: Jan. 27, 2022

(65) Prior Publication Data
US 2023/0298843 A1    Sep. 21, 2023

(30) Foreign Application Priority Data
Jul. 24, 2020 (NZ) .................................. 766524

(51) Int. Cl.
*H01H 71/12* (2006.01)
*H01H 71/74* (2006.01)
(Continued)

(52) U.S. Cl.
CPC ...... *H01H 71/125* (2013.01); *H01H 71/7409* (2013.01); *H02B 1/202* (2013.01); *H02B 1/24* (2013.01)

(58) Field of Classification Search
CPC ............. H01H 71/125; H01H 71/7409; H01H 71/128; H01H 2071/006; H01H 71/0271;
(Continued)

(56) References Cited

U.S. PATENT DOCUMENTS 9,831,664 B1 * 11/2017 Sastry ...................... H02H 7/26
2007/0064377 A1 * 3/2007 DeBoer ............. H02J 13/00034
361/637

(Continued)

FOREIGN PATENT DOCUMENTS

| CN | 110931314 A | 3/2020 |
|---|---|---|
| DE | 202009014759 U1 | 2/2010 |
| KR | 101397963 B1 * | 6/2014 |

*Primary Examiner* — Sreeya Sreevatsa
(74) *Attorney, Agent, or Firm* — Kolitch Romano Dascenzo Gates LLC

(57) ABSTRACT

A pre-assembled switchboard has a housing having a plurality of bus bars and a cable entrance for a plurality of sub-circuit cables and a sub-circuit termination block with conductor coupling elements configured for connection to the conductors of a plurality of sub-circuit cables. Circuit protection devices are connected between the bus bars and the sub-circuit termination block, and the conductor coupling elements being grouped by sub-circuit so that the conductors for each sub-circuit cable can be terminated adjacent to each other.

55 Claims, 37 Drawing Sheets

(51) Int. Cl.
  *H02B 1/20*     (2006.01)
  *H02B 1/24*     (2006.01)

(58) Field of Classification Search
  CPC .......... H02B 1/202; H02B 1/24; H02B 1/306;
      H02B 1/565; H02B 1/04; H02B 13/005;
      H02H 1/0061; H02H 3/00; H02H 1/0092;
      Y02E 60/00; Y04S 40/124; Y04S 40/126;
      H02J 13/0004; H02J 13/00002; H02J
      13/00004; H02J 13/00016; H02J
      13/00024; H02J 13/00026; G01R
      19/16571; G01R 19/16576
  USPC ......................................................... 361/42
  See application file for complete search history.

(56) References Cited

U.S. PATENT DOCUMENTS

| | | | |
|---|---|---|---|
| 2010/0232082 A1 | 9/2010 | Seger | |
| 2010/0277846 A1 | 11/2010 | Koshin et al. | |
| 2015/0248987 A1 | 9/2015 | Lu et al. | |
| 2016/0225562 A1 | 8/2016 | Franks et al. | |
| 2017/0256934 A1* | 9/2017 | Kennedy | H02P 1/26 |
| 2019/0081459 A1* | 3/2019 | Ha | H02B 1/20 |
| 2020/0090881 A1* | 3/2020 | Fields | G05F 1/66 |

* cited by examiner

SWITCHBOARD AND ASPECTS OF A POWER DISTRIBUTION SYSTEM

FIELD OF THE INVENTION

The present invention relates to an improved switchboard and aspects of a power distribution system. The invention has particular application to domestic switchboards and to domestic or household power distribution systems.

BACKGROUND TO THE INVENTION

Each modern residential home generally requires some form of electrical switchboard. The switchboard is the core or centralised location that takes a supply of electrical power from a main grid (i.e. a grid provided by an electric utility provider) and distributes electrical power to all sub-circuits throughout an installation or home. The switchboard serves as an enclosure or housing for electrical safety and circuit protection devices, circuit measurement and control devices, and more recently serves as the location where electricity meters are installed and located.

Most of the components in a traditional residential switchboard must be individually selected, assembled, and connected depending on the loading and circuit protection requirements for the house. The process for an electrician to complete a single switchboard installation can take many hours and is often spread over a number of visits. The installation of the components of the switchboard, and the internal wiring and testing between the components of the switchboard, and the connection of the switchboard to the main power supply and electrical sub-circuits is time consuming.

A typical residential switchboard generally has a minimum level of circuit protection as required by relevant electrical installation standards or rules. These may vary from one country to another, but typically include short circuit protection, overload protection and earth leakage protection for each sub-circuit connected to the switchboard. However, many older homes are still without these minimum requirements and may only have in-line fuses installed which may only provide overcurrent protection. Typically, each circuit protection device in a switchboard has a fixed current rating at which a device will trip and prevent electrical power from being provided to the sub-circuit it is protecting. However, these devices are typically manufactured to fixed current ratings, meaning it is unlikely that each sub-circuit connected to the switchboard has sufficient and/or accurate safety protection, and each circuit protection device has inconsistency in its operation under differing fault conditions. This problem can mean that dangerous faults such as undetected series arc faults can occur in the connected sub-circuits, which can result in damaged property, fire risk, and possibly loss of life.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of at least some preferred embodiments of the invention to provide an improved switchboard and/or other aspects of a power distribution system, and/or to at least provide the public with a useful alternative.

In one aspect a pre-assembled switchboard is provided for connection to a plurality of sub-circuit cables, each sub-circuit cable comprising a plurality of insulated conductors, the switchboard comprising:
  a housing having a plurality of bus bars and a cable entrance for a plurality of sub-circuit cables;
  a sub-circuit termination block having a plurality of conductor coupling elements configured for connection to the conductors of a plurality of sub-circuit cables;
  a plurality of circuit protection devices connected between the bus bars and the sub-circuit termination block;
  the conductor coupling elements being grouped by sub-circuit wherein the conductors for each sub-circuit cable can be terminated adjacent to each other.

Preferably at least one circuit protection device is remotely configurable.

Preferably the circuit protection devices each comprise a module which is selectively removable.

Preferably the sub-circuit termination block comprises a plurality of termination blocks.

Preferably each circuit protection device comprises a circuit termination block.

Preferably the termination block for each circuit protection device provides a group of conductor coupling elements for terminating the conductors of the sub-circuit cable.

Preferably the coupling elements are arranged in one or more rows.

Preferably the row of coupling elements terminations is provided at a side of the housing.

Preferably the row of coupling elements terminations is provided at a centre of the housing.

Preferably two cable entrances are provided, two rows of coupling elements and two cable channels are provided.

Preferably a row of coupling elements is provided at each side of the housing.

Preferably two rows of coupling elements are provided centrally of the housing.

Preferably each the modules comprises a wall, and the wall comprises part of the or each cable tray channel.

Preferably the modules are oriented transversely relative to the or each cable tray channel.

Preferably each sub-circuit protection device or module comprises a button or switch operable by a user, and wherein the cable channel is provided between the button or switch and the or each row of sub-circuit coupling elements.

Preferably the sub-circuit coupling elements for each sub-circuit cable comprise a phase coupling element and a neutral coupling element.

Preferably the sub-circuit coupling elements for each sub-circuit cable comprise phase coupling elements, a neutral coupling element, and on earth coupling element.

In another aspect a pre-assembled switchboard or residential power distribution and management system is provided comprising:
  a mains isolation means configured to provide electrical isolation of an external grid power supply;
  one or more sub-circuit protection devices or modules electrically connected to the mains isolation means through a pre-assembled electrical connection; and
  one or more sub-circuit terminations each electrically connected to a corresponding sub-circuit protection module through a pre-assembled electrical connection, and each configured to electrically connect the system to an external sub-circuit.

In another aspect a circuit protection device is provided comprising:
- a first termination for connection to a busbar and a second termination for connection to a sub-circuit;
- a disconnect means configured to electrically isolate the first termination from the second termination upon receipt of a disconnect signal;
- an outer wall defining part of a cable receiving channel;
- wherein the first and second terminations are provided on either side of the cable receiving channel.

Preferably a user operated button or switch is provided operable to actuate the disconnect means and wherein the cable receiving channel is provided between the second termination and the button or switch.

Preferably the cable receiving channel comprises a cable tray.

Preferably the cable receiving channel is provided in the housing and the cable receiving channel is provided between the first termination and second termination.

In another aspect invention broadly relates to a switchboard comprising:
- a housing having a plurality of bus bars and a cable entrance for sub-circuit cables;
- a plurality of circuit protection modules connected to the bus bars, each module including or being connected to a sub-circuit termination configured for connection to a sub-circuit cable;
- the sub-circuit terminations being provided in a row;
- a cable channel extending from the cable entrance and parallel to the row of sub-circuit terminations.

In some embodiments the cable channel comprises a cable tray.

In another aspect a method of self-test is provided wherein a controller may periodically signal a test winding of a fluxgate sensor whilst inhibiting a circuit disconnect function.

In another aspect a system is provided wherein primary current sensor, residual current sensor and line voltage sensor signals are provided to a controller to provide Arc fault detection.

In another aspect, the present invention broadly relates to a pre-configured or pre-wired switchboard or residential power distribution and management system comprising: a grid connection module configured to electrically connect the system to an external grid power supply; a mains isolation module electrically connected to the grid connection module through a pre-configured or pre-wired electrical connection and configured to provide electrical isolation of the external grid power supply; one or more sub-circuit protection modules electrically connected to the mains isolation module through a pre-configured or pre-wired electrical connection; and one or more sub-circuit terminations each electrically connected to a corresponding sub-circuit protection module through a pre-configured or pre-wired electrical connection, and each configured to electrically connect the system to an external sub-circuit.

In an embodiment, any one of the grid connection module, the mains isolation module, and/or the one or more sub-circuit protection modules comprise a circuit protection system as mentioned in respect to a subsequent aspect below of the invention. In such embodiments, any one of the grid connection modules, the mains isolation module, and/or the one or more sub-circuit protection modules may comprise or have any one or more features mentioned in respect of a subsequent aspect of the invention.

In an embodiment, the pre-configured or pre-wired electrical connections between one or more modules comprise one or more of: a phase or active connection, a neutral connection, and/or an earthing or ground connection.

In an embodiment, the pre-configured or pre-wired switchboard or residential power distribution and management system further comprises a separate pre-configured or pre-wired ground connection system which electrically connects the ground conductor of one or more of the external devices to an electrical grounding.

In an embodiment, the one or more sub-circuit protection modules can be configured to electrically connect the pre-configured or pre-wired switchboard or residential power distribution and management system to an external distributed generation supply or source. The distributed generation supply or source can comprise one or more of: a vehicle-to-grid (V2G) source or electric vehicle (EV), a battery source, and/or a solar source comprising one or more solar panels. In such embodiments, each auxiliary power module is operable to facilitate switching of an electrically connected external distributed generation supply or source. Each module can also be configured to draw power from an external distributed generation supply or source for example a solar or battery source, for use in the power distribution system.

In an embodiment, each of the one or more sub-circuit protection modules are operably connected to a centralised sub-circuit controller. In such embodiments, the connection to the centralised sub-circuit controller is provided through a serial communications protocol.

In an embodiment, the centralised sub-circuit controller can be configured to receive as input from the one or more connected sub-circuit connection modules measurement or monitoring data relating to a corresponding connected sub-circuit. In these embodiments, the measurement or monitoring data comprises power consumption data, operation conditions, and/or data analytics.

In an embodiment, each of the one or more sub-circuit terminations comprise a pre-configured sub-circuit connection module as mentioned in respect to a subsequent aspect of the invention. In such embodiments, the one or more sub-circuit terminations may comprise or have any one or more features of the pre-configured sub-circuit connection module as mentioned in respect of a subsequent aspect of the invention.

In an embodiment, each sub-circuit termination comprises a plurality of sub-circuit conductor terminations each configured to electrically connect a conductor of an external sub-circuit. In these embodiments, each sub-circuit conductor termination can comprise an electrical coupling element configured to electrically connect a wire terminal end of a sub-circuit conductor.

In an embodiment, the pre-configured or pre-wired switchboard or residential power distribution and management system further comprises a system controller. The system controller is operably connected to one or more of the modules. The system controller is operably connected to the controllers of each of the modules. In these embodiments, the system controller can further comprise a communications module operable to connect to the controllers and/or communications modules of each of the one or more modules. In some embodiments, the system controller is electrically connected to each of the controllers of the modules through a wired communication link. The wired communications protocol could be for example CAN bus or ethernet.

In some embodiments, the controller of each module is configured to send measurement or monitoring data to the system controller. The measurement or monitoring data can relate to a corresponding module. The measurement or monitoring data can comprise power consumption data, data relating to operating conditions, and/or data analytics. For example, the controller of a module is operable to send as input at least: voltage data and/or current data to the system controller. In these embodiments, the system controller is configured to monitor the voltage and/or current through each module in real-time.

In an embodiment, the system controller is configured to send as input one or more control signals to the or each connected module. The control signals in these embodiments are operable to open and/or close the electrical circuit of the or each module. In some embodiments, the control signals are further operable to control the electrical relay or disconnect device of the module to open or close the corresponding electrical circuit of the or each module.

In an embodiment, the system controller corresponds to the centralised control system or server as mentioned in respect to a subsequent aspect of the invention. In such embodiments, the system controller may comprise or have any one or more features mentioned in respect of to the centralised control system or server of a subsequent aspect of the invention.

In some embodiments, the system controller is configured to detect and/or learn specific current signatures of the electrical circuit and/or loads configured to be connected to each module, based on one or more of the power consumption data, data relating to operating conditions, and/or data analytics provided by the controller of the one or more modules. In some embodiments, the system controller is configured to and provide load specific consumption data analysis based on the power consumption data, data relating to operating conditions, and/or data analytics provided by the controller of each module.

In some embodiments, the system controller is configured to use one or more machine learning algorithms to detect specific load signatures of the electrical circuit and/or loads configured to be connected to the or each module, based on the power consumption data, data relating to operating conditions, and/or data analytics provided by the controller of the or each modules. In an embodiment, the system controller is configured to use one or more machine learning algorithms to track performance and understand fault conditions relating to each electrical circuit and/or loads configured to be connected to the modules.

In an embodiment, the system controller is further configured to provide data transfer and/or software or firmware updates to a connected module. In some embodiments, the system controller is further configured to provide one or more of: remote monitoring, power consumption monitoring and/or state monitoring of the electrical circuit of one or more connected modules.

The system controller in combination with the grid connection module are configured to provide a power meter. In an embodiment, the power meter is configured to provide net metering facilities. The net metering facilities can be to IEC standard 62053-22. The net metering facilities can comprise any one of: mains power quality measurement, bi-directional current sensing, and/or on/off supply control.

In some embodiments, the system controller is configured to determine or calculate the net power consumption of the switchboard or residential power distribution and management system based on the data provided by the or each module.

In an embodiment, the system controller is further configured to connect to an LCD screen. The LCD screen can be an LCD touch screen, configured to receive inputs from a user and/or serve as a local human-machine interface (HMI), and further configured to display data or information relating to the switchboard or residential power distribution and management system. The LCD screen can be configured to display real-time monitoring or consumption data of the switchboard or residential power distribution and management system to a user. The LCD touch screen can be further configured to allow control inputs to be received from a user, relating to control of one or more of the modules connected to the system controller.

In an embodiment, the system controller has an embedded communications module. In such embodiments, the embedded communications module is configured to allow communication and two-way data transfer with an external server or system. The communications module is configured to allow wired or wireless communication and two-way data transfer with an external server or system using any one or more of the following communications modules: Cellular (3G, 4G, 5G), WIFI, Ethernet, and/or fibre optic. In these embodiments, the communications module is configured to allow communication and two-way data transfer with an external server or system to transfer real-time retail billing data.

In some embodiment, the external server or system comprises a database. The database is configured to store data received from the system controller. The data received from the system controller relates to consumption and/or usage data of one or more of the modules. In some embodiments, the external server or system is cloud-based. In some embodiments, the external server or system is further configured to provide analytics, demand or consumption analysis of the received consumption and/or usage data of the one or more modules.

In some embodiments, the external server or system is configured to send one or more control signals to the system controller. In such embodiments, the control signals are configured to control one or more of the modules of the system. The control signals are configured to switch one or more relays or disconnect devices of the one or more modules on or off.

In an embodiment, the external grid power comprises a supply of electrical energy. The supply of electrical energy can be supplied by one or more external grid suppliers. In some embodiments, the external gird suppliers have access to the external server or system. In such embodiments, the one or more electrical grid suppliers can receive data relating to the consumption and/or usage data of the one or more modules, and/or send one or more control signals to switch on or off any one or more of the relays or disconnect devices of the one or more modules from the external server or system. In such embodiments, the electrical grid supplier can send one or more control signals to switch off heavy loads during peak demand of the external grid power supply.

In an embodiment, the switchboard or power management and distribution system, when connected to an external grid power source and one or more sub-circuits, provides power distribution and management from an external grid power source to a household comprising one or more sub-circuits.

In an embodiment, the system controller and/or the external server or system is configured to provide economical and/or energy efficient power distribution and management based on received inputs from the modules and the external server or system. In an embodiment, the system controller and/or the external server or system is configured to provide management of the supply of energy to the one or more sub-circuits such that peak load of an electrical grid supplier is reduced by selectively supplying energy to sub-circuits that have higher load consumption during low electrical grid demand times.

In an embodiment, the system controller and/or the external server or system is configured to provide individual switching on or off of individual sub-circuits based on load consumption data from the one or more modules and/or demand or grid supply prices for electricity as provided by a third party. The third party can be an electricity retailer or distributor.

In an embodiment, the system controller and/or the external server or system is configured to receive data relating to real-time electricity pricing associated with the supply of electrical energy supplied by the external grid supplier. In such embodiments, the system controller and/or the external server or system is configured to analyse or compare the real-time electricity pricing data and the real-time load consumption or usage of the system and/or one or more modules. The system controller and/or the external server or system is further configured to calculate the most economical and/or energy efficient power distribution and management for the system based on the analysis or comparison of the real-time electricity pricing data and the real-time load consumption of the system. In some embodiments, the system controller and/or the external server or system is configured to manage the supply of electrical energy to the sub-circuits such that the household electricity bill is optimally reduced based on the real-time analysis of the electricity pricing data and the load consumption of the one or more modules and/or the system.

In some embodiments, the system controller and/or the external server or system is configured to optimally shift between available alternative power sources or supplies to reduce the household electricity bill and/or reduce demand on the external grid source. In such embodiments, the system controller and/or the external server or system are configured to control one or more of the modules of the switchboard or power distribution and management system based on the analysis of the real-time electricity pricing data and the real-time load consumption data to ensure that power used by the household is kept at the lowest optimal price or rate. For example, this can comprise any one of: when power is at a cheaper comparative rate, charging one or more battery or EV based auxiliary power sources, and/or when power is at a more expensive comparative rate, using one or more auxiliary power supplies to provide the source of power to the system, and/or when power is at a more expensive comparative rate, diverting power from the one or more auxiliary power sources to the external grid power source to sell power back to the external grid supplier.

In an embodiment, the system controller and/or the external server or system is configured to provide management of the supply of power to the one or more sub-circuits such that peak load of the external electrical grid supplier is reduced, through selectively supplying energy to sub-circuits that have higher load consumption during low electrical grid demand times.

In an embodiment, or the system controller and/or external server system is configured to operably connect to one or more internet-of-things (IoT) enabled devices. In such embodiments, the system controller and/or external server system is configured to operably connect to the one or more IoT enabled devices using the or each communications module. For example, the or each communications module is configured to operably connect to the one or more IoT enabled devices using thorough one or more of the following communications protocols: Zigbee, IEEE 802.15.4, bluetooth low energy (BLE), long range radio (LoRa), and/or Wi-Fi. In some embodiments, the system controller and/or external server system is configured to receive data relating to one or more connected IoT enabled devices, and in some embodiments the controller is configured to receive data relating to power consumption or usage of the connected IoT enabled device.

In some embodiments, the system controller and/or external server system is configured to store received data from a connected IoT enabled device and establish a portfolio or directory of connected and/or previously connected IoT enabled devices, based on the data received from the one or more IoT enabled devices. In some embodiments, the system controller and/or external server system is further configured to send one or more command signals to one or more connected IoT enabled devices. In such embodiments, the system controller and/or external server system is further configured to send one or more command signals to switch on or off one or more connected IoT enabled devices.

In an embodiment, the system controller and/or external server system is operable to determine the load signature of a connected IOT device. The system controller and/or external server system can be further configured to match or pair the load signature of a connected IOT device with the load signature of one of the sub-circuits, as measured by one of the sub-circuit protection modules. In some embodiments, the system controller and/or external server system is operable to utilise the load signature of a connected IOT device as input in a machine learning algorithm. In such embodiments, the machine learning algorithm is capable of determining one or more characteristics of a sub-circuit connected to a sub-circuit protection module.

In an embodiment, the pre-configured or pre-wired switchboard or residential power distribution and management system is configured to be housed within a housing or enclosure. In such embodiments, the housing or enclosure is a typical or existing residential switchboard housing or enclosure.

In an embodiment, the pre-configured or pre-wired electrical connections which electrically connect one or more of the modules are pre-configured or pre-wired bus bars. In some embodiments, the bus bars are copper bus bars.

In an embodiment, the modules are electrically connected to one or more pre-configured or pre-wired connection points. In some embodiments, the one or more pre-configured or pre-wired connection points are electrically connected to one or more of the pre-configured or pre-wired electrical connections between the modules.

In an embodiment, the pre-configured or pre-wired electrical connections which electrically connect the modules are fixed in location. In some embodiments, the pre-configured or pre-wired electrical connections which electrically connect the modules are configured to define where each module will sit within the pre-configured or pre-wired switchboard or residential power distribution and management system.

In another aspect the invention broadly relates to a method of installing the prefabricated switchboard as mentioned in respect to a preceding aspect of the invention, the method comprising: electrically connecting an external grid power supply to the grid connection module; and electrically connecting the wire terminal ends of one or more sub-circuit conductors to a corresponding sub-circuit termination. The prefabricated switchboard installed as a part of the method of the second aspect may comprise or have any one or more features mentioned in respect of a preceding aspect of the invention.

In an embodiment, the method further comprises electrically connecting one or more auxiliary power supplies or external distributed generation supplies or sources to one of the auxiliary power modules.

In another aspect the present invention broadly relates to a circuit protection system for use in a switchboard or power distribution and management system, comprising: one or more electrical input connectors configured to connect to at least one source of electrical power; one or more electrical output connectors configured to provide electrical power to an electrical output; wherein one or more electrical circuits are provided between the one or more electrical input connectors and the one or more electrical output connectors; a load monitoring device operably connected to the one or more electrical circuits, and operable to determine one or more characteristics or attributes of the one or more electrical circuits; an electrical relay or disconnect device electrically connected between the electrical input connectors and the electrical output connectors, and operable to open and close the one or more electrical circuits based on a control signal; and a controller operably connected to the electrical relay device and the load monitoring device, the controller configured to: receive as input one or more characteristics or attributes of the one or more electrical circuits from the load monitoring device, determine if one or more fault conditions are present in the one or more electrical circuits based on analysis of the one or more characteristics or attributes of the one or more electrical circuits, and send one or more control signals to the electrical relay device to open or close the one or more electrical circuits if a fault condition is detected based on the analysis of the one or more characteristics or attributes of the one or more electrical circuits.

In an embodiment, the electrical relay device is configured to receive a control signal from the controller. The control signal is operable to trigger the electrical relay device to open or close the one or more electrical circuits.

In an embodiment, the electrical relay device comprises one or more electrical relays, each corresponding to one of the electrical circuits, wherein each electrical relay device is operable to open and close its corresponding electrical circuit based on a control signal. In some embodiments, the or each electrical relay device is a single-pole relay and/or a bi-stable or latching relay.

In an embodiment, the load monitoring device is operably connected in series in the one or more electrical circuits between the electrical input connectors and the electrical output connectors. The load monitoring device may be operably connected in the electrical circuits before the electrical relay device. In alternative embodiments, the load monitoring device is operably connected in parallel with the one or more electrical circuits between the electrical input connectors and the electrical output connectors.

In an embodiment, the one or more characteristics or attributes of the one or more electrical circuits comprise the voltage and/or current through the one or more electrical circuits. These one or more characteristics or attributes of the one or more electrical circuits can further comprise a real time voltage and/or current reading. These one or more characteristics or attributes of the one or more electrical circuits can further comprise the waveform or wave pattern of the voltage and/or current through the one or more electrical circuits.

In an embodiment, the load monitoring device comprises a current sensor and/or a voltage sensor. In some embodiments, the current sensor is a current transformer. In such embodiments, the current transformer is configured to be a high and/or low frequency current transformer. In some embodiments, the current sensor is a Hall effect sensor. In some embodiments an RCD is provided. The RCD may comprise a fluxgate sensor. The fluxgate sensor may include a test winding. Testing of the RCD may comprise energising the test winding. The test winding may be energised by a controller in response to a user activating a device such as a press button or switch.

In an embodiment, the controller is configured to receive as input voltage and/or current readings of the one or more electrical circuits from the load monitoring device. In such embodiments, the controller is configured to receive as input a waveform or wave pattern of the voltage and/or current through the one or more electrical circuits from the load monitoring device.

In one embodiment, the controller is configured to analyse the one or more characteristics or attributes of the one or more electrical circuits for example the voltage and/or current, and determine if the characteristics or attributes indicate one or more fault conditions in the electrical circuit.

In an embodiment, the controller is configured to determine if one or more fault conditions are present in the one or more electrical circuits, the one or more fault conditions comprising: a short circuit, circuit overload, circuit overvoltage, circuit overcurrent, AC and/or DC earth leakage, and/or dangerous arc fault detection. The one or more fault conditions can have specific thresholds or trip curves, wherein if the one or more characteristics or attributes of the one or more electrical circuits exceed the threshold or trip curve, the controller indicates a fault condition.

In an embodiment, the controller is further configured to adjust the specific thresholds or trip curves for each of the one or more fault conditions. The specific thresholds or trip curves for each of the one or more fault conditions can be adjusted based on the real time load requirements of the electrical circuit.

In an embodiment, the controller is configured to send one or more control signals to the electrical relay device to open or close the one or more electrical circuits if a fault condition is detected based on the analysis of the one or more characteristics or attributes of the one or more electrical circuits.

In an embodiment, the response time of the controller in determining a fault condition and sending a control signal to the electrical relay device is in the order of microseconds or nanoseconds. The response time of the controller in responding to a determining fault condition can enable dangerous arc faults to be detected and eliminated in the one or more electrical circuits.

In an embodiment, the controller is further operably connected to a centralised control system or server. This connection can be provided through a serial communications protocol. In an embodiment, the centralised control system or server is configured to connect to one or more different circuit protection systems.

In an embodiment, the controller is configured to send measurement or monitoring data to the centralised control system or server. The measurement or monitoring data can comprise power consumption data, data relating to operating conditions, and/or data analytics.

In an embodiment, the controller is further configured to receive external control commands from the centralised control system or server. In an embodiment, the external control commands are operable to control or trigger the electrical relay device to open or close the corresponding electrical circuit.

In an embodiment, the centralised control system or server is configured to detect and learn specific current signatures of the electrical circuit and/or loads configured to be connected to the electrical output connector, based on the power consumption data, data relating to operating conditions, and/or data analytics provided by the controller. In one embodiment, the centralised control system or server is configured to and provide load specific consumption data analysis or feedback based on the power consumption data, data relating to operating conditions, and/or data analytics provided by the controller.

In an embodiment, the centralised control system or server is configured to use one or more machine learning algorithms to detect specific load signatures of the electrical circuit and/or loads configured to be connected to the electrical output connector, based on the power consumption data, data relating to operating conditions, and/or data analytics provided by the controller. In one embodiment, the centralised control system or server is configured to use one or more machine learning algorithms to track performance and understand fault conditions relating to each electrical circuit and/or loads configured to be connected to the electrical output connector.

In an embodiment, the one or more electrical input connectors are configured to connect to a active or phase conductor line and/or a neutral conductor line. In some embodiments, a first electrical input connector is configured to connect to a active or phase conductor, and a second electrical input connector is configured to connect to a neutral conductor.

In an embodiment, the one or more electrical output connectors are configured to connect to a active or phase conductor line and/or a neutral conductor line. In some embodiments, a first electrical output connector is configured to connect to a active or phase conductor, and a second electrical output connector is configured to connect to a neutral conductor.

In an embodiment, a first electrical circuit is provided between the first electrical input connector and the first electrical output connector, the first electrical circuit comprising a active or phase circuit, and wherein a second electrical circuit is provided between the second electrical input connector and the second electrical output connector, the second electrical circuit comprising a neutral circuit.

In an embodiment, the electrical input connector and the electrical output connector are configured to match one or more prefabricated connection points to enable easy installation of the circuit protection system within the switchboard or power distribution and management system.

In an embodiment, the circuit protection system further comprises a status indicator. The status indicator may comprise a physical indicator which is mechanically coupled to movable contacts of a disconnect device such as a relay. The status indicator can be in the form of one or more light emitting diodes (LEDs). In some embodiments, the LEDs are operably connected to the controller. In these embodiments, the LEDs are operable to indicate one or more fault conditions with one or more of the circuits provided in the circuit protection system, as determined by the controller.

In another aspect the present invention broadly relates to a sub-circuit connection system comprising: a sub-circuit connection block comprising a plurality of spaced connection layers, wherein each of the plurality of connection layers is configured for connecting one or more related sub-circuit conductors of one or more external sub-circuits; and one or more pre-configured sub-circuit connection modules housed within the sub-circuit connection block, each sub-circuit connection module comprising: a plurality of sub-circuit conductor terminations, each configured to electrically connect a conductor wire of an external sub-circuit, each sub-circuit conductor termination corresponding to one of the plurality of connection layers of the sub-circuit connection block, and comprising an electrical coupling element configured to electrically connect a wire terminal end of a sub-circuit conductor; and at least one internal electrical connector configured to electrically connect a sub-circuit conductor to a power distribution bus and/or a ground connection.

In an embodiment, a sub-circuit is configured to be electrically coupled to a pre-configured sub-circuit connection module by way of a three-core cable. In such embodiments, each core of the three-core cable is configured to provide a conductor wire which corresponds to a sub-circuit conductor termination. In an embodiment, each of the one or more sub-circuit conductor terminations are configured to be connected to a conductor wire or core of the three-core cable. In some embodiments, the conductor wires or cores of the three-core cable correspond to any one of: an active or phase conductor, a neutral conductor, and an earthing or ground conductor.

In an embodiment, each pre-configured sub-circuit connection module comprises a first sub-circuit conductor termination corresponding to a first layer of the sub-circuit connection block, a second sub-circuit conductor termination corresponding to a second layer of the sub-circuit connection block, and a third sub-circuit conductor termination corresponding to a third layer of the sub-circuit connection block.

In an embodiment, each pre-configured sub-circuit connection module comprises a first sub-circuit conductor termination comprising an electrical coupling element configured to electrically connect an earthing or ground conductor wire terminal end of an external sub-circuit, a second sub-circuit termination comprising an electrical coupling element configured to electrically connect a neutral conductor wire terminal end of an external sub-circuit, and a third sub-circuit conductor termination comprising an electrical coupling element configured to electrically connect a phase or active conductor wire terminal end of an external sub-circuit.

In an embodiment, each pre-configured sub-circuit connection module comprises a first internal electrical termination comprising an electrical coupling element configured to electrically connect an earthing or ground conductor wire terminal end of an external sub-circuit to an earthing or ground connection, a second internal electrical termination comprising an electrical coupling element configured to electrically connect a neutral conductor wire terminal end of an external sub-circuit to a power distribution bus, and a third internal electrical connector comprising an electrical coupling element configured to electrically connect a phase or active conductor wire terminal end of an external sub-circuit to a power distribution bus.

In an embodiment, the second internal electrical termination comprising an electrical coupling element is configured to electrically connect a neutral conductor wire terminal end of an external sub-circuit to a neutral connection of a power distribution bus.

In an embodiment, the third internal electrical termination comprising an electrical coupling element is configured to electrically connect a phase or active conductor wire terminal end of an external sub-circuit to a phase or active connection of a power distribution bus.

In such embodiments, the power distribution bus is configured to electrically connect an external sub-circuit to a circuit protection module and/or a power distribution system.

In further embodiments, the power distribution bus is configured to electrically connect an external sub-circuit(s) to a circuit protection system as mentioned in respect to a preceding aspect of the invention. The circuit protection system as mentioned in respect to a preceding aspect of the invention may further comprise or have any one or more features mentioned in respect of a preceding aspect of the invention.

In an embodiment, each pre-configured sub-circuit connection module is configured to be individually electrically isolated.

In an embodiment, the housing comprises a proximal end and a distal end. In one embodiment, each of the spaced connection layers are stepped vertically downwards from the distal end towards the proximal end. In an embodiment, the plurality of the sub-circuit conductor terminations are spaced transverse along the width of the housing.

In an embodiment, there are three spaced connection layers, a first providing for a row of one or more active conductors, a second providing for a row of one or more neutral conductors, and a third providing for one or more earth conductors.

In an embodiment, there are one or more standardised connection identifiers provided on the housing, each corresponding to a sub-circuit connection module. In one embodiment, the one or more standardised connection identifiers each have an associated colour or other visual identifier. In an embodiment, the one or more standardised connection identifiers are configured to convey information about the sub-circuit that is operable to be electrically connected. In an embodiment, the one or more standardised connection identifiers correspond to the sub-circuit legend of the switchboard. In an embodiment, the one or more standardised connection identifiers enable ease of installation of a sub-circuit to a switchboard.

In an embodiment, the housing is formed from a precast plastic mould. In an embodiment, the housing is operable to be opened and closed, allowing access to the one or more pre-configured sub-circuit connection modules.

In an embodiment, the sub-circuit connection system is configured to form a component of a residential switchboard or power distribution and management system. In an embodiment, the sub-circuit connection system is further configured to be housed in a power distribution unit cabinet or a switchboard enclosure and/or cabinet.

In an embodiment, the sub-circuit connection system is configured to allow the wire terminal ends from a sub-circuit to be easily installed or wired by an electrician to a residential switchboard or power distribution and management system. In an embodiment, the spaced connection layers of the housing provide ease of installation of one or more sub-circuits.

In another aspect the invention broadly relates to a of method of connecting one or more external sub-circuits to the sub-circuit connection system as mentioned in respect to a preceding aspect of the invention, wherein the method comprises: connecting the wire terminal end of one or more sub-circuit conductors to each of the plurality of sub-circuit conductor terminations using the electrical coupling element. The one or more external sub-circuits installed as a part of the method of the fifth aspect may comprise or have any one or more features mentioned in respect of the one or more external sub-circuits of a preceding aspect of the invention.

In another aspect the invention broadly relates to a method of installing a sub-circuit connection system as mentioned in respect to a preceding aspect of the invention in a residential switchboard or power management system comprising the steps of: connecting the wire terminal end of one or more sub-circuit conductors to each of the plurality of sub-circuit conductor terminations using the electrical coupling element; and connecting each sub-circuit input termination to a power distribution bus and/or a ground connection.

The sub-circuit connection system installed as a part of the method of the sixth aspect may comprise or have any one or more features mentioned in respect of the sub-circuit connection system of a preceding aspect of the invention.

In another aspect the present invention broadly relates to a pre-configured or pre-wired switchboard or residential power distribution and management system comprising: a sub-circuit connection system as mentioned in respect to a preceding aspect of the invention; a grid connection module configured to electrically connect the system to an external grid power supply; a mains isolation module electrically connected to the grid connection module through a pre-configured or pre-wired electrical connection and configured to provide electrical isolation of the external grid power supply, and each configured to electrically connect the system to an external or auxiliary power supply or source; one or more sub-circuit protection modules electrically connected to the mains isolation module and the one or more auxiliary power modules through a pre-configured or pre-wired electrical connection; and one or more sub-circuit protection modules electrically connected to the mains isolation module through a pre-configured electrical connection, each sub-circuit protection module electrically connected to a sub-circuit connection module of the sub-circuit connection system through a pre-configured electrical connection.

The pre-configured or pre-wired switchboard or residential power distribution and management system as mentioned in respect to a preceding aspect of the invention may comprise or have any one or more features mentioned in respect of the pre-configured or pre-wired switchboard or residential power distribution and management system of a preceding aspect of the invention.

The grid connection module, mains isolation module, one or more auxiliary power modules, one or more sub-circuit connection modules, and/or one or more sub-circuit protections modules as mentioned in respect to a preceding aspect of the invention may each comprise or have any one or more features mentioned in respect of the circuit protection system of a preceding aspect of the invention.

The first to seventh aspects of the invention may comprise or have any one or more features mentioned in respect of the other aspects of the invention, as will be appreciated.

Definitions or Terms or Phrases

The term 'switchboard' as used in this specification and indicative claims, unless the context suggests otherwise, should be taken to include a device or system that directs or distributes electricity or electrical power from one or more sources of supply to one or more several smaller regions of usage or sub-circuits. The term 'switchboard', can be taken to further include a device or system which is able to manage, monitor and/or control the distributed electricity or electrical power from the one or more sources of supply to the one or more several smaller regions of usage or sub-circuits. This includes switchboards and distribution boards which are used in both residential and/or commercial applications.

The phrase or term 'sub-circuit' as used in this specification and indicative claims, unless the context suggests otherwise, should be taken to include an electrical circuit or one or more loads and/or devices electrically connected to a switchboard and intended to supply or receive electrical energy to one or more current-using apparatuses or devices.

The terms 'ground' or 'grounding' as used in this specification and indicative claims, unless the context suggests otherwise, should be taken to include a reference point in an electrical circuit from which voltages are measured, a common return path for electrical current, or a direct physical connection to the earth.

The terms 'pre-assembled', 'pre-configured' and 'pre-wired' are used interchangeably in this specification and indicative claims, and, unless the context suggests otherwise, should be taken to include a system, device or apparatus that has one or more components or modules assembled, configured or fabricated before its intended use, more specifically in the case of an electrical system, the components or modules may be wired or otherwise electrically connected before the electrical system's intended use.

The term 'comprising' as used in this specification and indicative claims "consisting at least in part of". When interpreting each statement in this specification and indicative independent claims that includes the term 'comprising', features other than that or those prefaced by the term may also be present. Related terms such as 'comprise' and 'comprises' are to be interpreted in the same manner.

The phrase 'computer-readable medium' should be taken to include a single medium or multiple media. Examples of multiple media include a centralised or distributed database and/or associated caches. These multiple media store the one or more sets of computer executable instructions. The phrase 'computer readable medium' should also be taken to include any medium that is capable of storing, encoding or carrying a set of instructions for execution by a processor of a computing device and that cause the processor to perform any one or more of the methods described herein. The computer-readable medium is also capable of storing, encoding or carrying data structures used by or associated with these sets of instructions. The phrase 'computer-readable medium' includes solid-state memories, optical media and magnetic media.

Number Ranges

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

In the following description, specific details are given to provide a thorough understanding of the embodiments. However, it will be understood by one of ordinary skill in the art that the embodiments may be practiced without these specific details. For example, modules, including those in the form of software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet, smart television, microprocessor, or mobile device. The term "mobile device" includes, but is not limited to, a wireless device, a mobile phone, a smart phone, a mobile communication device, a user communication device, personal digital assistant, mobile handheld computer, a laptop computer, wearable electronic devices such as smart watches and head-mounted devices, an electronic book reader and reading devices capable of reading electronic contents and/or other types of mobile devices typically carried by individuals and/or having some form of communication capabilities (e.g., wireless, infrared, short-range radio, cellular etc.).

1. Pre-Assembled or Pre-Configured or Pre-Wired Switchboard

The invention generally relates to a pre-assembled or pre-configured or pre-wired switchboard or residential power distribution and management system, and aspects of this.

Figure 1:
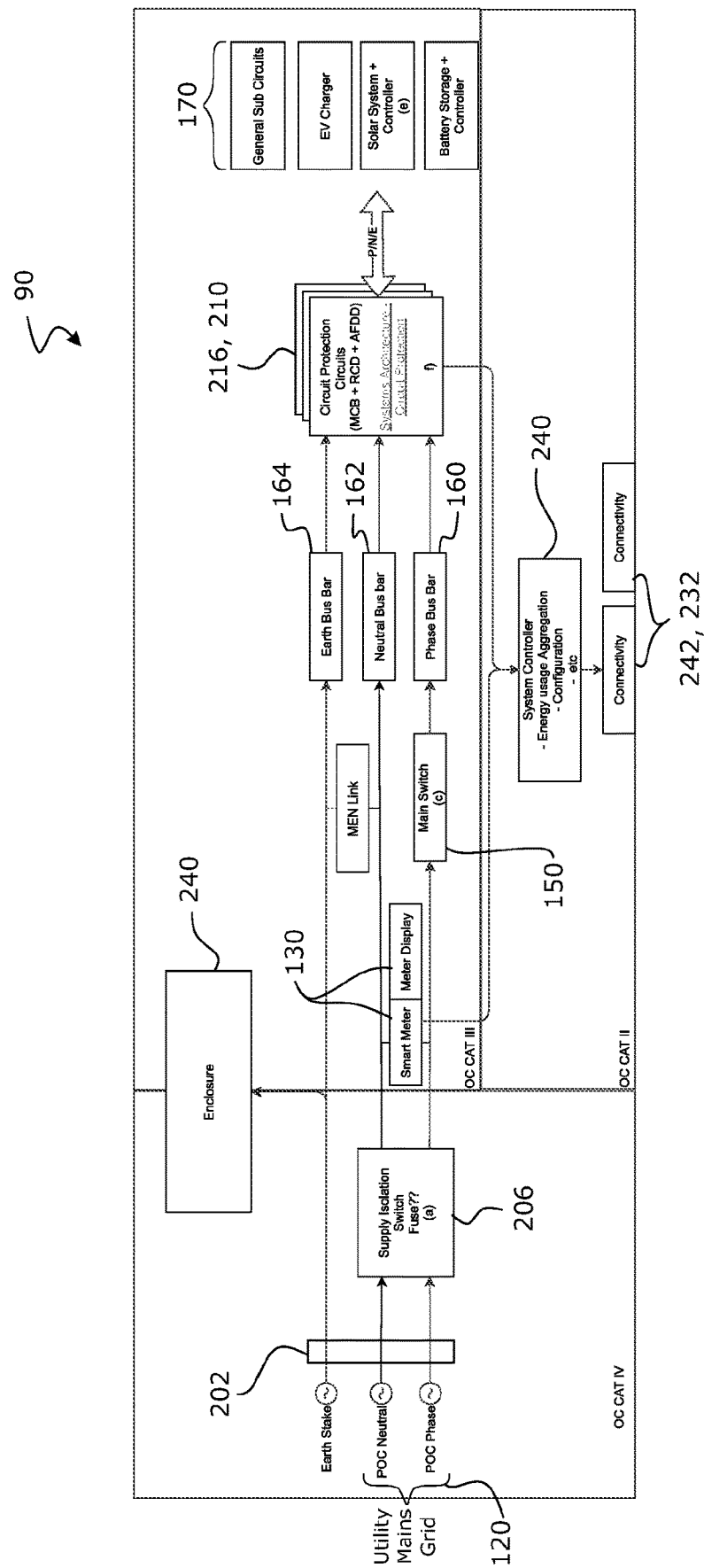
FIG. 1 is high level diagrammatic overview of a systems architecture for a switchboard according to an embodiment.

Referring to FIG. 1, a high-level diagrammatic overview of a systems architecture 100 for a switchboard according to an embodiment is shown.

A grid connection module 202 connects the switchboard to the utility grid 120, and this is followed by a mains isolation module 206. The switchboard enclosure or housing 240 is connected to earth, and a main switch 150 is provided in the active or phase line between the mains isolation module 206 and the phase bus bar 160. A Multiple Earth Neutral link 140 is provided between the neutral and earth busbars. The protection modules 216 and 210 interconnect the bus bars with the load (and optional supply or generation) circuits 170 as will be described further below.

A meter system, such as smart meter 130 and optional display is also provided, along with a system control module 240 which has associated connectivity or communications modules 242 and 232 as will be described further below.

Figure 2:
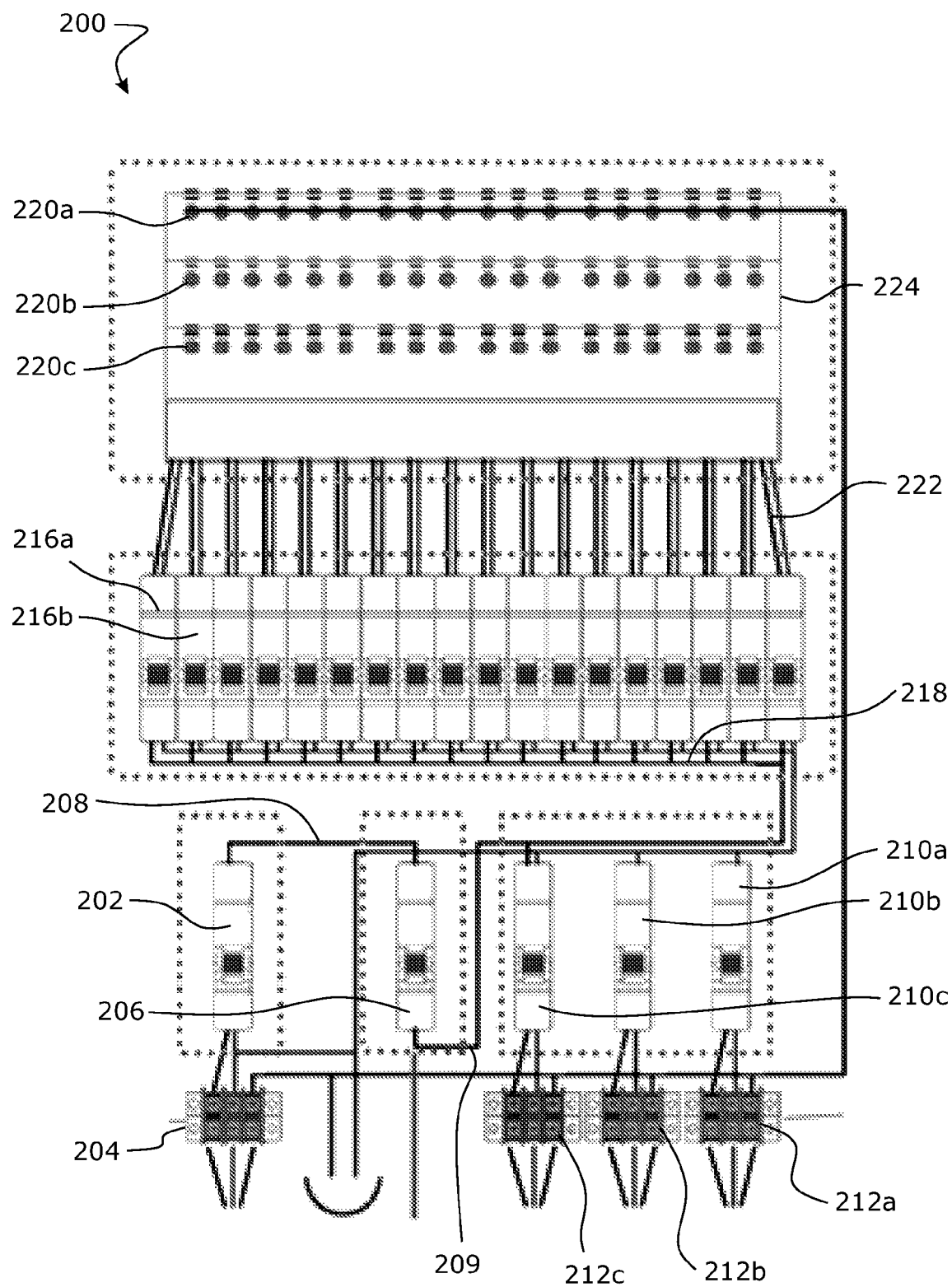
FIG. 2 is a schematic overview of pre-configured or pre-wired switchboard or residential power distribution and management system in accordance with an embodiment.

With reference to FIG. 2, an example of a physical pre-configured, pre-fabricated or pre-wired switchboard or residential power distribution and management system 200 according to an embodiment is shown.

As shown in FIG. 2, the pre-wired switchboard 200 comprises at least a grid connection module 202 configured to electrically connect the system 200 to an external grid power supply 204; a mains isolation module 206 electrically connected to the grid connection module 202 through a pre-configured or pre-wired electrical connection 208 and configured to provide electrical isolation of the external grid power supply 204; one or more auxiliary power modules 210a, 210b, 210c each electrically connected to the mains isolation module 206 through a pre-configured or pre-wired electrical connection 209, and each configured to electrically connect the system to a corresponding external or auxiliary power supply or source 212a, 212b, 212c; one or more sub-circuit protection modules 216a, 216b electrically connected to the mains isolation module 206 and the one or more auxiliary power modules 210a, 210b, 210c through a pre-configured or pre-wired electrical connection 218; and one or more sub-circuit terminations 220 each electrically connected to a corresponding sub-circuit protection module 216a, 216b through a pre-configured or pre-wired electrical connection 222, and each configured to electrically connect the system to an external sub-circuit. It should be noted that the auxiliary power modules can in some embodiments be omitted, as will be described further below. The invention includes sub-circuit protection modules which are bidirectional in nature, that is to say the sub-circuit protection modules may allow current to be supplied from an external source of generation to which the sub-circuit is connected, for example a solar panel or a wind generator or an EV battery for example, so that power may be returned to the grid.

Moreover, the invention includes a switchboard which can be operated in an islanded mode to thereby disconnect the switchboard from the grid so that the local sources of generation to which one or more sub-circuits are connected may be used to supply the islanded system. The islanded mode can be invoked by operating the mains isolation module remotely, or manually in some embodiments, to disconnect the switchboard from the grid. This may occur, for example, if there is a grid fault.

Any one or more of the modules, namely the grid connection module, the mains isolation module, the one or more auxiliary power modules, and/or the one or more sub-circuit protection modules comprise a circuit protection system or module 100 as mentioned in section 2 below. In such embodiments, any one of the grid connection modules, the mains isolation module, the one or more auxiliary power modules, and/or the one or more sub-circuit protection modules may comprise or have any one or more features mentioned in respect of the circuit protection system or module 100 of the invention.

In an embodiment, the pre-configured or pre-wired electrical connections between any one or more of the modules comprise one or more of: a phase or active connection, a neutral connection, and/or an earthing or ground connection. The pre-configured or pre-wired electrical connections between any one or more of the modules comprise one or more pre-wired busbars, for example a pre-wired busbar comprising a phase and/or a neutral connection. The pre-configured or pre-wired switchboard or residential power distribution and management system 200 may additionally comprise a pre-configured or pre-wired ground connection system which electrically connects the ground conductor of one or more sub-circuits to an electrical grounding.

In an embodiment, the one or more sub-circuit terminations 220 each comprise one or more sub-circuit conductor terminations 220a, 200b, 200c each configured to electrically connect a conductor wire of an external sub-circuit.

In an example embodiment, the grid connection module 202 is configured to electrically connect the system 200 to the phase and neutral connections of one or more external grid power supplies 204, which is operable to be connected to the system 200. The mains isolation module 206 is configured to electrically connect to the grid connection module 202 through a pre-wired busbar 208 and configured to provide electrical isolation of the external grid power supply 204. The one or more auxiliary power modules 210a, 210b, 210c are configured to each electrically connect to the mains isolation module 206 through a pre-wired busbar 209, and each configured to electrically connect the system to a corresponding external or auxiliary power supply or source 212a, 212b, 212c, each which is operable to be connected to the system 200. The one or more sub-circuit protection modules 216a, 216b are configured to be electrically connected to the mains isolation module 206 and the one or more auxiliary power modules 210a, 210b, 210c through a pre-wired busbar 218. Finally, the one or more sub-circuit terminations 220 are each configured to be electrically connected to a corresponding sub-circuit protection module 216a, 216b through a pre-wired busbar 222, and each configured to electrically connect the system to an external sub-circuit, which is operable to be connected to the system 200.

In this embodiment, the modules of the system are connected through pre-wired busbars, and the only external connections that need to be made by an electrician installing the switchboard is to connect the one or more external grid power supplies 204, optionally the one or more external or auxiliary power supplies 212a, 212b, 212c if required, and one or more external sub-circuits.

In these embodiments, the pre-wired switchboard typically eliminates most of the internal wiring, leaving an electrician to make the grid supply and sub-circuit connections for installation. Not only does this reduce the time lost during the assembly and wiring when compared to a typical switchboard in the prior art, but it also removes any potential human error faults that occur when wiring such devices. It will be understood that in some embodiments not all of the modules described herein may be required in any given installation. For example, under the regulations in various states, territories or countries, modules such as mains connection module or mains isolation module may be replaced by other functional devices.

1.1 Modules

The one or more auxiliary power modules 210a, 210b, 210c are each configured to electrically connect the pre-configured or pre-wired switchboard or residential power distribution and management system to an external distributed generation supply or source. The distributed generation supply or source can comprise one or more of: a vehicle-to-grid (V2G) source or electric vehicle (EV), a battery source, and/or a solar source comprising one or more solar panels. In such embodiments, each auxiliary power module is operable to facilitate switching of an electrically connected external distributed generation supply or source. Each auxiliary power module can also be configured to draw power from an external distributed generation supply or source for example a solar or battery source, for use in the power distribution system. As discussed above, the sub-circuit protection modules can also provide this functionality and therefore replace the auxiliary modules in some embodiments.

Figure 3:
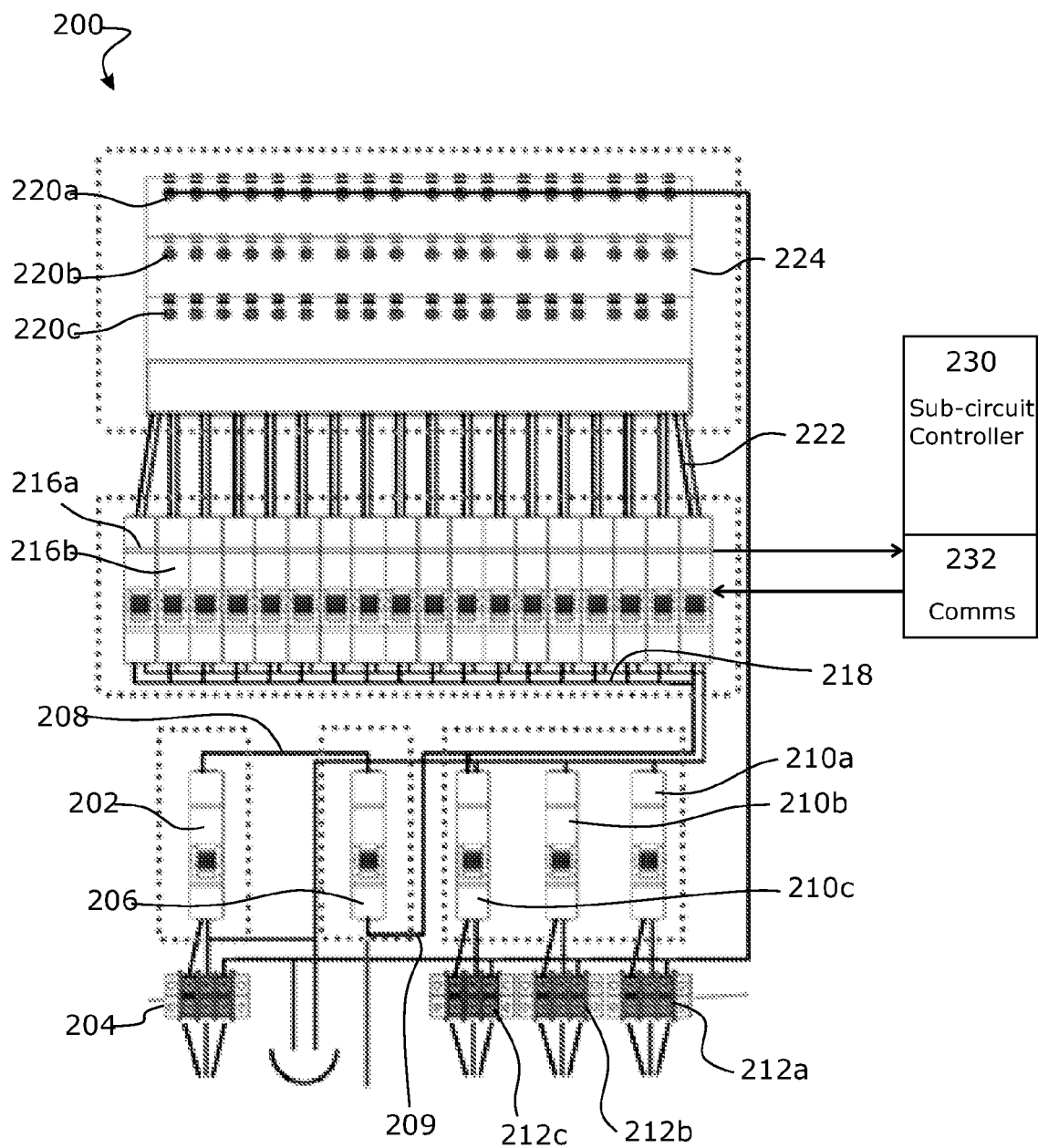
FIG. 3 is a schematic overview of pre-configured or pre-wired switchboard or residential power distribution and management system in accordance with an embodiment.

Referring now to FIG. 3, each of the one or more sub-circuit protection modules 216a, 216b are operably connected to a centralised sub-circuit controller 230. In such embodiments, the connection to the centralised sub-circuit controller 230 is provided through a communications module 232, which is preferably provided through a serial communications protocol. The centralised sub-circuit controller 230 can be configured to receive as input from the one or more connected sub-circuit connection modules 216a, 216b measurement or monitoring data relating to a corresponding connected sub-circuit. The measurement or monitoring data can comprise data relevant to the or each connected sub-circuit, such as power consumption data, operation conditions, and/or data analytics.

In an embodiment, each of the one or more sub-circuit terminations 220 comprise a pre-configured sub-circuit connection module as mentioned in respect to the sub-circuit connection system of the invention, detailed in section 3 below. In such embodiments, the one or more sub-circuit terminations may comprise or have any one or more features of the pre-configured sub-circuit connection module as mentioned in respect of the sub-circuit connection system of the invention.

In an embodiment, each sub-circuit termination 220 comprises a plurality of sub-circuit conductor terminations 220a, 220b, 220c each configured to electrically connect a conductor of an external sub-circuit. In these embodiments, each sub-circuit conductor termination 220a, 220b, 220c can comprise an electrical coupling element configured to electrically connect a wire terminal end of a sub-circuit conductor.

In some embodiments: the sub-circuit protection module is configured to supply a number of electrical safety requirements required for a residential switchboard installation, the grid connection module is configured to provide the installation with electricity metering ability, the one or more auxiliary power modules are configured to provide allocated termination points for the installation, for example but not limited to: vehicle to grid inverters, solar inverters, battery storage inverters. In some embodiments, each module is configured to plug into pre-allocated positions in the switchboard, which has prefabricated line and load connections in place. This means that both the unprotected supply (line) from the grid and the protected supply (load) to a sub-circuit is already in place, no further work required internally apart from connecting each sub-circuit to the sub-circuit termination.

In some embodiments, one or more of the modules are configured to have the same or similar hardware components, the difference between the different modules in these embodiments is the embedded firmware that controls each module's functionality. This enables standardisation and simplicity if there ever becomes a need to replace a module within the switchboard and removes the need for different ratings or sized protection devices. In some embodiments, the or each module will be fitted with a single pole relay that will be operated by software to open and close the circuit, this will be controlled via a serial comms protocol and may be configured to be controlled remotely by one or more third parties, for example: the homeowner, the energy retailers and/or distributors.

In some embodiments, one or more of the modules may have a colour changing LED operation indicator. This indicator is configured to light up when a fault condition is active or present and can also be configured to show what fault is present with a corresponding colour. In further embodiments, each of the modules is configured to monitor or measure at least voltage and current data relating to the module, and to send this data to either a module or circuit protection controller, or to a centralised controller. In these embodiments, each module is configured to perform all duties in real time (data acquisition and transfer, control) and will communicate via a wired serial comms protocol to the desired controller. In further embodiments, the real time granular consumption data collected from each module may be used for load disaggregation supported by machine learning.

In an embodiment, each of the one or more auxiliary power modules is configured to facilitate the switching of any connected external or auxiliary power supplies or sources or private distributed generation supplies. The module is also configured to control/switch each of the external or auxiliary power supplies or sources to control a home's electricity distribution. In further embodiments, each of the auxiliary power modules is further configured to allow a user to select the various types of electrical safety parameters required for the connected loads. Furthermore, each auxiliary power module can be configured to transfer data, for example relating to power quality and/or net consumption to a controller.

In an embodiment, the mains isolation module is configured to provide the switchboards main isolation point. In an embodiment, the mains isolation module is configured to provide short circuit and overload protection as the mains isolation module is protecting the whole installation and not just specific connected loads.

1.2 Control Aspects

Figure 4:
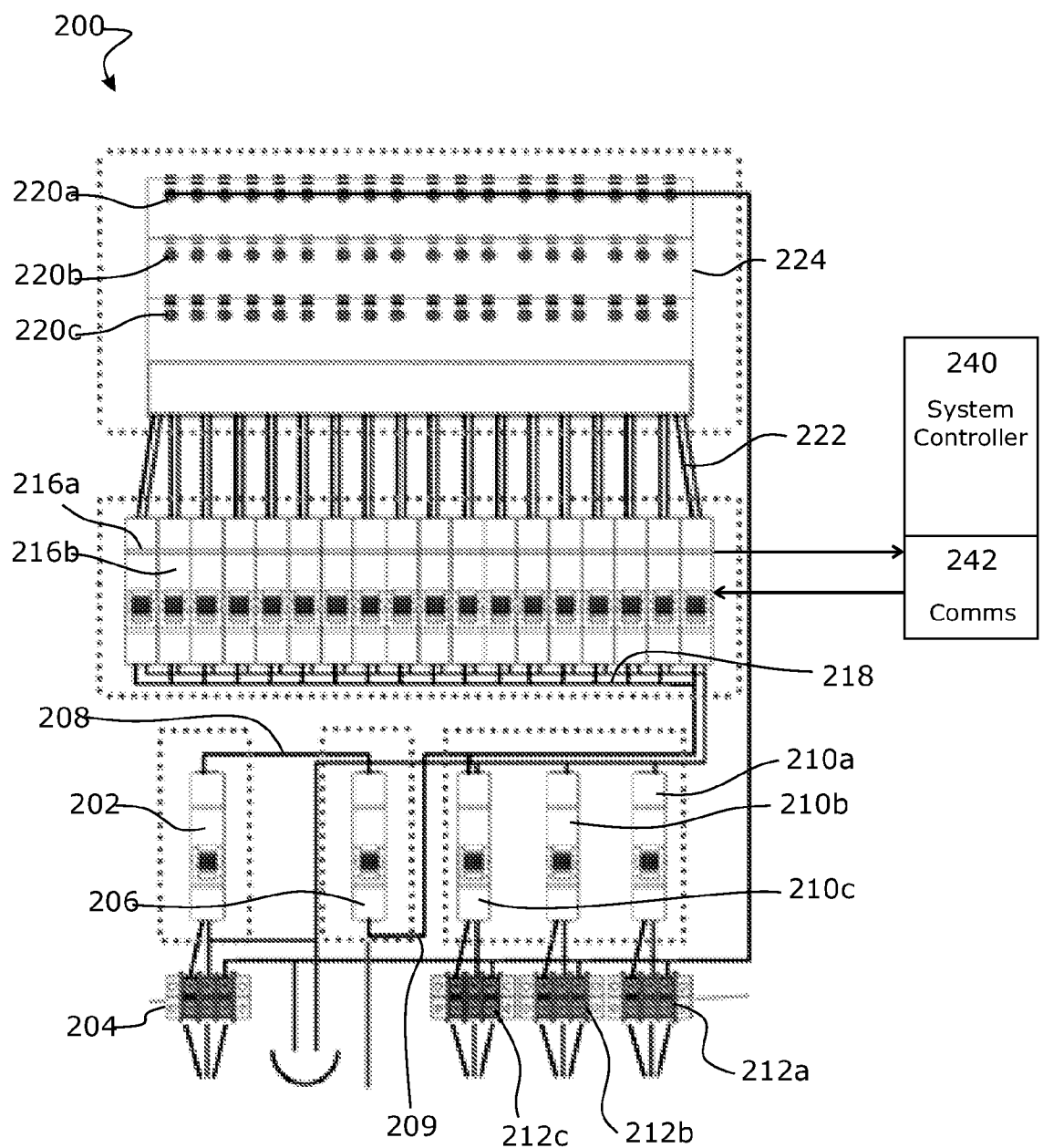
FIG. 4 is a schematic overview of pre-configured or pre-wired switchboard or residential power distribution and management system in accordance with an embodiment.
Figure 5:
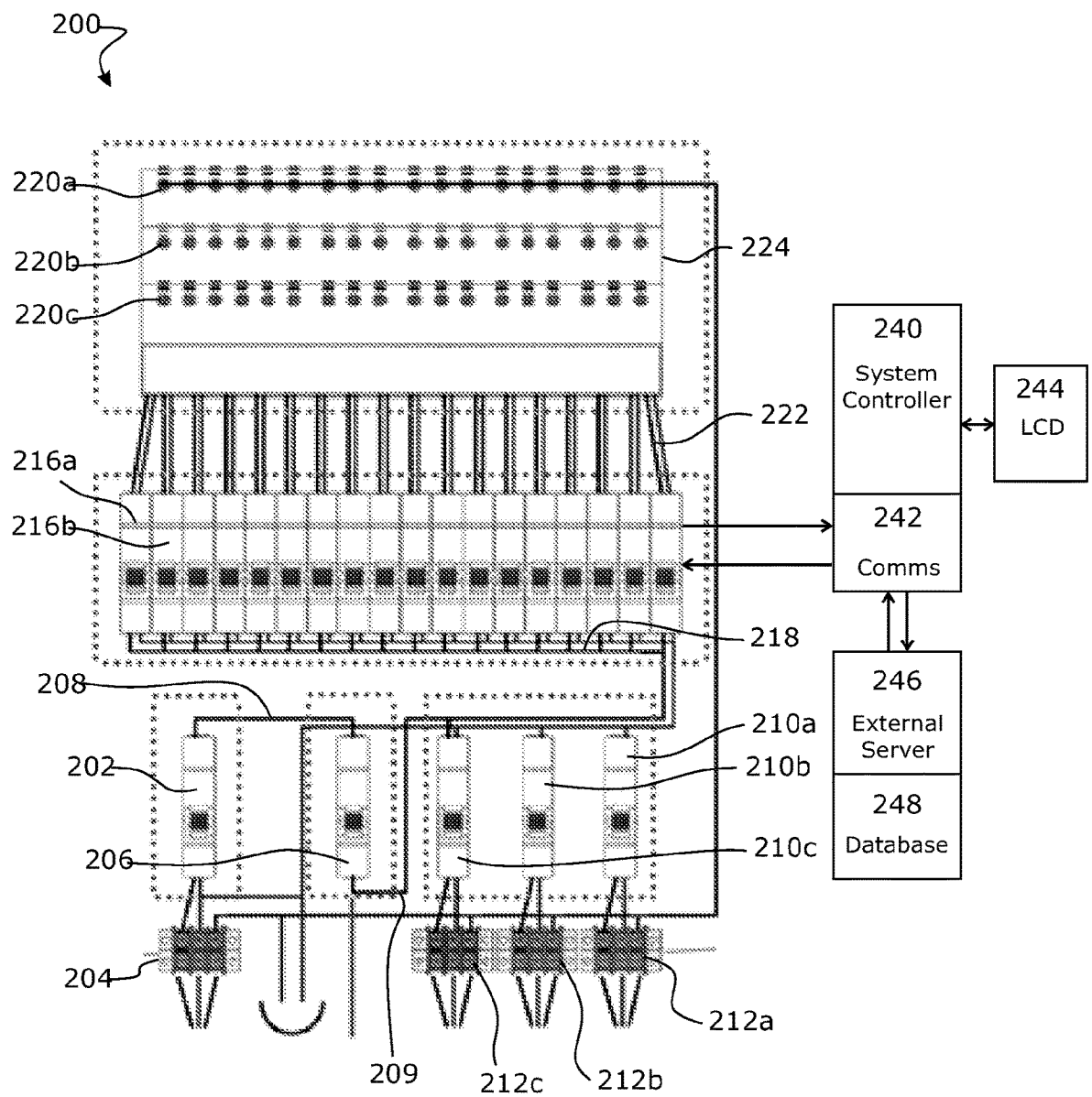
FIG. 5 is a schematic overview of pre-configured or pre-wired switchboard or residential power distribution and management system in accordance with an embodiment.

As shown in FIGS. 4 and 5, the pre-configured or pre-wired switchboard or residential power distribution and management system 200 further comprises a system controller 240. The system controller 240 is operably connected to one or more of the modules. The system controller may be further operably connected to one or more of the controllers of each of the modules, in embodiments wherein the or each module has a controller. In these embodiments, the system controller 240 can further comprise a communications module 242 operable to connect to the controllers and/or communications modules of each of the one or more modules. In some embodiments, the communications module 242 of the system controller 240 is electrically connected to each of the controllers of the modules through a wired communication link. The wired communications protocol could be for example CANbus or ethernet.

With reference to FIGS. 4 and 5, the controller of the or each module is configured to send measurement or monitoring data to the system controller 240. The measurement or monitoring data can relate to a corresponding module. The measurement or monitoring data can comprise power consumption data, data relating to operating conditions, and/or data analytics. For example, the controller of a module is operable to send as input at least: voltage data and/or current data to the system controller 240. In these embodiments, the system controller is configured to monitor the voltage and/or current through each module in real-time.

Figure 6:
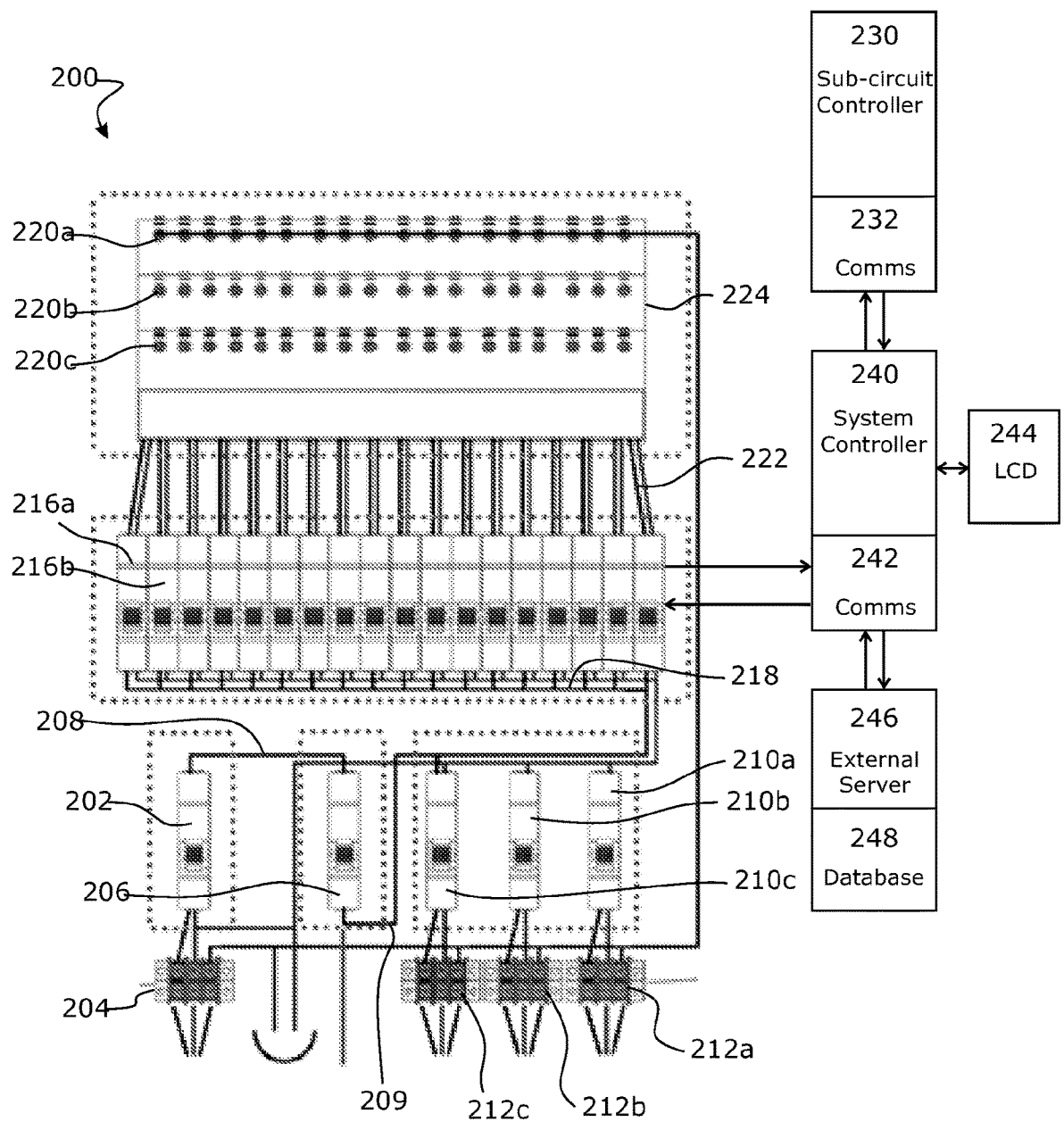
FIG. 6 is a schematic overview of pre-configured or pre-wired switchboard or residential power distribution and management system in accordance with an embodiment.

As shown in FIG. 6, a system controller 240 is configured to connect to a sub-circuit controller 230. In such embodiments, the sub-circuit controller 230 is configured as previously discussed in relation to FIG. 3, and receives and processes data relating to the one or more sub-circuit connection modules 216a, 216b, and is operable to send control signals to the one or more sub-circuit connection modules 216a, 216b. The data received is then further provided to the system controller 240, which is configured to function as discussed below. The system controller 240 is further configured to provide control signals to the one or more sub-circuit connection modules 216a, 216b through the sub-circuit controller 230.

With reference to FIGS. 4, 5 and 6, the system controller 240 is configured to send as input one or more control signals to the or each connected module. The control signals in these embodiments are operable to open and/or close the electrical circuit of the or each module. In some embodiments, the control signals are further operable to control the electrical relay device of the module to open or close the corresponding electrical circuit of the or each module.

In an embodiment, the system controller 240 corresponds to the centralised control system or server 120 as mentioned in respect to the circuit protection system aspect of the invention as detailed in section 2 below and in relation to FIG. 8. As will be appreciated, the system controller 240 may further comprise or have any one or more features mentioned in respect of to the centralised control system or server 120 of the circuit protection system aspect of the invention.

The system controller 240 is configured to at least detect and/or learn specific current signatures of the electrical circuit and/or loads configured to be connected to each module, based on one or more of the power consumption data, data relating to operating conditions, and/or data analytics provided by the controller of the one or more modules. In some embodiments, the system controller 240 is further configured to and provide load specific consumption data analysis based on the power consumption data, data relating to operating conditions, and/or data analytics provided by the controller of each module.

The system controller 240 can be further configured to use one or more machine learning algorithms to detect specific load signatures of the electrical circuit and/or loads configured to be connected to the or each module, based on the data received or monitored from the one or more modules, for example including one or more of: power consumption data, data relating to operating conditions, and/or data analytics provided by the controller of the or each modules. The system controller 240 is configured to use one or more machine learning algorithms to track performance and understand fault conditions relating to each electrical circuit and/or loads configured to be connected to the modules.

The system controller 240 can be further configured to provide data transfer and/or software or firmware updates to the or each connected module, in order to update one or more of the modules' software or firmware, for example to introduce new features or to fix bugs. In some embodiments, the system controller 240 is further configured to provide one or more of: remote monitoring, power consumption monitoring and/or state monitoring of the electrical circuit of one or more connected modules.

The system controller 240 can be further configured to be electrically connected to a power meter. Alternatively, or additionally, the system controller in combination with the grid connection module are configured to provide a power meter. The power meter can be configured to provide net metering facilities for the switchboard to the household for example. The net metering facilities can be to IEC standard 62053-22 The net metering facilities provided can comprise any one of: mains power quality measurement, bi-directional current sensing, and/or on/off supply control.

In some embodiments, the system controller is configured to determine or calculate the net power consumption of the switchboard or residential power distribution and management system based on the data provided by the or each module.

As shown in FIGS. 5 and 6, the system controller is further configured to connect to an LCD screen 244. The LCD screen 244 can be an LCD touch screen, configured to receive inputs from a user and/or serve as a local human-machine interface (HMI), and further configured to display data or information relating to the switchboard or residential power distribution and management system. The LCD screen 244 can be configured to display real-time monitoring or consumption data of the switchboard or residential power distribution and management system to a user. The LCD touch screen can be further configured to allow control inputs to be received from a user, relating to control of one or more of the modules connected to the system controller.

Referring to FIGS. 5 and 6, the system controller 240 can also have an embedded communications module 242. In such embodiments, the embedded communications module 242 is configured to allow communication and two-way data transfer with one or more external servers or systems 246. The communications module 242 is configured to allow wired or wireless communication and two-way data transfer with an external server or system 246 using any one or more of the following communications modules: Cellular (3G, 4G, 5G) WIFI, Ethernet, and/or fibre optic. In these embodiments, the communications module 242 is configured to allow communication and two-way data transfer with an external server or system to transfer real-time retail billing data.

The or each external server or system 246 may comprise at least one database 248. The database(s) is configured to store data received from the system controller 240. The data received from the system controller 240 relates to consumption and/or usage data of any one or more of the modules. In some embodiments, the external server or system 246 is cloud-based. In some embodiments, the external server or system 246 is further configured to provide analytics, demand or consumption analysis of the received consumption and/or usage data of the one or more modules.

The external server or system 246 is further configured to send one or more control signals to the system controller 240. In such embodiments, the control signals are configured to control any one or more of the modules of the system. The control signals are configured to switch or trigger any one or more relays of any one or more modules to turn on or off, which, as will be appreciated, will cause or trigger the electrical circuit of the module to be opened or closed.

The external grid power supply comprises a supply of electrical energy, as will be appreciated. The supply of electrical energy can be supplied by one or more external grid suppliers. In some embodiments, the external grid suppliers have access to the external server or system 246. In such embodiments, the one or more electrical grid suppliers can receive data relating to the consumption and/or usage data of the one or more modules, and/or send one or more control signals to switch on or off any one or more of the relays of the one or more modules from the external server or system. In such embodiments, the electrical grid supplier can send one or more control signals to switch off heavy loads during peak demand of the external grid power supply.

The switchboard or power management and distribution system 200 of the present invention, when electrically or operatively connected to an external grid power source and one or more sub-circuits, is configured to provides power distribution and management from an external grid power source to a household comprising one or more sub-circuits.

The system controller 240 and/or the external server or system 246 is further configured to provide economical and/or energy efficient power distribution and management based on received inputs from the modules and the external server or system. The system controller and/or the external server or system is configured to provide management of the supply of energy to the one or more sub-circuits such that peak load of an electrical grid supplier is reduced by selectively supplying energy to sub-circuits and/or appliances that have higher load consumption during low electrical grid demand times.

The system controller 240 and/or the external server or system 246 is configured to provide individual switching on or off of individual sub-circuits based on load consumption data from the one or more modules and/or demand or grid supply prices for electricity as provided by a third party. The third party in these embodiments is an electricity retailer or distributor.

The system controller 240 and/or the external server or system 246 is configured to receive data relating to real-time electricity pricing associated with the supply of electrical energy supplied by the external grid supplier. In such embodiments, the system controller 240 and/or the external server or system 246 is configured to analyse or compare the real-time electricity pricing data and the real-time load consumption or usage of the system and/or one or more modules. The system controller 240 and/or the external server 246 or system is further configured to calculate the most economical and/or energy efficient power distribution and management for the system based on the analysis or comparison of the real-time electricity pricing data and the real-time load consumption of the system. In some embodiments, the system controller 240 and/or the external server or system 246 is configured to manage the supply of electrical energy to the sub-circuits such that the household electricity bill is optimally reduced based on the real-time analysis of the electricity pricing data and the load consumption of the one or more modules and/or the system.

The system controller 240 and/or the external server or system 246 is further configured to optimally shift between available alternative power sources or supplies to reduce the household electricity bill and/or reduce demand on the external grid source. In such embodiments, the system controller 240 and/or the external server or system 246 are configured to control one or more of the modules of the switchboard or power distribution and management system based on the analysis of the real-time electricity pricing data and the real-time load consumption data to ensure that power used by the household is kept at the lowest optimal price or rate. For example, this can comprise any one of: when power is at a cheaper comparative rate, charging one or more battery or EV based auxiliary power sources, and/or when power is at a more expensive comparative rate, using one or more auxiliary power supplies to provide the source of power to the system, and/or when power is at a more expensive comparative rate, diverting power from the one or more auxiliary power sources to the external grid power source to sell power back to the external grid supplier.

The system controller 240 and/or the external server or system 246 is configured to provide management of the supply of power to the one or more sub-circuits such that peak load of the external electrical grid supplier is reduced, through selectively supplying energy to sub-circuits that have higher load consumption during low electrical grid demand times. It will be seen that the use of individual circuit protection devices or modules means that energy use can be monitored per sub-circuit.

The system controller 240 and/or the external server or system 246 is configured to receive data relating to at least consumption of the one or more modules, and to send control commands to the one or more modules. This sending and receiving enables each home to have control and flexibility with its home energy management through the switchboard. In an embodiment, a switchboard 200 is configured through at least the controller and/or external server or system to provide own unique portal that can utilise data collected from the one or more modules to create a real-time virtual power information platform. Within this platform there is information available to a homeowner or other party, such as real time consumption data and the operation state of any connected load within the installation, time-of-use analytics and predictive suggestions based off energy use patterns. The platform is also configured to facilitate the remote control of connected sub-circuits or loads within the home, for example through: demand response programs, controlled energy retail plans, and general homeowner control. The controller and/or the external server or system may further host sub-circuit or load disaggregation, supported by machine learning algorithms, and provide unique insights down to the appliance/device level detection around energy use characteristics and performance.

The system controller 240 and/or external server or system 246 is further configured to adjust each connected sub-circuit's current protection to its real load requirements. The or each module is configured to have a trip curve rating based on one or more connected loads or sub-circuits. Each trip curve rating determines the level at which the module will trip instantaneously i.e. short circuit, and how long it takes to trip under a more gradual overload condition. The or each module is also configured to adjust the trip curve rating to the exact requirements for the connected load(s) and/or sub-circuits. Some connected appliances or devices, dependant on their age or construction, typically require a higher starting current than normal. The system controller and/or external server or system is configured to be able to detect this specific load signature and accurately adjust the trip curve rating to provide a higher level of operating safety as well as avoid nuisance tripping. The system controller 240 and/or external server or system 246 may do this using one or more machine learning algorithm(s). This will provide the most flexible and accurate short circuit and overload circuit protection possible for any residential environment.

Any fault data that is recorded or measured by one or more of the modules, and is received and/or processed by the system controller 240 and/or external server or system 246, through the one or more machine learning algorithms, is configured to enable the continual development and understanding of fault conditions that can arise in a residential switchboard or installation. Each sub-circuit device or load connected within a sub-circuit will have its own unique sinusoidal signatures, with and without a fault present. The system controller and/or external server or system is configured to quickly and accurately learn the separations between each loads signature, down to the specific appliances connected to the one sub-circuit, for example the fridge, toaster, kettle, heat pump etc.

The system controller 240 and/or external server or system 246 is configured to employ one or more machine learning algorithms that can distinguish the active performance of each sub-circuit and/or each device(s), load(s) or appliance(s) comprising a sub-circuit. The machine learning algorithm(s) can also track the performance of each sub-circuit and/or each load, device or appliance comprising a sub-circuit over time. Having this critical performance data will lead to the ability of understanding when a sub-circuit and/or each load, device or appliance comprising a sub-circuit is not operating as efficiently as it should, this will help assist with sub-circuits and/or each loads, devices or appliances comprising a sub-circuit using too much power. Just because an appliance or device is working, it does not mean it is healthy. This can also lead to accurate predictions of when an appliance may soon fail and prevent any faults or harmful equipment damage from happening.

The system controller 240 and/or external server or system 246 is configured to continuously or periodically analyse a sub-circuits load consumption, including for fault detection, ensure the circuit has the correct level of protection at all times, be operable to quickly protect the sub-circuit from faults. All data being monitored or measured enables the system controller 240 and/or external server or system 246 to adapt to newer technologies and the problems faced with difficult more sporadic load profiles. It is able to do this using one or more machine learning algorithms. Each module, either through its own controller, or through the system controller 240 and/or external server or system 246, is configured to continually adapt to its specific sub-circuit and/or load profile by monitoring and analysing the power being consumed. In some embodiments, when updates have been tested and approved to increase the performance of electrical safety, these updates can be remotely updated to each module through the system controller 240 and/or external server or system 246.

With the one or more machine learning algorithms the system controller and/or external server or system is configured to adapt to the specific load consumption of every installation, it means that regardless of how or when power is used within a home the system controller and/or external server or system is configured to adapt and learn using the data it receives.

The system controller 240 and/or external server or system 246 in combination with the one or more auxiliary power modules 210a, 210b, 210c are configured to facilitate the management of privately generated electricity supplies, for example those such as solar, vehicle to grid (V2G), batteries, or a generator. By monitoring the wholesale electricity pricing market, the system controller 240 and/or external server or system 246 is configured to effectively shift between available alternative energy supplies during peak hours and ensure that power is kept at the cheapest rate possible for the home owner but also the impact on the environment but also the power generators and distributors is reduced. When power is available at its lowest form of pricing, the system controller 240 and/or external server or system 246 is configured to take advantage of this and charge any possible battery focused products for example. The following examples outline different example scenarios of this functionality:

Example 1: demonstrating a situation where an electric vehicle is connected to an inverter at home and the battery is full, but electricity demand is at its highest and the cost to consume power is at its highest. The system controller and/or external server or system is configured to utilise the V2G inverter connected to one of the auxiliary power modules, and draw power from the electric vehicle to power the home. For example, this might entail drawing power from the electric vehicle to power a clothes dryer or using it to power an electric hot water cylinder. A common electric vehicle battery has enough charge to power a regular home for up to 4 days on average.

Example 2: demonstrating a situation where an electric vehicle or storage battery is connected to an inverter at home and power pricing is at its lowest price. The system controller and/or external server or system is configured to draw power from the external grid supply and charge storage battery and/or electric vehicle devices to have them charged and ready for peak pricing hours. As soon as they have reached enough charge and peak hours start to approach, matched with the machine learning data around the homes consumption history and time of use, the system controller and/or external server or system will be able to disconnect the external grid supply and manage the stored battery energy in an efficient way possible for powering the home.

Example 3: demonstrating a situation where a home has the ability to store energy, for example through one or more batteries or electric vehicles, and its highest load consumption is when the overall demand for supply, and thus pricing, is low. The system controller and/or external server or system is configured to manage what hours of the day it is best to sell any excess stored power back to the grid when demand, and pricing, is high. This enables the homeowner to make financial gain and reduce the strain on peak demand supply for distributors. When this event occurs and demand is low again, the system controller and/or external server or system can draw power from the grid or utilise solar (if available) to recharge battery sources at a reduced price.

The methodology behind this is to provide the an economical and energy efficient solution for any homeowner, regardless of size or consumption.

1.3 IoT Connectivity

The system controller and/or external server system is further configured to operably connect to one or more internet-of-things (IoT) enabled devices, the device(s) located within or relating to the household in which the switchboard is installed. In such embodiments, the system controller and/or external server system is configured to operably connect to the one or more IoT enabled devices using the or each communications module. For example, the or each communications module is configured to operably connect to the one or more IoT enabled devices using thorough one or more of the following communications protocols: Zigbee, IEEE 802.15.4, bluetooth low energy (BLE), long range radio (LoRa), and/or Wi-Fi. The system controller and/or external server system is configured to receive data relating to one or more connected IoT enabled devices, and in some embodiments the controller is configured to receive data relating to power consumption or usage of the connected IoT enabled device.

The system controller and/or external server system is configured to store received data from a connected IoT enabled device and establish a portfolio or directory of connected and/or previously connected IoT enabled devices, based on the data received from the one or more IoT enabled devices. In some embodiments, the system controller and/or external server system is further configured to send one or more command signals to one or more connected IoT enabled devices. In such embodiments, the system controller and/or external server system is further configured to send one or more command signals to switch on or off one or more connected IoT enabled devices.

The system controller and/or external server system is further operable to determine the load signature of one or more connected IOT devices. The system controller and/or external server system can be further configured to match or pair the load signature of a connected IOT device with the load signature of one of the sub-circuits, as measured by one of the sub-circuit protection modules. In some embodiments, the system controller and/or external server system is operable to utilise the load signature of a connected IOT device as input in a machine learning algorithm. In such embodiments, the machine learning algorithm is capable of determining one or more characteristics of a sub-circuit connected to a sub-circuit protection module.

Having this interaction with connected devices can enable the system controller and/or external server or system to build a portfolio of appliances/devices for each home and furthers the ability of the system controller and/or external server or system to monitor, manage and/or control of specific items in a home. This enhances the functionality of the system and its machine learning ability with real time connectivity, accelerating the learning process of discovering appliance/device load signatures by the system controller and/or external server or system.

1.4 Housing and Installation

The pre-configured or pre-wired switchboard or residential power distribution and management system is configured to be housed within a housing or enclosure. In such embodiments, the housing or enclosure is a typical or existing residential switchboard housing or enclosure.

The pre-configured or pre-wired electrical connections which electrically connect one or more of the modules are pre-configured or pre-wired bus bars. In some embodiments, the bus bars are copper or aluminium bus bars, or flat strips of copper or aluminium. The busbars are operable to carry large currents between the modules of the switchboard which they connect. They may be supported by insulators, leaving only connection points exposed, or may be bare busbars.

Each of the modules may be configured to be electrically connected to one or more pre-configured or pre-wired connection points. In some embodiments, the one or more pre-configured or pre-wired connection points are electrically connected to one or more of the pre-configured or pre-wired electrical connections between the modules. Furthermore, the pre-configured or pre-wired electrical connections which electrically connect the modules may be fixed in location in relation to the switchboard. In some embodiments, the pre-configured or pre-wired electrical connections which electrically connect the modules are configured to define where each module will sit within the pre-configured or pre-wired switchboard or residential power distribution and management system.

The invention also broadly relates to a method of installing the pre-wired switchboard, the method comprising the steps of: electrically connecting an external grid power supply to the grid connection module; and electrically connecting the wire terminal ends of one or more sub-circuit conductors to a corresponding sub-circuit termination. The method further comprises electrically connecting one or more auxiliary power supplies or external distributed generation supplies or sources to one of the auxiliary power modules. The prefabricated switchboard installed as a part of this method may comprise or have any one or more features mentioned in respect of the pre-wired switchboard of the invention.

2. Circuit Protection Modules

Figure 7:
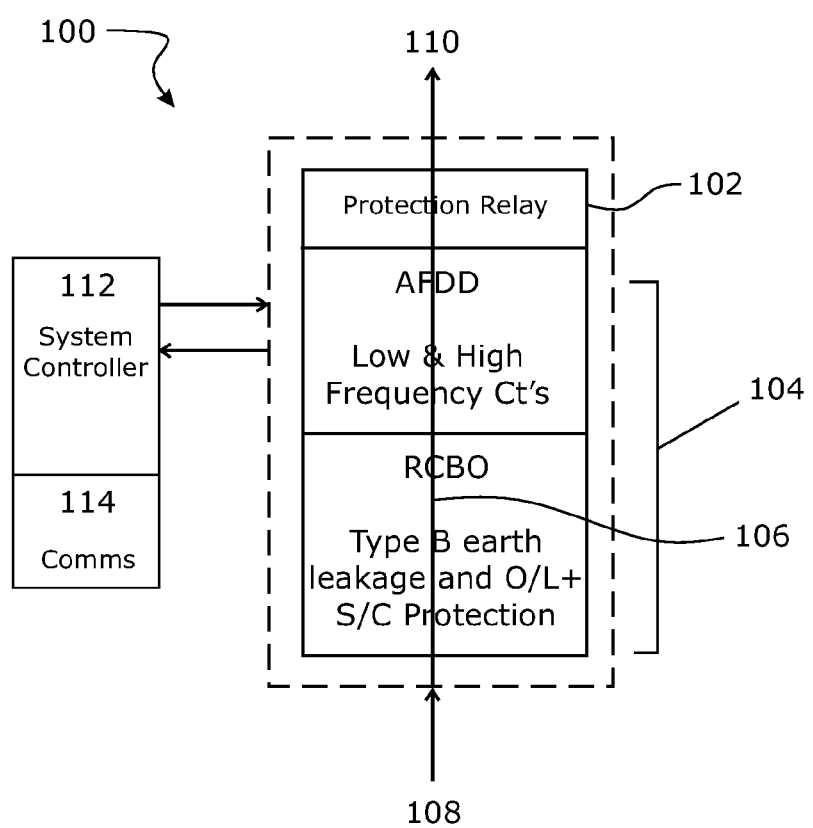
FIG. 7 is a schematic overview of a circuit protection system in accordance with an embodiment.

With reference to FIG. 7, an example embodiment of a further aspect of the invention is shown relating to a circuit protection system 100 for use in a switchboard or power distribution and management system. The circuit protection system 100 comprises one or more electrical input connectors 108 configured to connect to at least one source of electrical power; one or more electrical output connectors 110 configured to provide electrical power to an electrical output; wherein one or more electrical circuits 106 are provided between the one or more electrical input connectors 108 and the one or more electrical output connectors 110; a load monitoring device 104 operably connected to the one or more electrical circuits 106, and operable to determine one or more characteristics or attributes of the one or more electrical circuits 106; an electrical relay device 102 electrically connected between the electrical input connectors 108 and the electrical output connectors 110, and operable to open and close the one or more electrical circuits 106 based on a control signal; and a controller 112 operably connected to the electrical relay device 102 and the load monitoring device 104, the controller 112 configured to: receive as input one or more characteristics or attributes of the one or more electrical circuits 106 from the load monitoring device 104, determine if one or more fault conditions are present in the one or more electrical circuits 106 based on analysis of the one or more characteristics or attributes of the one or more electrical circuits, and send one or more control signals to the electrical relay device 102 to open or close the one or more electrical circuits 106 if a fault condition is detected based on the analysis of the one or more characteristics or attributes of the one or more electrical circuits.

2.1 Control and Monitoring Devices

Still referring to FIG. 7, the electrical relay device 102 is configured to receive a control signal from the controller 112. The control signal is operable to trigger the electrical relay device to open or close the one or more electrical circuits 106. The electrical relay device 102 comprises one or more electrical relays, each corresponding to one of the electrical circuits 106. Each electrical relay device 102 is operable to open and close its corresponding electrical circuit 106 based on a control signal. The or each electrical relay device 102 is a single-pole relay and/or a bi-stable or latching relay, or any other type of relay device, as will be appreciated.

The load monitoring device 104 is operably connected in series in the one or more electrical circuits 106 between the electrical input connectors and the electrical output connectors. The load monitoring device 104 may be operably connected in the electrical circuits 106 before the electrical relay device 102. In alternative embodiments, the load monitoring device 104 is operably connected in parallel with the one or more electrical circuits 106 between the electrical input connectors and the electrical output connectors.

The one or more characteristics or attributes of the one or more electrical circuits as measured or determined by the load monitoring device 104 comprise at least the voltage and/or current through the one or more electrical circuits 106. These one or more characteristics or attributes of the one or more electrical circuits can further comprise a real time voltage and/or current reading. These one or more characteristics or attributes of the one or more electrical circuits can further comprise the waveform or wave pattern of the voltage and/or current through the one or more electrical circuits.

The load monitoring device 104 comprises at least a current sensor and/or a voltage sensor. In some embodiments, the current sensor is a current transformer. In such embodiments, the current transformer is configured to be a high and/or low frequency current transformer, or any other type of load measuring device, as will be appreciated.

2.2 Control Aspects of Circuit Protection Modules

The controller 112 is configured to receive as input voltage and/or current readings of the one or more electrical circuits from the load monitoring device 104. In some embodiments, the controller is configured to receive as input a waveform or wave pattern of the voltage and/or current through the one or more electrical circuits from the load monitoring device.

The controller 112 is configured to analyse the one or more characteristics or attributes of the one or more electrical circuits for example the voltage and/or current, and determine if the characteristics or attributes indicate one or more fault conditions in the electrical circuit. The controller 112 is configured to determine if one or more fault conditions are present in the one or more electrical circuits 106, the one or more fault conditions comprising at least any one of: a short circuit, circuit overload, circuit overvoltage, circuit overcurrent, AC and/or DC earth leakage, and/or a dangerous arc fault. The one or more fault conditions can have specific thresholds or trip curves, wherein if the one or more characteristics or attributes of the one or more electrical circuits exceed the threshold or trip curve, the controller indicates a fault condition. The controller 112 is further configured to adjust the specific thresholds or trip curves for each of the one or more fault conditions. The specific thresholds or trip curves for each of the one or more fault conditions can be adjusted based on the real time load requirements of the electrical circuit.

The controller 112 is configured to send one or more control signals to the electrical relay device 102 to open or close the one or more electrical circuits 106 if a fault condition is detected based on the analysis of the one or more characteristics or attributes of the one or more electrical circuits.

The response time of the controller 112 in determining a fault condition and sending a control signal to the electrical relay device is preferably in the order of microseconds or nanoseconds. The response time of the controller in responding to a determining fault condition can enable dangerous arc faults to be detected and eliminated in the one or more electrical circuits.

2.3 Centralised Control and Communications

Figure 8:
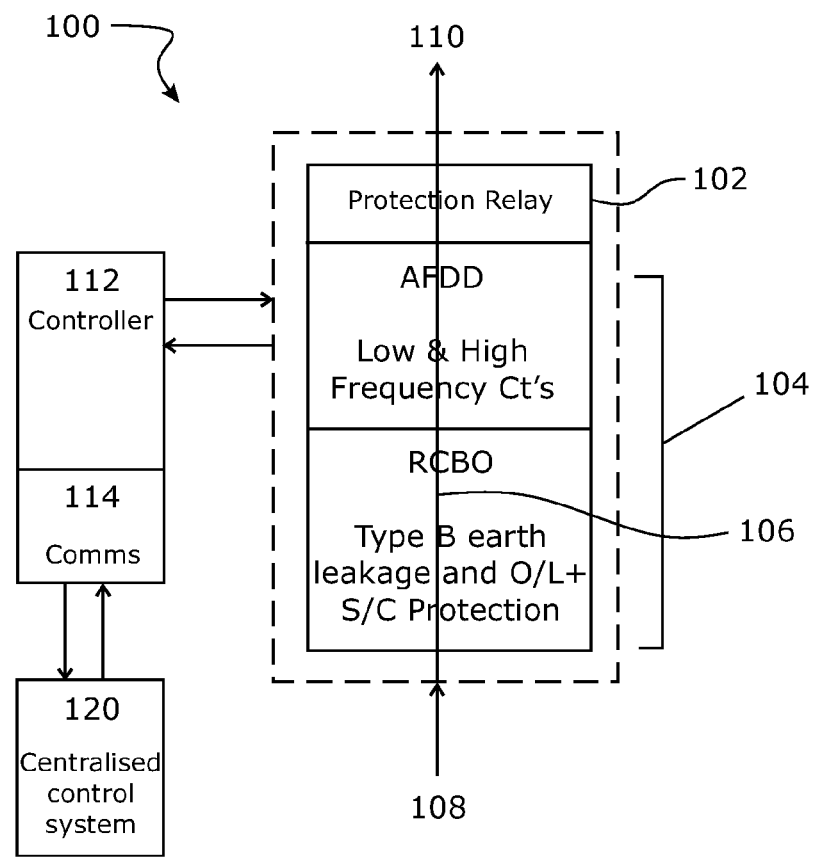
FIG. 8 is a schematic overview of a circuit protection system in accordance with an embodiment.

With reference to FIG. 8, the controller 112 is further operably connected to a centralised control system or server 120. This connection can be provided through a communications module 114. The communications module may use a serial communications protocol to connect to the centralised control system or server 120. The centralised control system or server is configured to connect to the controller 112 of one or more different circuit protection systems 100.

The controller 112 is configured to send measurement or monitoring data to the centralised control system or server 120. The measurement or monitoring data can comprise at least power consumption data, data relating to operating conditions, and/or data analytics. In some embodiments where the circuit protection system 100 is used as at least one of the modules of the pre-configured or pre-wired switchboard or residential power distribution and management system 200, the centralised control system or server 112 corresponds to the system controller 240 and/or the external system or server 246. In embodiments where the centralised control system or server 112 corresponds to the external system or server 246, it will be appreciated that the controller 112 may communicate with an intermediate controller such as which may correspond to the system controller 240, which then communicates with the external system or server 246.

The controller 112 is further configured to receive external control commands from the centralised control system or server 120. The external control commands are operable to control or trigger the electrical relay device 102 to open or close the corresponding electrical circuit 106.

The centralised control system or server 120 is configured to detect and learn specific current signatures of the electrical circuit 106 and/or loads configured to be connected to the electrical output connector 110, based on at least any of the power consumption data, data relating to operating conditions, and/or data analytics provided by the controller. The centralised control system or server is configured to and provide load specific consumption data analysis or feedback based on at least one of the power consumption data, data relating to operating conditions, and/or data analytics provided by the controller 112.

The centralised control system or server 120 is configured to use one or more machine learning algorithms to detect specific load signatures of the electrical circuit 106 and/or loads configured to be connected to the electrical output connector 110, based on at least the power consumption data, data relating to operating conditions, and/or data analytics provided by the controller 112. The centralised control system or server is configured to use one or more machine learning algorithms to track performance and understand fault conditions relating to each electrical circuit and/or loads configured to be connected to the electrical output connector.

The load monitoring device 104 is configured to measure the voltage and/or current across one or more electrical circuits 106. The electrical circuit 106 may comprise a phase and neutral line. Alternatively, one electrical circuit is the phase line, and another electrical circuit is the neutral line. The load monitoring device 104 is configured to measure current in the one or more electrical circuits 106 using separate load monitoring devices across both the phase and neutral wires. The load monitoring devices are preferably current transformers. The current transformers measure the different variances that can arise with different load conditions including short circuit and overload, AC & DC earth leakage and arc faults.

Using the measurements acquired through the load monitoring device 104, the controller 112 is configured to develop a load signature platform and simulate a sinusoidal wave calculated off the recordings. The circuit protection system 100 is configured to generate its own specific load profile dependent on the connected loads at to the output connectors 110. Using for example the existing AS/NZS installation and electricity standards and regulations for all forms of circuit protection, the controller 112 is configured to determine what level of protection is required for the circuit protection, based on the measurements from the load monitoring device 104.

The controller 112 is configured to have an existing set of parameters which can represent specific fault characteristics to each form of circuit protection. The load profiles are able to be continuously matched against this existing set of parameters to determine whether the current consumption is operating under normal conditions or whether there is a fault present. During this process, if any data is found to be very close to the existing set of parameters, it will be logged, and an alert will be raised to allow for further investigation utilising machine learning. If there are no faults present, the process of measuring or monitoring the electrical circuit 106 cycles again. If there is a fault present, the decision will be made to interrupt the electrical circuit 106 using the electrical relay device 102.

If it is determined by the controller 112 that a fault condition is present, the controller issues a control signal or an instruction to the electrical relay device 102 which triggers or interrupts the electrical circuit 106. This control signal, along with the load profile and time of trip will be logged by the controller 112 and an alert will be raised for further investigation.

2.4 Inputs and Outputs

The one or more electrical input connectors 108 are configured to connect to an active or phase conductor line and/or a neutral conductor line. In some embodiments, a first electrical input connector is configured to connect to a active or phase conductor, and a second electrical input connector is configured to connect to a neutral conductor.

As such, the one or more electrical output connectors 110 are also configured to connect to a active or phase conductor line and/or a neutral conductor line. In some embodiments, a first electrical output connector is configured to connect to a active or phase conductor, and a second electrical output connector is configured to connect to a neutral conductor.

Following this, a first electrical circuit is provided between the first electrical input connector and the first electrical output connector, the first electrical circuit comprising a active or phase circuit, and wherein a second electrical circuit is provided between the second electrical input connector and the second electrical output connector, the second electrical circuit comprising a neutral circuit.

Additionally, the one or more electrical input connectors 108 and the one or more electrical output connectors 110 are configured to match one or more prefabricated connection points to enable easy installation of the circuit protection system within the switchboard or power distribution and management system.

The circuit protection system 100 further comprises a status indicator. The status indicator can be in the form of one or more light emitting diodes (LEDs). In some embodiments, the LEDs are operably connected to the controller 112. In these embodiments, the LEDs are operable to indicate one or more fault conditions with one or more of the circuits provided in the circuit protection system, as determined by the controller 112. As will be described below the status indicator can in some embodiments comprise a physical indicator, for example a visually observable feature that physically moves so enable a user to observe and identify an operable or inoperable status.

Figure 9:
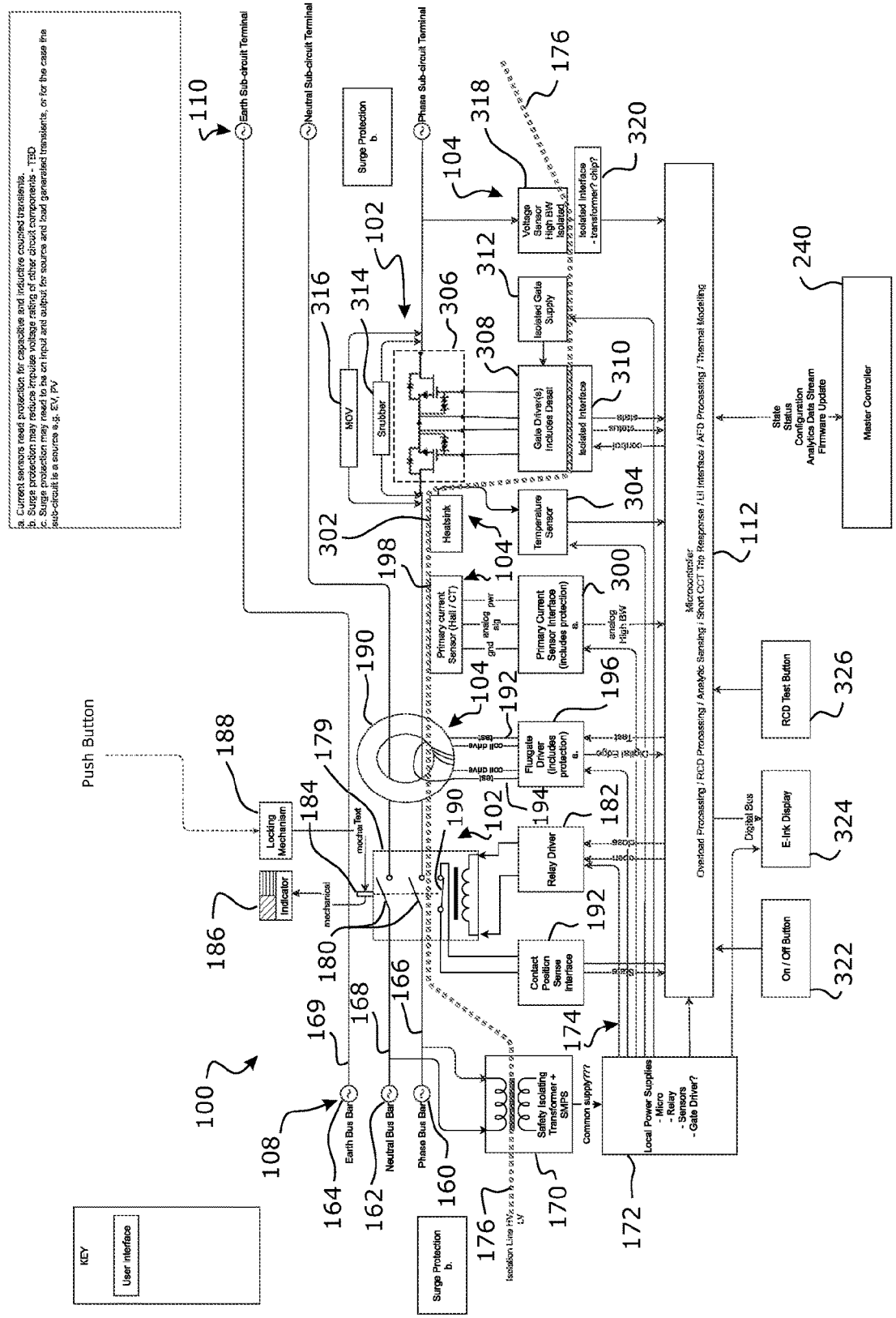
FIG. 9 is a schematic overview of a sub-circuit protection device, module or system in accordance with an embodiment.

Turning to FIG. 9, a systems diagram of a module 100 substantially as disclosed above will now be described in accordance with an embodiment or example. An example of a physical module will be described further below but for present purposes the module 100 may be connected integrally as a pre-wired component of the switchboard. Therefore, the connections 108 for the module 100 are pre-wired o pre-connected to bus bars 160, 162 and 164 of the switchboard.

An isolating transformer 170, which may also be a step-down transformer, has a primary winding connected between the active and neutral lines, and delivers an isolated and preferably low voltage at the secondary which can be appropriately conditioned at 172 in the known way to provide one or more low voltage power supplies that are used to power the sensing and control circuitry. The power supply outputs to the various sensing and control circuits are shown as lines 174. The transformer feeds power to a low voltage side of the module 100. The separation between the isolated low and high voltage regions of the module 100 is shown diagrammatically by an isolation line 176 in FIG. 9.

In the example shown in FIG. 9, isolation components comprising both a mechanical air gap disconnect unit such as a mechanical relay and a solid-state relay connected in series therewith are provided to enable circuit breaker functionality in the event of a detected fault. This allows a failsafe system to be provided which has the fast turn off capability of a solid-state switch and the mechanical certainty of separated electric contacts, as will now be described.

A relay 179 has double pole single throw contacts 180, which are normally open, electrically and physically isolating the sub circuit to which the module is connected from the phase and neutral bus bars 160 and 162. The relay driver 182 is operable to open or close the relay dependent on control signals from controller 112 (which may, as shown in this example, comprise a microcontroller). The air gap present in the open position may in some examples cumulatively measure at least approximately 4 mm.

In one embodiment the relay contacts 180 are mechanically connected to an indicator 186 and are actuable by a locking mechanism 188—for example a physical lever such as a switch which is biased in an open position. The arrangement in some examples is such that when the switch is physically in the off state the relay driver cannot override the OFF setting i.e. the relay contacts cannot be closed. However, if the switch 188 is in the ON state and the relay driver switches the relay contacts to an OFF state then the mechanical switch will transition to the OFF state and remain in the OFF state until a user switches the switch to the ON state. In other examples the switch may toggles between either an ON or OFF position but can be locked out in the OFF position if required.

A further set of contacts 190 is linked to the primary double pole contact set. Contacts 190 are connected to sense interface 192 so that the sense interface can be used to determine the state of the contacts 180. Thus, the sense interface 192 can inform the controller 112 if the switch 188 has been moved to the OFF state for example. This information can be used by the controller 112 to ensure that the solid state relay 306 remains in the OFF state. In some examples the contacts 190 are physically actuated between closed (i.e. contact) or open states in advance of the contacts 180 moving between closed or open states. In this way the controller 112 can control the solid state relay 306 (described further below) to operate appropriately. For example, the microcontroller 112 can detect that contacts 180 are about to be opened by a user, and thus open the solid state relay prior to opening the contacts 180, in order to prevent or minimise arcing between contacts 180. Similarly, if a user uses a switch or other instructions to reset the relay 179, then the controller 112 can close relay contacts 180 prior to closing (or prior to completely closing) solid state relay 306.

Indicator 186 may take a variety of different forms. It can consist of a switch toggle or slider for example, or another feature that moves to provide an indication such as a green surface or red surface that becomes visible when the relay contacts 180 are physically in the OFF state or ON state.

A residual current detector is provided to detect current imbalances in the phase and neutral lines. Those skilled in the art will appreciate that a number of different detection circuits may be employed. In this example a flux gate sensor is used, comprising a toroid 190 with a drive coil 192 and a test coil 194 which are driven by a flux gate driver circuit 196. The driver circuit is configured to either detect any current imbalance above a predetermined threshold (which may be established or set by the microcontroller 112) and provide this information to the microcontroller. Alternatively, the flux gate driver circuit provides an output representative of phase and neutral currents which is interpreted by the microcontroller 112 so that it may take appropriate action when a detection output representing a fault is received i.e. open relay 179 and solid-state relay 306.

A primary current sensor is also provided so that excess current can be detected to open the relays 179 and 306. Those skilled in the art will appreciate that a number of different current sensing circuit topologies may be employed. In this example a Hall effect sensor is used, which has an interface 300 that provides the sensor output to the microcontroller 112 so that it may take appropriate action when a sensor output representing a fault is received i.e. open relay 179 and solid-state relay 306.

As briefly described above, a solid-state relay shown in FIG. 9 by SiC switches 306 is provided. This has significant advantages of very fast switch-off times while having good thermal performance while in the ON state. The solid-state relay is driven by gate drivers 308 which are in turn operated by the microcontroller 112 via an isolated interface such as optocouplers. The gate drivers are powered from an isolated gate driver power supply 312.

Snubbers 314 and a varistor 316, in this example comprising an MOV (metal oxide varistor) are provided across the switches to accommodate transients.

SiC switches 306 have one or more heatsinks 302 that are thermally coupled to the switches. To ensure appropriate thermal safeguards a temperature sensor 304 is used to monitor the heatsink temperature. The temperature sensor output is provided to the microcontroller 112 so that it may take appropriate action should a temperature threshold be exceed, for example switching the relay 306 to an OFF state.

A line voltage sensor 318 is also provided to monitor voltage of the phase line. An isolated interface 320 for the voltage sensor allows the sensor output to be provided to the microcontroller 112 so that the microcontroller may take appropriate action should a voltage threshold be exceeded, for example switching the relays 306 and/or 179 to an OFF state. In other examples line voltage sensors are provided at other locations for example at the active line adjacent to one or both sides of the relay 179. These additional sensors can be used to provide additional information about the presence of a fault or conditions which are likely to lead to a fault. Furthermore, voltage sensors can be used in some embodiments to detect voltage zero crossings and thus provide information to the microcontroller so that the microcontroller can determine a suitable or optimal time to switch the solid-state relay 306 between On and OFF states. In some embodiments the relay 306 may also be operated by the microcontroller to control or condition power delivered to the sub-circuit to which it is connected.

It will be apparent to a person skilled in the art that other sensors and sensing circuitry may be added, and in some embodiments all of the sensors described in the above examples may not be provided, depending upon the intended use and application of the circuit protection module and/or dependent on the regulations in the state or country in which the module is being used.

Each module, as shown in FIG. 9, may have an ON/OFF button or switch that can activate locking mechanism 188 and toggle or sliding indicator 186 to provide a visible mechanical (and electrical e.g. via LED) status indication. An RCD test button 326 is also provided, along with an optional display 324. In an example or embodiment activation (e.g. pressing) of the RCD test button causes the microcontroller 112 to send a test instruction or signal to fluxgate driver 196. This in turn causes the driver to energise the test winding 192, causing a change in the field sensed. If the sensor is working properly, the field imbalance or disturbance will be detected, thus causing the driver to send a fault signal to the microcontroller. Therefore, the RCD test may be conducted without a physical connection being made to an active line.

One embodiment of the RCD function includes a method of self-test when the microcontroller 112 may periodically signal the fluxgate driver 196 to engage the test winding 192 whilst at the same time inhibiting the received signal from causing the solid-state relay 306 or relay 179 from disconnecting. By such means the system may determine that the RCD sense function remains functional. It will be apparent to those skilled in the art that such a mechanism must be orchestrated without imperiling the normal RCD safety function. In one example of a means of achieving this the self-test may be conducted within a period of microseconds as opposed to a real RCD fault requiring a trip-time in milliseconds.

A further embodiment of the system combines the signals from the primary current sensor, residual current sensor and line voltage sensors by means of a software algorithm in the microcontroller 112 to provide an Arc fault detection mechanism. On detection of signals representing an arc fault the microcontroller may signal the relays 179 and 306 to disconnect thereby rendering the sub-circuit safe.

A further embodiment of the system utilises the microcontroller 112 as being common to multiple types of fault detection, for example current overload, short-circuit, residual current fault and arc fault, to therefore disambiguate the cause of the fault to a user by means of displaying the fault causation on the display 324. By such a method the user is better informed to the cause of the fault.

It will also be apparent that the circuit protection module may be configured either locally or remotely via the controllers 112 and/or 240 to provide appropriate protection for load circuits that operate bi-directionally, or which operate as a source of local generation. A bi-directional load circuit may for example comprise such as an electric vehicle (EV) charging interface in which the EV battery can both be charged from the switchboard, or the switchboard can act as a grid connection point, or a local distribution point to receive power from the EV battery when required. A source of local generation may for example comprise a solar panel or wind generator.

3. Sub-Circuit Connection System

Figure 10:
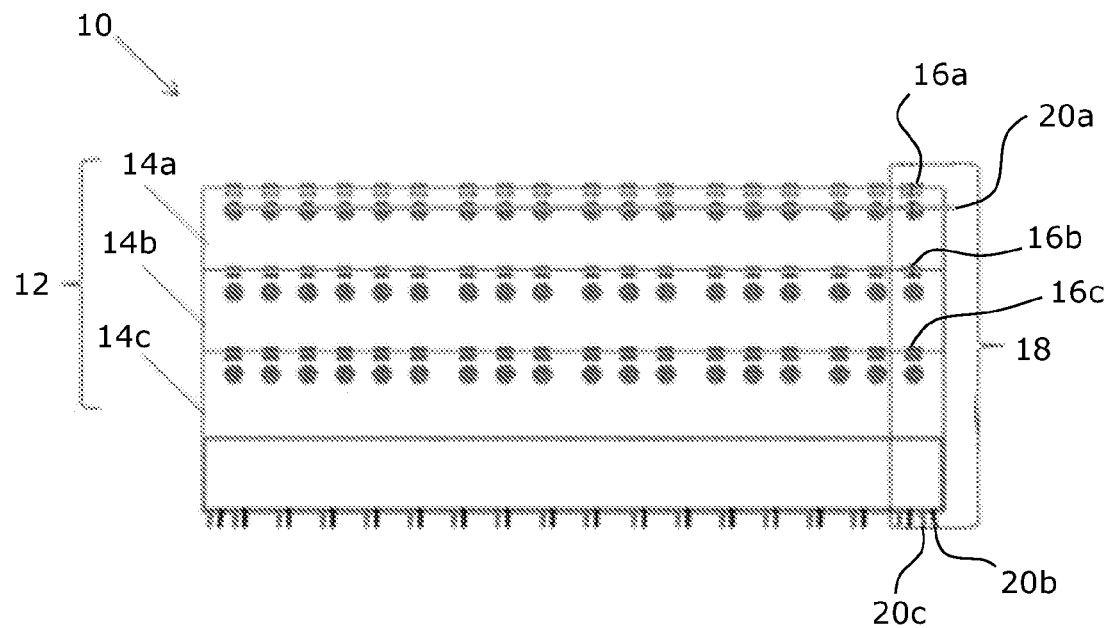
FIG. 10 is a front view of a sub-circuit connection system connection block or housing in accordance with an embodiment.

With reference to FIG. 10, an example embodiment of a further aspect of the invention is shown relating to a sub-circuit connection system 10 for use in a switchboard or power distribution and management system.

As shown, the a sub-circuit connection system 10 comprises: a sub-circuit termination block or housing 12 comprising a plurality of spaced connection layers 14a, 14b, 14c, wherein each of the plurality of connection layers is configured for connecting one or more related sub-circuit conductors 16a, 16b, 16c of one or more external sub-circuits; and one or more pre-configured sub-circuit connection modules 18 housed within the housing 12, each sub-circuit connection module 18 comprising: a plurality of sub-circuit conductor coupling elements comprising terminations 16a, 16b, 16c, each configured to electrically connect a conductor wire of an external sub-circuit, each sub-circuit conductor termination 16a, 16b, 16c corresponding to one of the plurality of connection layers 14a, 14b, 14c of the housing 12, and comprising an electrical coupling element configured to electrically connect a wire terminal end of a sub-circuit conductor; and at least one internal electrical connector configured to electrically connect a sub-circuit conductor to a power distribution bus 20b, 20c and/or a ground connection 20a. As can be seen the coupling elements are provided in rows. In one embodiment throws comprise phase and neutral coupling elements. In another embodiment, as shown, the rows of coupling elements comprise a row of phase coupling elements, a row of neutral coupling elements, and a row of earth coupling elements. Each of the phase and neutral, or phase, neutral and earth elements for any one individual sub-circuit connection are located adjacent to each other i.e. at the same or approximately the same position in each row. In this way the coupling elements for each sub-circuit are grouped according to that sub-circuit cable connection. Therefore, each sub-circuit cable can be conveniently terminated at the required location.

The sub-circuit connection system provides a centralised position or location that an electrician can make all the required sub-circuit connections with minimal effort during installation. In some embodiments or examples the sub-circuit connection system is configured to plug into a switchboard at a pre-allocated position with all other internal components pre-wired, as in the other aspects of the invention previously discussed. Having the sub-circuit connection system and a pre-wired switchboard also enables the ability of no longer having to quantify or detail the required circuit protection devices or other devices for an installation. The pre-wired or pre-configured switchboard of the present invention can have set quantities of circuit protective devices. For example, when a home has an electrical layout/plan, the pre-wired or pre-configured switchboard is configured have a set of different sizes, which can include, but is not limited to, 15 circuit protection modules, 30 circuit protection modules, and/or 45 circuit protection modules per board. Other variations and configurations on the number of circuit protection modules are intended, as will be appreciated. Each sub-circuit is configured to be replaced and swapped out for another. In these embodiments, the switchboard can also have different sizes of sub-circuit connection systems with a set quantities of sub-circuit connection modules housed within the housing. For example, if a pre-wired switchboard has 15 circuit protection modules, the sub-circuit connection module may have 15 sub-circuit connection modules.

A sub-circuit is configured to be electrically coupled to a pre-configured sub-circuit connection module 18 by way of a three-core cable. In such embodiments, each core of the three-core cable is configured to provide a conductor wire which corresponds to a sub-circuit conductor termination 16*a*, 16*b*, 16*c*. In an embodiment, each of the one or more sub-circuit conductor terminations 16*a*, 16*b*, 16*c* are configured to be connected to a conductor wire or core of the three-core cable. In some embodiments, the conductor wires or cores of the three-core cable correspond to any one of: an active or phase conductor, a neutral conductor, and an earthing or ground conductor.

Figure 11:
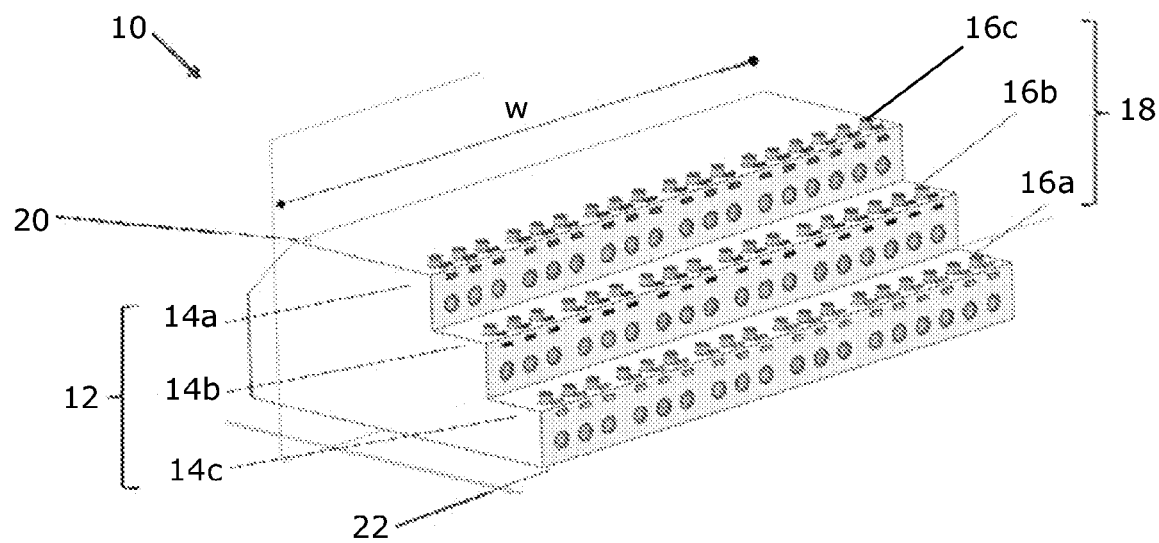
FIG. 11 is a perspective view of FIG. 10.

As shown in FIG. 11, the housing 12 comprises a plurality of spaced connection layers 14*a*, 14*b*, 14*c*. The housing 12 further comprises a proximal end 22 and a distal end 20. Each of the spaced connection layers 14*a*, 14*b*, 14*c* are stepped vertically downwards from the distal end 20 towards the proximal end 22. In an embodiment, the plurality of the sub-circuit conductor terminations are spaced transverse along the width W of the housing 12. As shown in FIG. 11, in this embodiment there are three spaced connection layers, a first 14*a* providing for a row of one or more active conductors, a second 14*b* providing for a row of one or more neutral conductors, and a third 14*c* providing for one or more earth conductors.

With reference to FIGS. 10 and 11, each pre-configured sub-circuit connection module 18 comprises a first sub-circuit conductor termination 16*a*, corresponding to a first layer of the housing 14*a*, a second sub-circuit conductor termination 16*b*, corresponding to a second layer of the housing 14*b*, and a third sub-circuit conductor termination 16*c* corresponding to a third layer of the housing 14*c*.

Each pre-configured sub-circuit connection module 18 comprises a first sub-circuit conductor termination 16*a* comprising an electrical coupling element configured to electrically connect an earthing or ground conductor wire terminal end of an external sub-circuit, a second sub-circuit termination 16*b* comprising an electrical coupling element configured to electrically connect a neutral conductor wire terminal end of an external sub-circuit, and a third sub-circuit conductor termination 16*c* comprising an electrical coupling element configured to electrically connect a phase or active conductor wire terminal end of an external sub-circuit.

Referring to FIG. 10, each pre-configured sub-circuit connection module 18 comprises a first internal electrical termination comprising an electrical coupling element configured to electrically connect an earthing or ground conductor wire terminal end of an external sub-circuit to an earthing or ground connection 20*a*, a second internal electrical termination comprising an electrical coupling element configured to electrically connect a neutral conductor wire terminal end of an external sub-circuit to a power distribution bus 20*b*, and a third internal electrical connector comprising an electrical coupling element configured to electrically connect a phase or active conductor wire terminal end of an external sub-circuit to a power distribution bus 20*c*.

The second internal electrical termination comprising an electrical coupling element is configured to electrically connect a neutral conductor wire terminal end of an external sub-circuit to a neutral connection of a power distribution bus 20*b*. The third internal electrical termination comprising an electrical coupling element is configured to electrically connect a phase or active conductor wire terminal end of an external sub-circuit to a phase or active connection of a power distribution bus 20*c*.

The power distribution bus 20*b*, 20*c* is configured to electrically connect an external sub-circuit to a circuit protection module and/or a power distribution system. The power distribution bus 20*b*, 20*c* is configured to electrically connect to a circuit protection system as mentioned previously in respect to the invention. The circuit protection system may further comprise or have any one or more features mentioned in respect of the circuit protection system mentioned previously in respect to the invention. In an embodiment, each pre-configured sub-circuit connection module 18 is configured to be individually electrically isolated.

3.1 Housing and Identifiers

With reference to FIG. 11, the sub-circuit termination block or housing 12 comprises a proximal end and a distal end. In this embodiment, each of the spaced connection layers 14*a*, 14*b*, 14*c* are stepped vertically downwards from the distal end towards the proximal end. In an embodiment, the plurality of the sub-circuit conductor terminations are spaced transverse along the width W of the housing 12. As shown, there are three spaced connection layers, a first 14*a* providing for a row of one or more active conductors, a second 14*b* providing for a row of one or more neutral conductors, and a third 14*c* providing for one or more earth conductors.

In some embodiments, there may be one or more standardised connection identifiers provided on the housing, each corresponding to a sub-circuit connection module. The one or more standardised connection identifiers may each have an associated colour or other visual identifier. The one or more standardised connection identifiers are configured to convey information about the sub-circuit that is operable to be electrically connected to each sub-circuit module 18. The one or more standardised connection identifiers correspond to the sub-circuit legend of the switchboard. In an embodiment, the one or more standardised connection identifiers enable ease of installation of a sub-circuit to a switchboard.

In an embodiment, the housing is formed from a precast plastic mould. In a further embodiment, the housing is operable to be opened and closed, allowing access to the one or more pre-configured sub-circuit connection modules.

Figure 12:
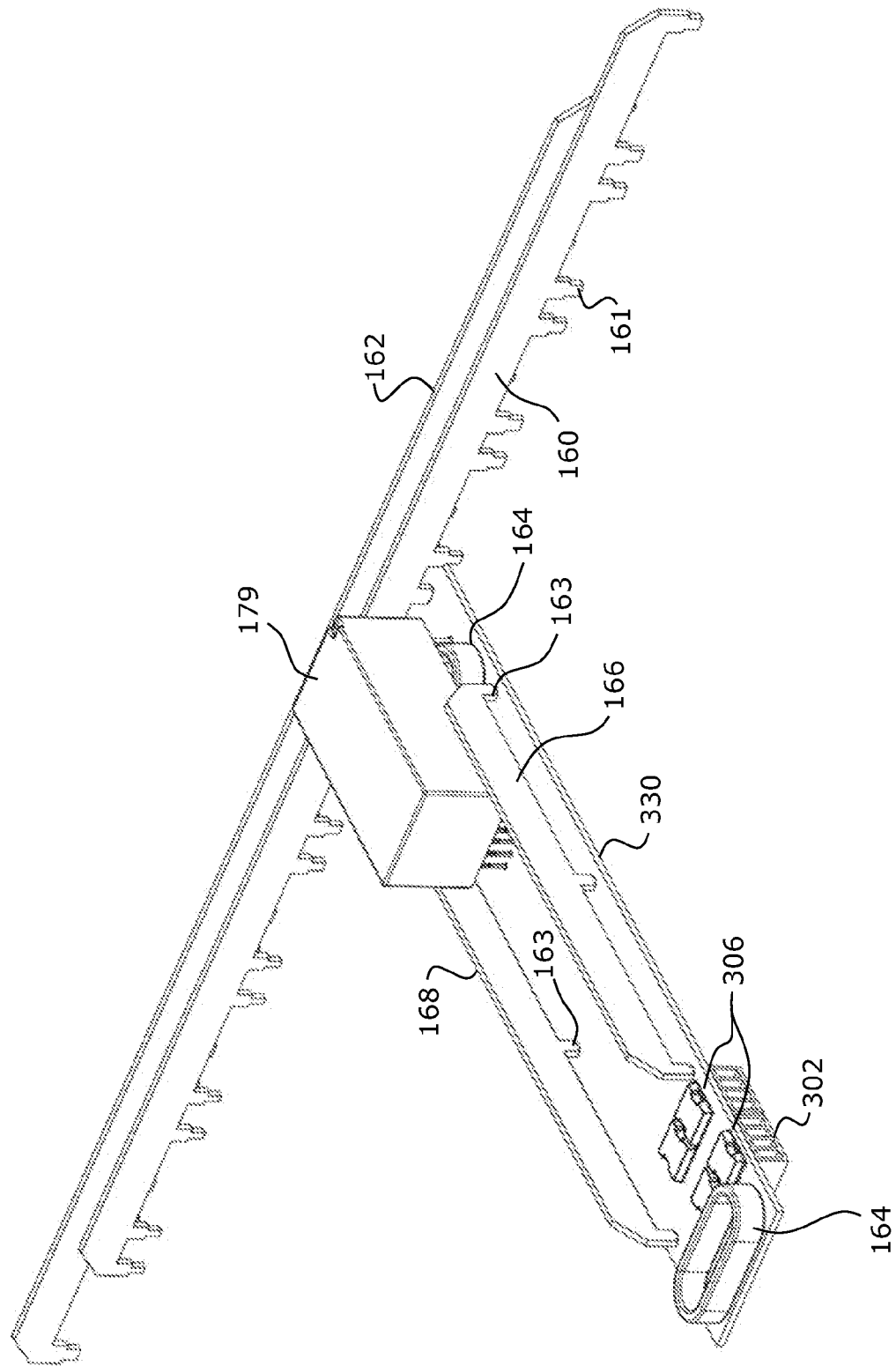
FIG. 12 is a partial perspective view of a protection module and bus bars in accordance with an embodiment.

Turning to FIGS. 12-15, another embodiment or example will now be described. FIG. 12 shows an isometric view of part of a circuit protection module 100 connected to bus bars 160 and 162 of a switchboard. The terms circuit protection module and sub-circuit protection module are used interchangeably in this document. The module 100 may be electrically and physically connected to the bus bar by making connections to pins 161 on the bus bars. Pins 161 extend through pre-formed holes in the PCB or similar non-conductive substrate 330 on which the module electronics is mounted. In some embodiments the modules 100 are completely pre-wired by being electrically connected to the bus bars as part of an assembled unit. In other embodiments, the modules 100 are removable and replaceable, and/or may be connected to the switchboard individually or in groups. Only a part of one module is shown in FIG. 12 for clarity.

The module 100 in FIG. 12, when fully assembled, includes the functionality described in the examples such as FIG. 9 above. In the simplified example shown in FIG. 12, the ON/OFF and test buttons and visual indicators are removed for clarity. Phase and neutral conductors 166 and 168 provide power from the switchboard bus bars 160 and 162 via relays 179 and 306 to a sub-circuit module termination such as terminal block 332 (shown in FIG. 13) to which the relevant sub-circuit is electrically connected. In some embodiments the termination comprises conductive regions at the end of the module chassis or mounting board 330. These allow the module to be electrically connected to a terminal block such as block 332, which terminal block may be pre-connected to the switchboard. In other embodiments the module 100 is provided such that the terminal block 332 is already connected to the remainder of the module, so that the module including the terminal block can be attached, as an assembled unit, to the switchboard.

Relays 179 and 306 are conveniently separated leaving space in the middle of the module to mount the microcontroller and other sensor circuitry. However, those skilled in the art will appreciate the other arrangements may be implemented. Coils 164 can be provided in some embodiments to allow sensing functionality, for example providing a flux gate or current sensor.

Figure 13:
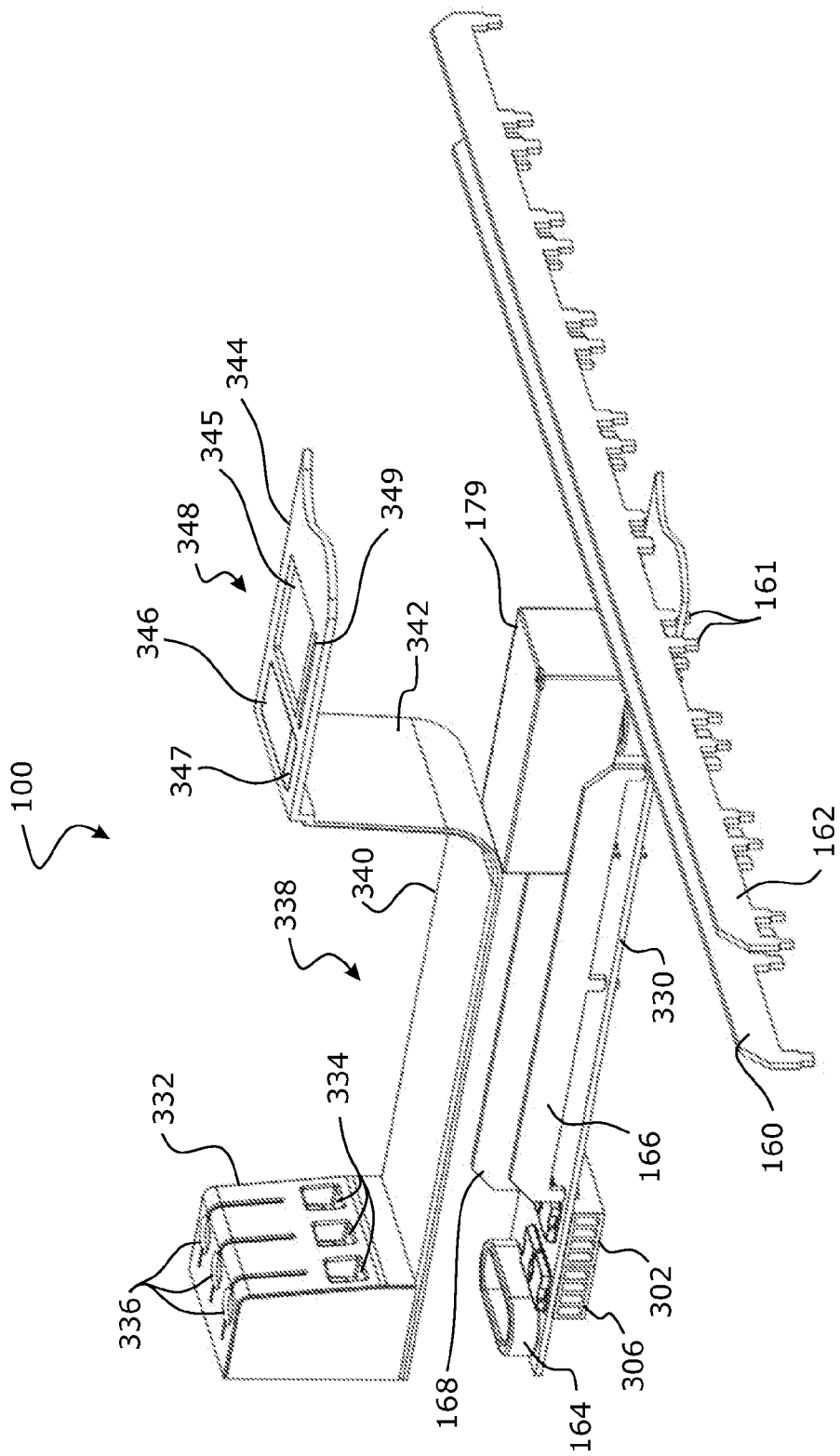
FIG. 13 is a partial perspective view of a protection module and bus bars in accordance with an embodiment.

Turning to FIG. 13, an exploded isometric view of the module 100 of FIG. 12 is shown, but in this view an upper wall 340 of the module housing is also shown. The arrangement and configuration is such that the wall 340 extends from the terminal block 336 at one end to an angled wall portion 342 at the other end, defining a valley or depression 338 therebetween. Depression 338 provides a portion of a cable tray which is formed when a plurality of modules 100 are provided adjacent to each other, as will be described further below.

Wall 342 extends to an upper wall portion 344 which includes openings or interface portion 348 for an ON/OFF button and 346, RCD (residual current detector) test button 347, display 345, and status indicator 349 for a viewing a visual status representing the status of relay 179.

Figure 13A:
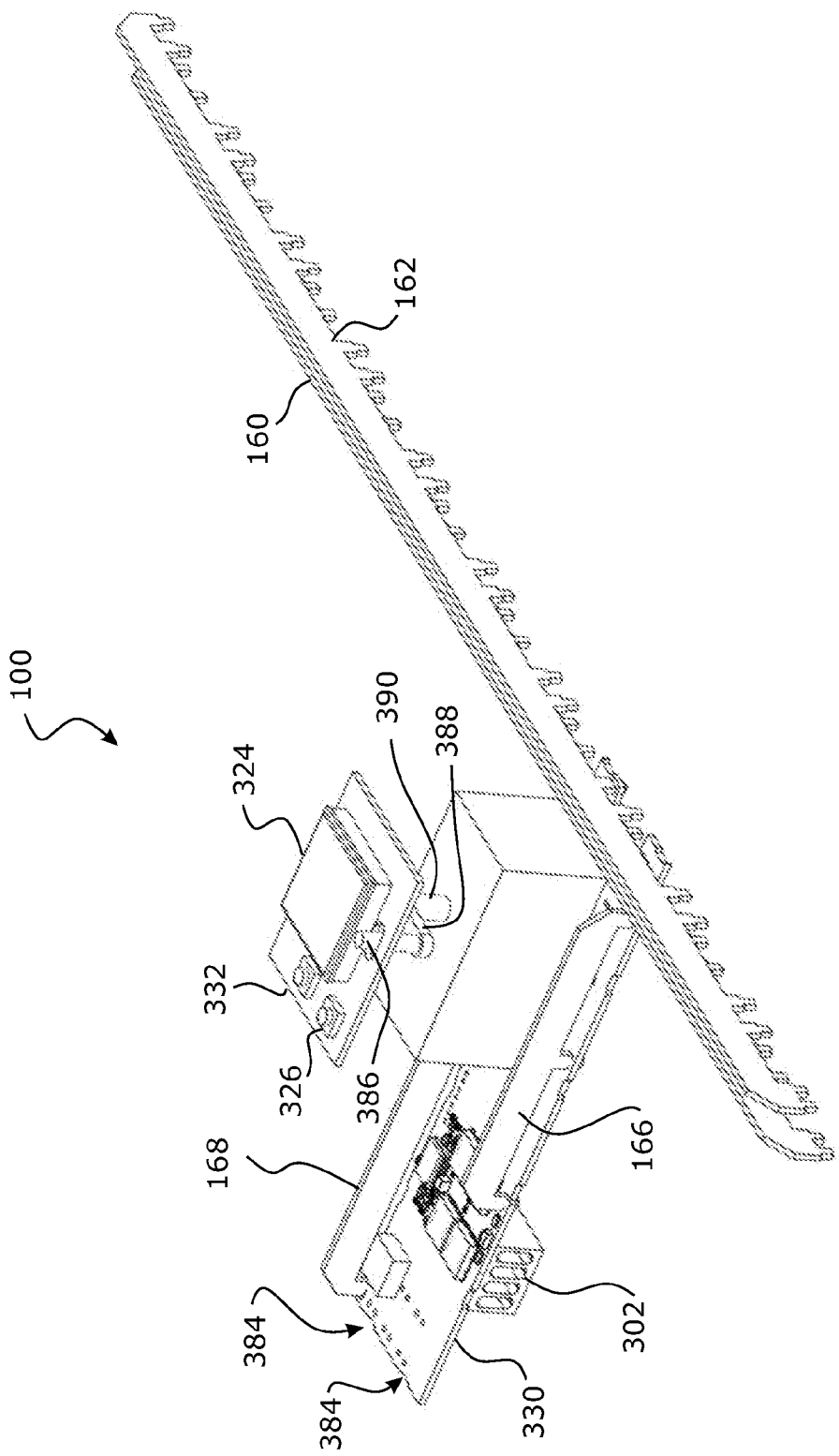
FIG. 13A is a partial perspective view of a protection module and bus bars in accordance with an embodiment.

Referring to FIG. 13A, another embodiment of module 100 is shown with the upper parts removed for clarity. In this embodiment regions 384 of the mounting board 330 are provided for mounting or clipping the module into a terminal block such as block 332. It will be seen that a larger (for example an elongate) terminal block may be provided that has termination or terminal connectors for a plurality of modules. Thus, a plurality of modules 100 as shown in FIG. 13A can be plugged into, or otherwise electrically engaged with, a single terminal block.

FIG. 13A also shows an example of the functional components that sit beneath wall portion 344. The RCD test button 326 is shown, along with ON/OFF button 332. In use, regions 346 and 347 can comprise flexible portions of wall 344, which allow a user to depress the wall portions to activate buttons 332 and 326. Display 324 is visible through window 345 in wall 344. Visual status of relay 179 is provided by moveable indicator 386 which in this example slides to show status between ON and OFF positions. Indicator 386 is connected to arm 388 which is in turn connected to shaft 390 which changes angular disposition dependent on whether relay 179 is open or closed.

Figure 13B:
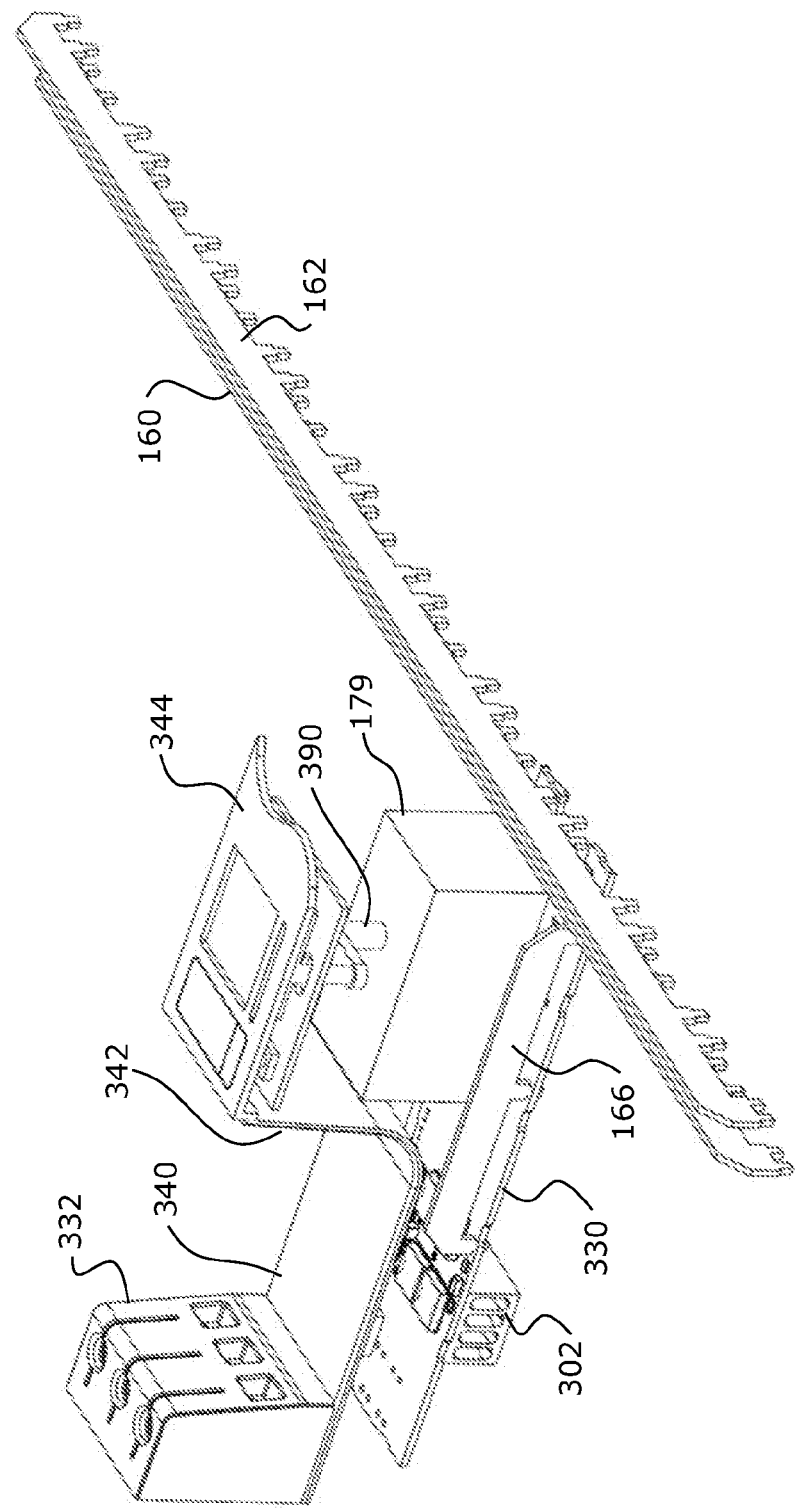
FIG. 13B is a partial perspective view of a protection module and bus bars in accordance with an embodiment.

FIG. 13B portrays the example of module 100 as shown in FIG. 13A, but with the walls 340, 342 and 344 in place, together with terminal block 332.

Figure 14:
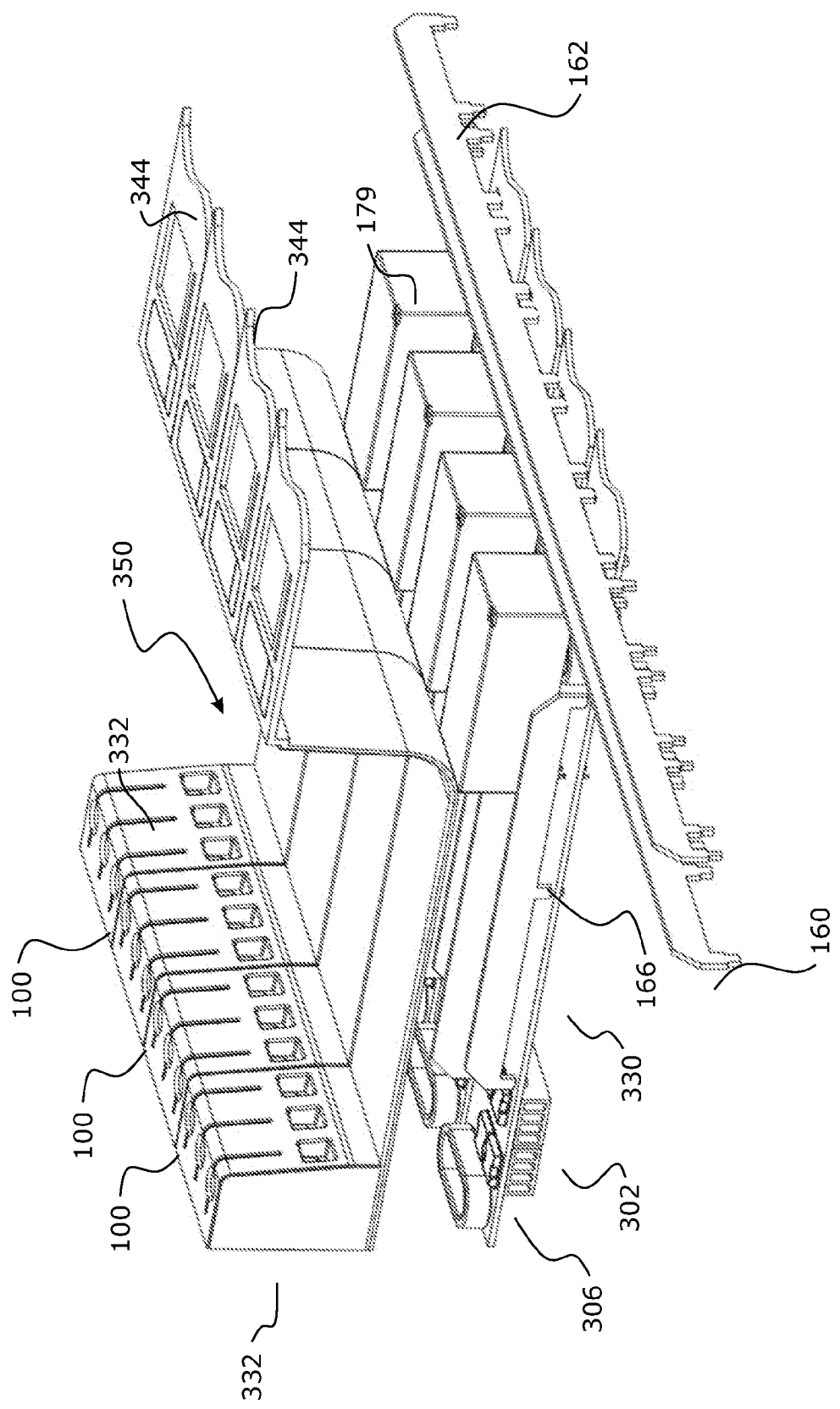
FIG. 14 is a partial perspective view of a protection module and bus bars in accordance with an embodiment.
Figure 14A:
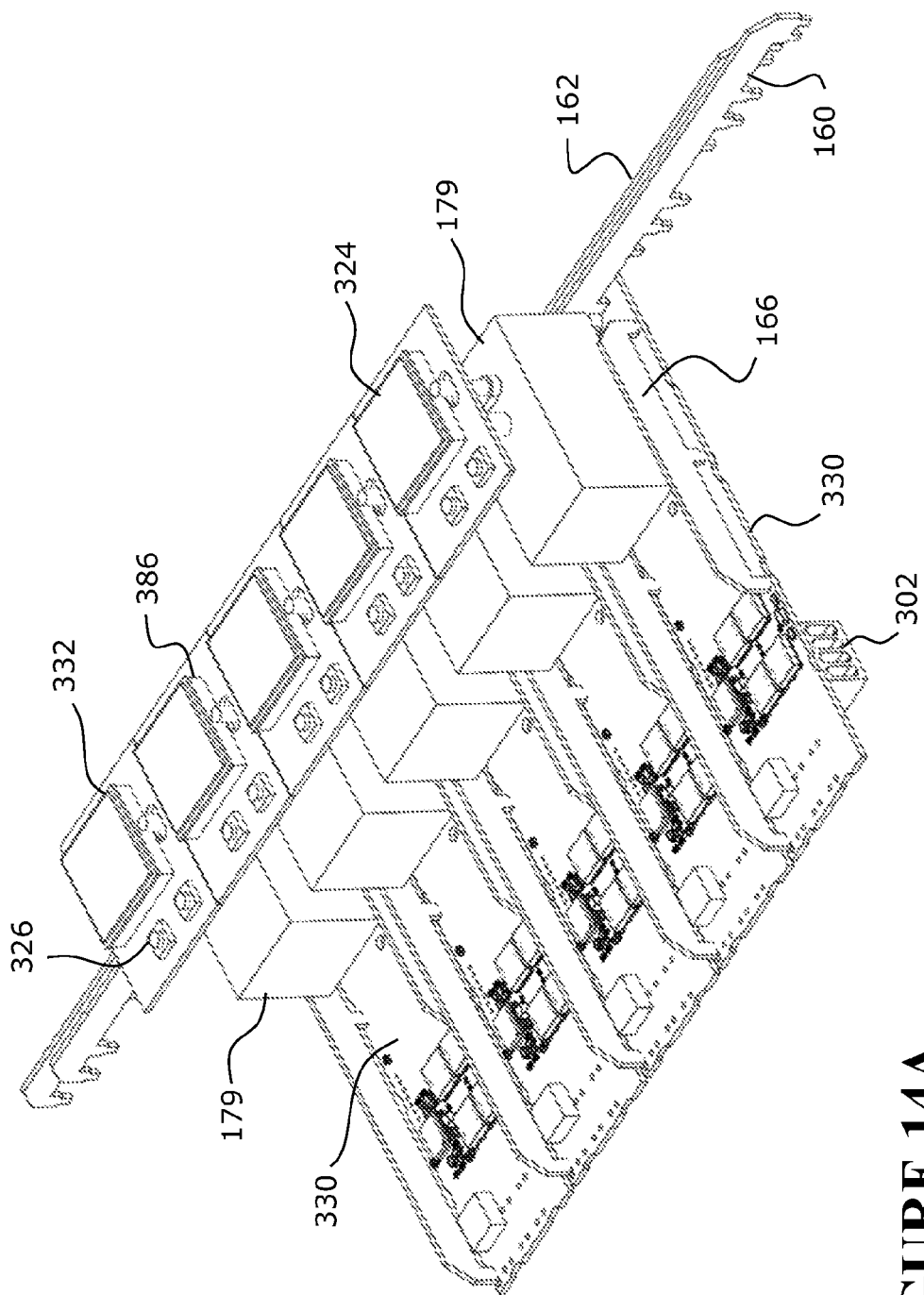
FIG. 14A is a partial perspective view of a protection module and bus bars in accordance with an embodiment.
Figure 14B:
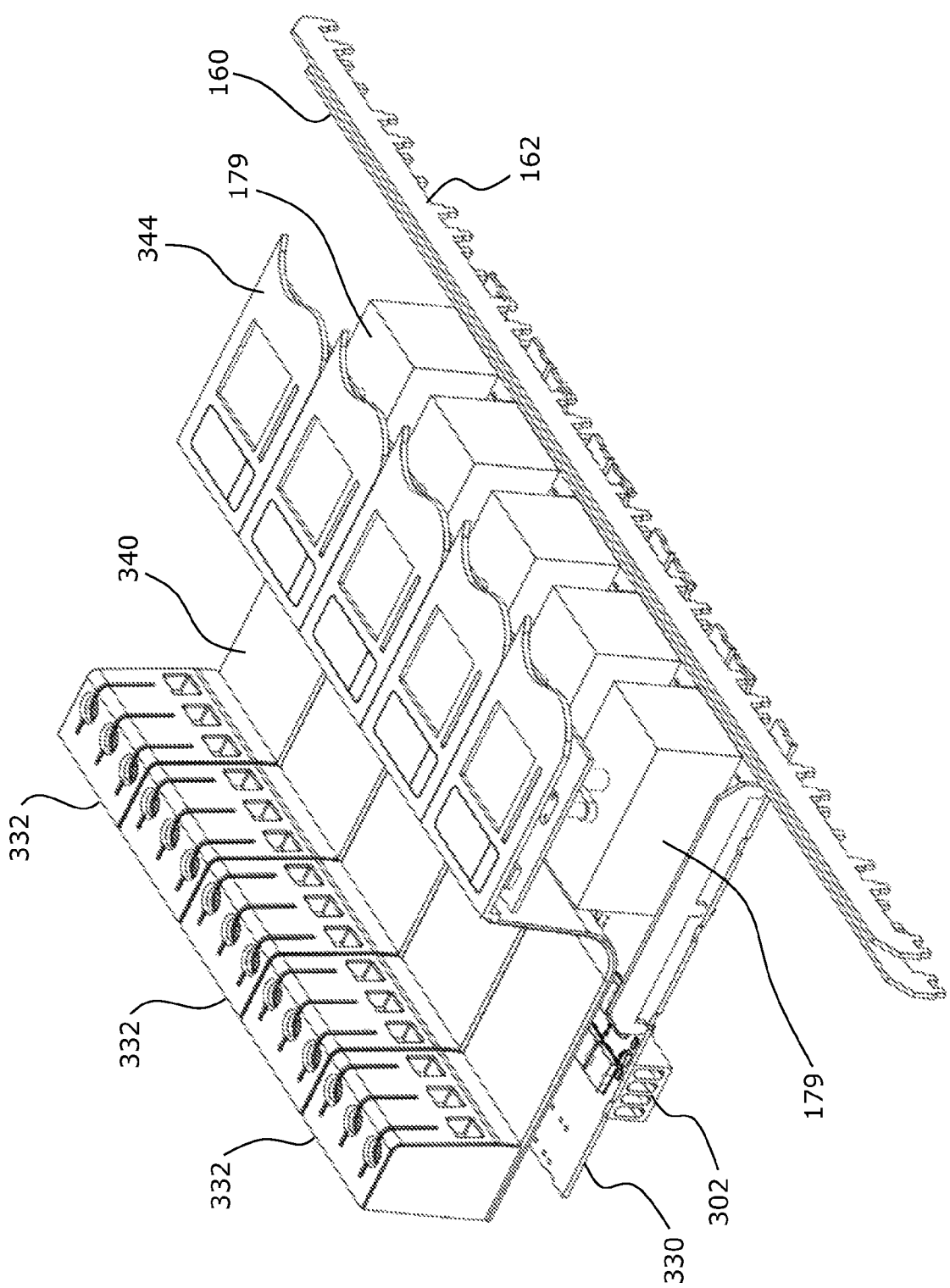
FIG. 14B is a partial perspective view of a protection module and bus bars in accordance with an embodiment.
Figure 14C:
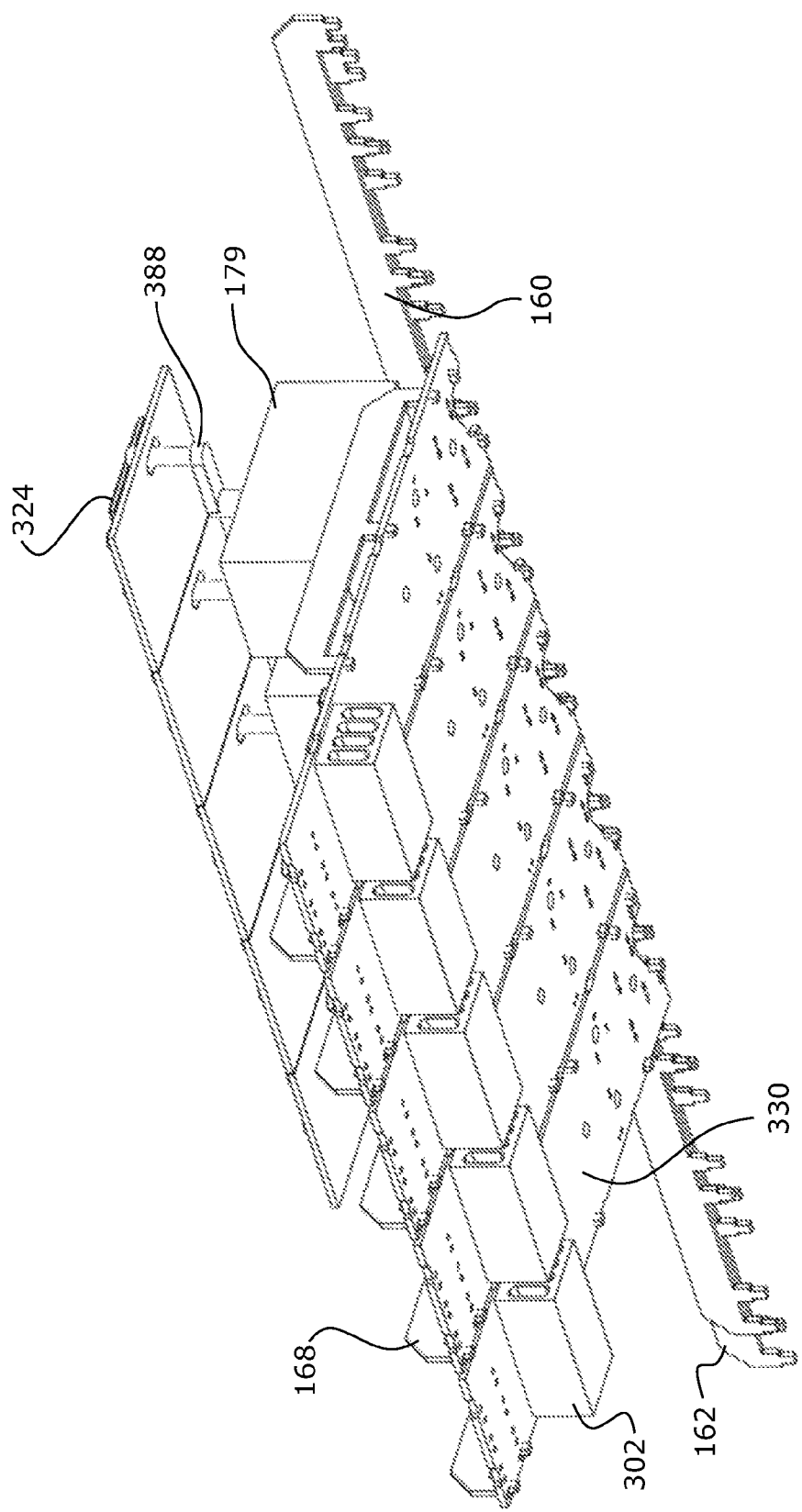
FIG. 14C is a partial perspective view from below of a protection module and bus bars in accordance with an embodiment.

A plurality of adjacent modules 100 is shown in FIG. 14. The combined effect of the depressions 338 of each module wall together form a cable tray 350. FIG. 14A shows another multiple arrangement of modules 100, with each module substantially as shown in FIG. 13A. Similarly, FIG. 14B shows an example of a plurality of modules, in which each module 100 is substantially as shown in FIG. 13B. FIG. 14C shows a rear isometric view of the arrangement of modules shown in FIG. 14A.

Figure 15:
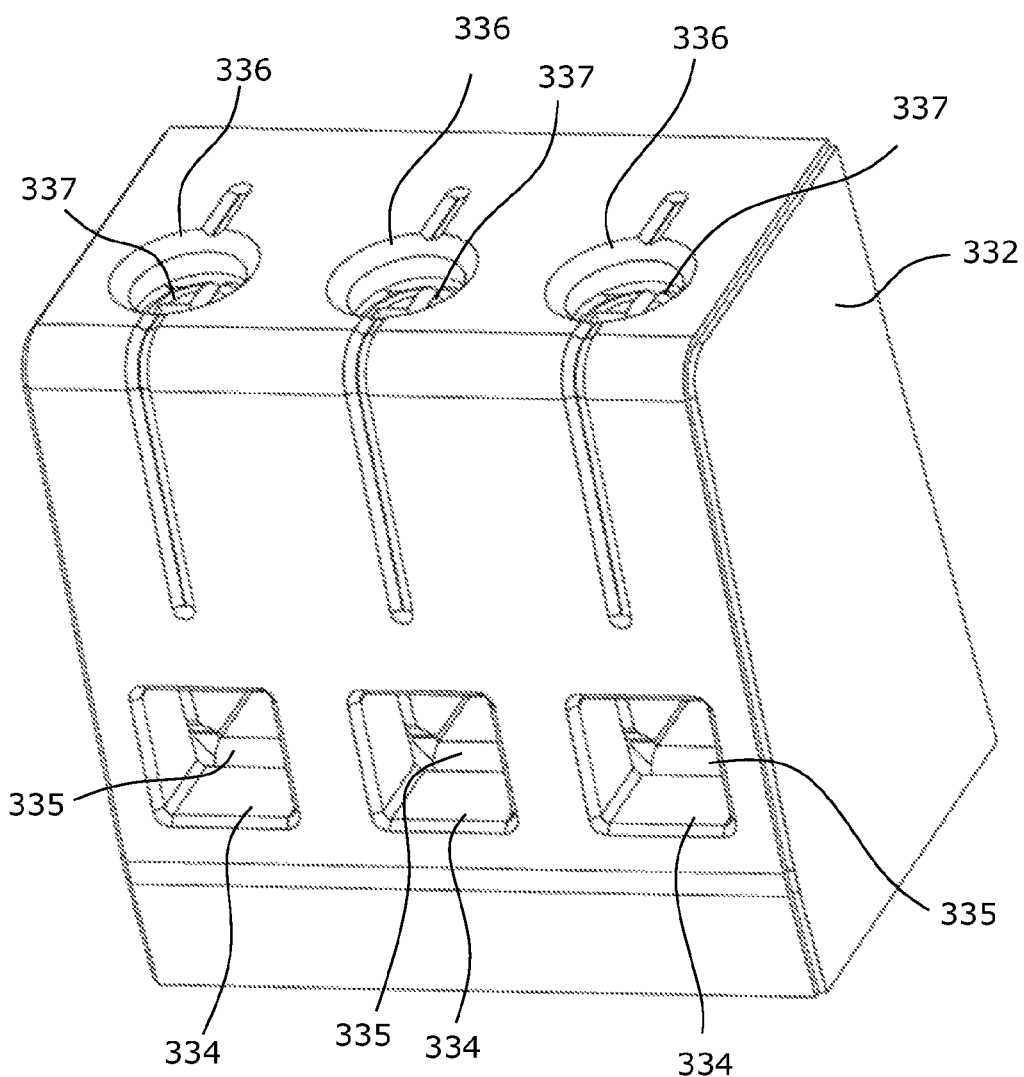
FIG. 15 is a partial perspective view of a connection or termination block in accordance with an embodiment.

FIG. 15 shows an example or embodiment of a termination block which has a plurality of sub-circuit terminations for connection to cables of a sub-circuit. The block 332 includes termination openings 334 configured to receive exposed conductors of phase, neutral and earth wires. The openings 336 allow access to locking mechanisms such as screw heads 337 which are operable to move electrical coupling elements such as conductors 335 of the termination block to make physical and electrical contact with wires presented in openings 334.

Figure 16A:
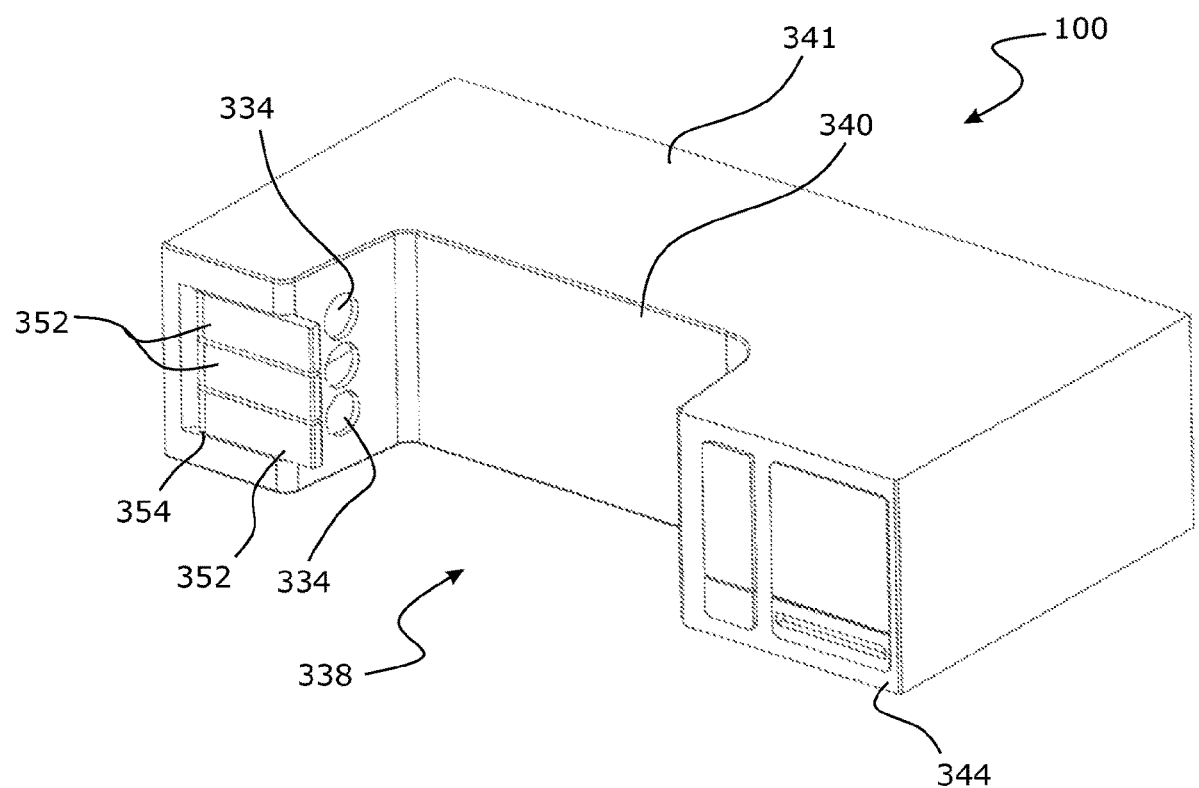
FIG. 16A is a partial perspective view of a protection module in accordance with an embodiment.
Figure 16B:
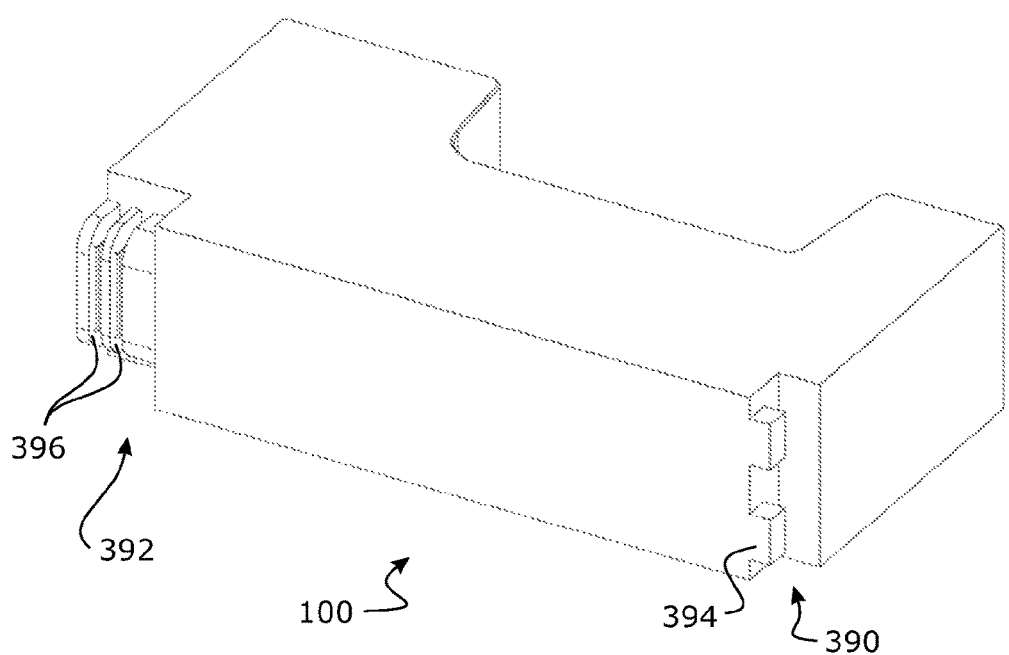
FIG. 16B is a partial perspective view of the protection module of FIG. 16A from the rear.
Figure 16C:
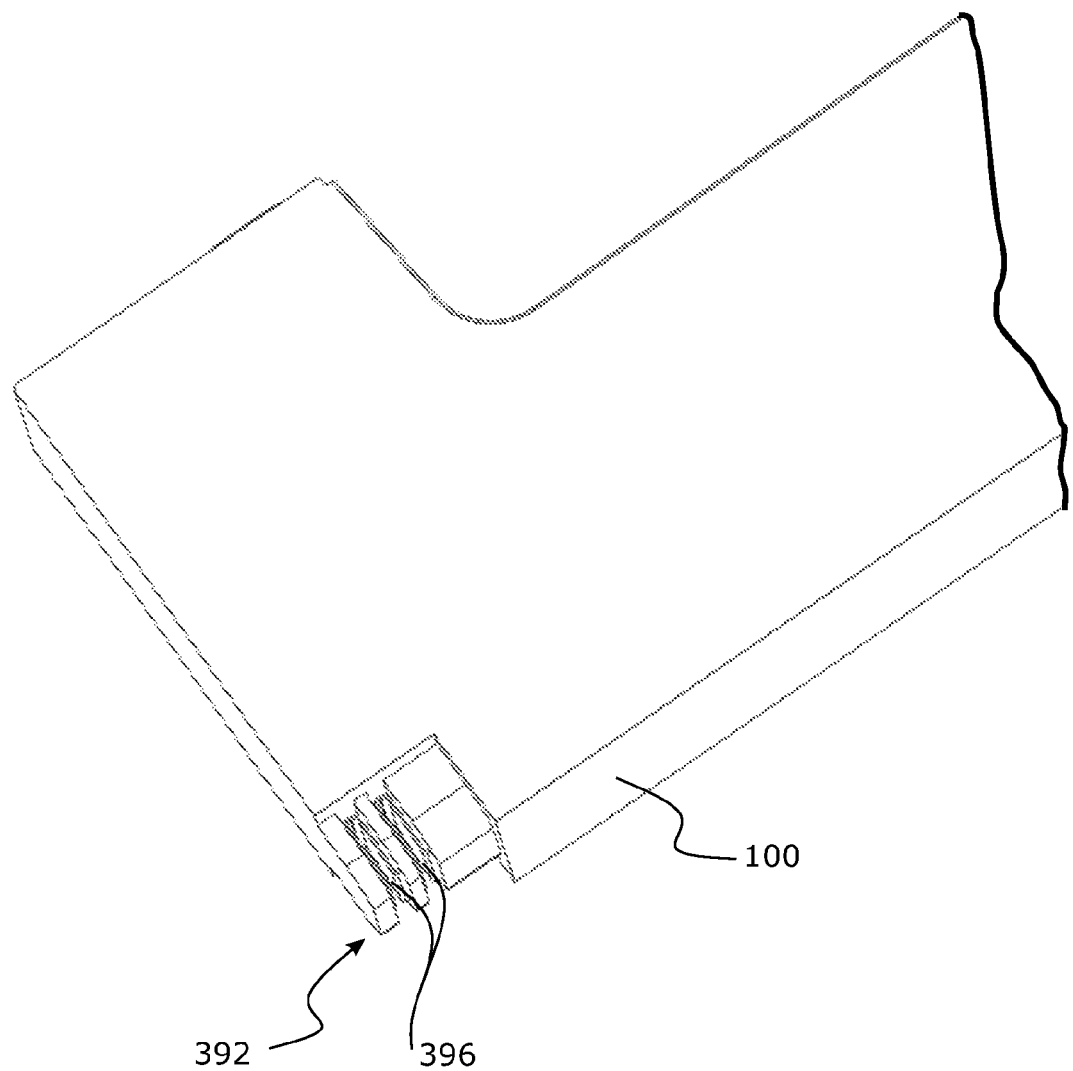
FIG. 16C is a partial perspective view of one end of the protection module of FIG. 16A.
Figure 17:
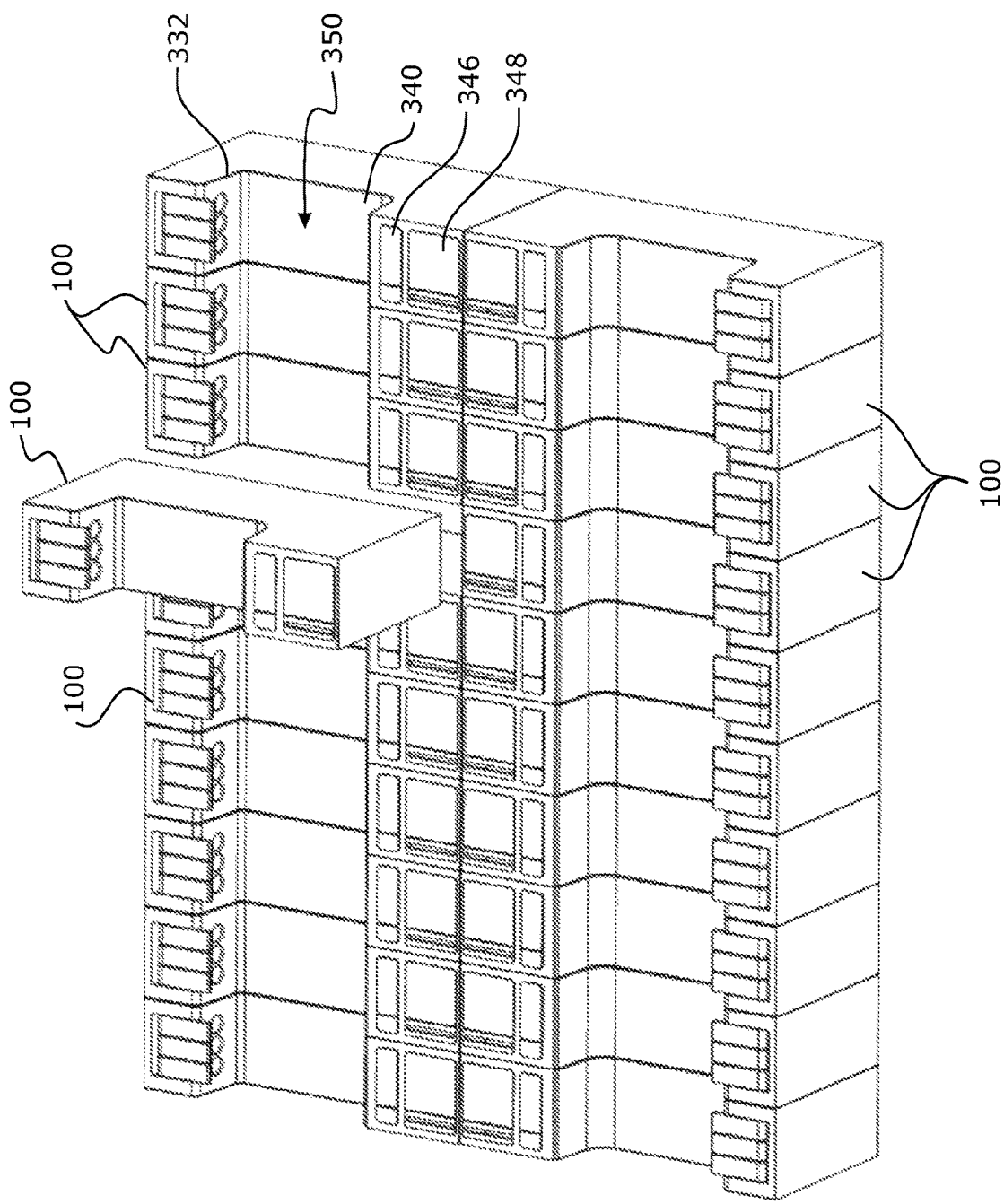
FIG. 17 is a partial perspective view of a group of circuit protection modules according to an embodiment.
Figure 17A:
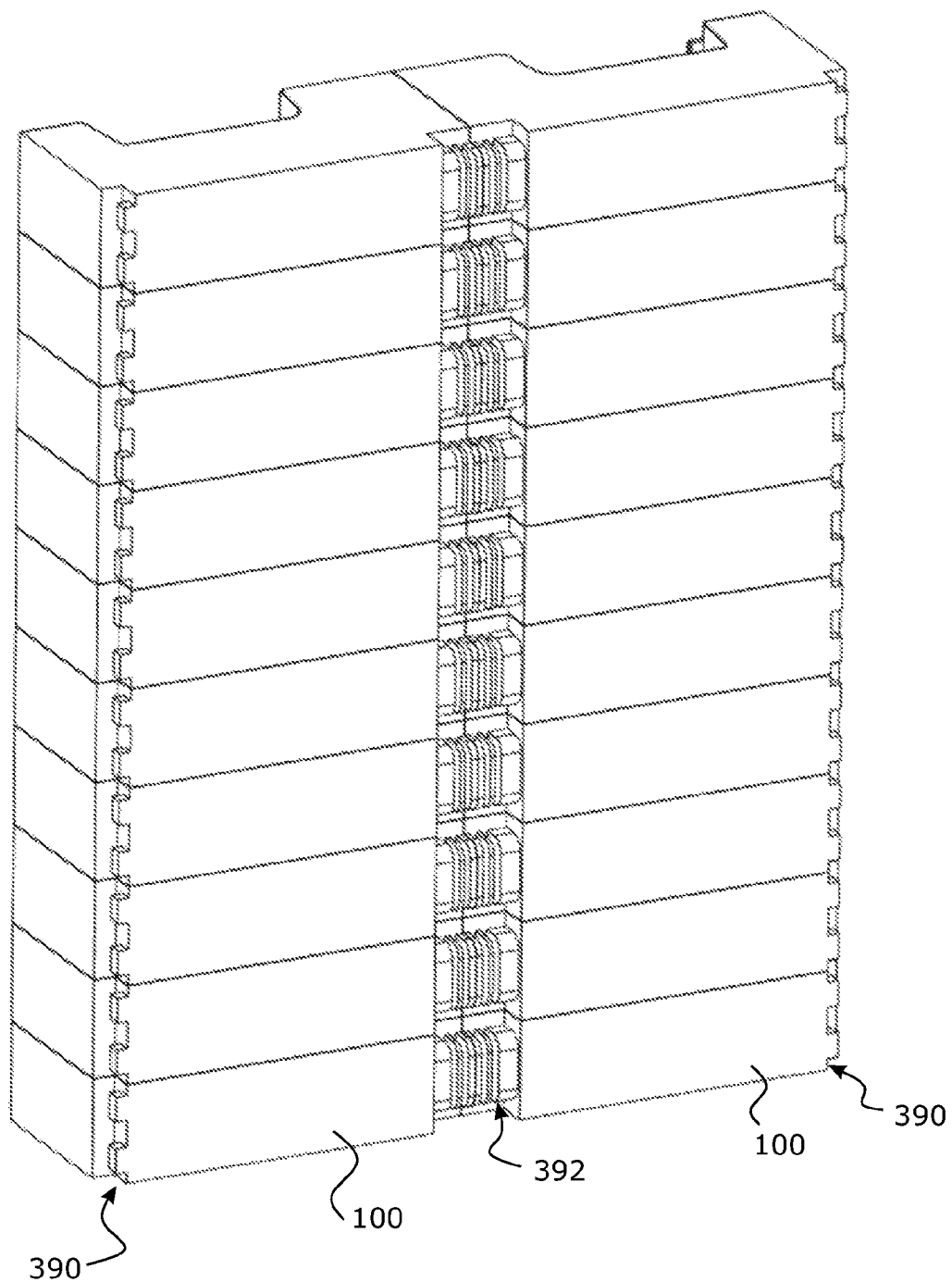
FIG. 17A is a partial perspective view of the group of circuit protection modules of FIG. 17 from the rear.
Figure 17B:
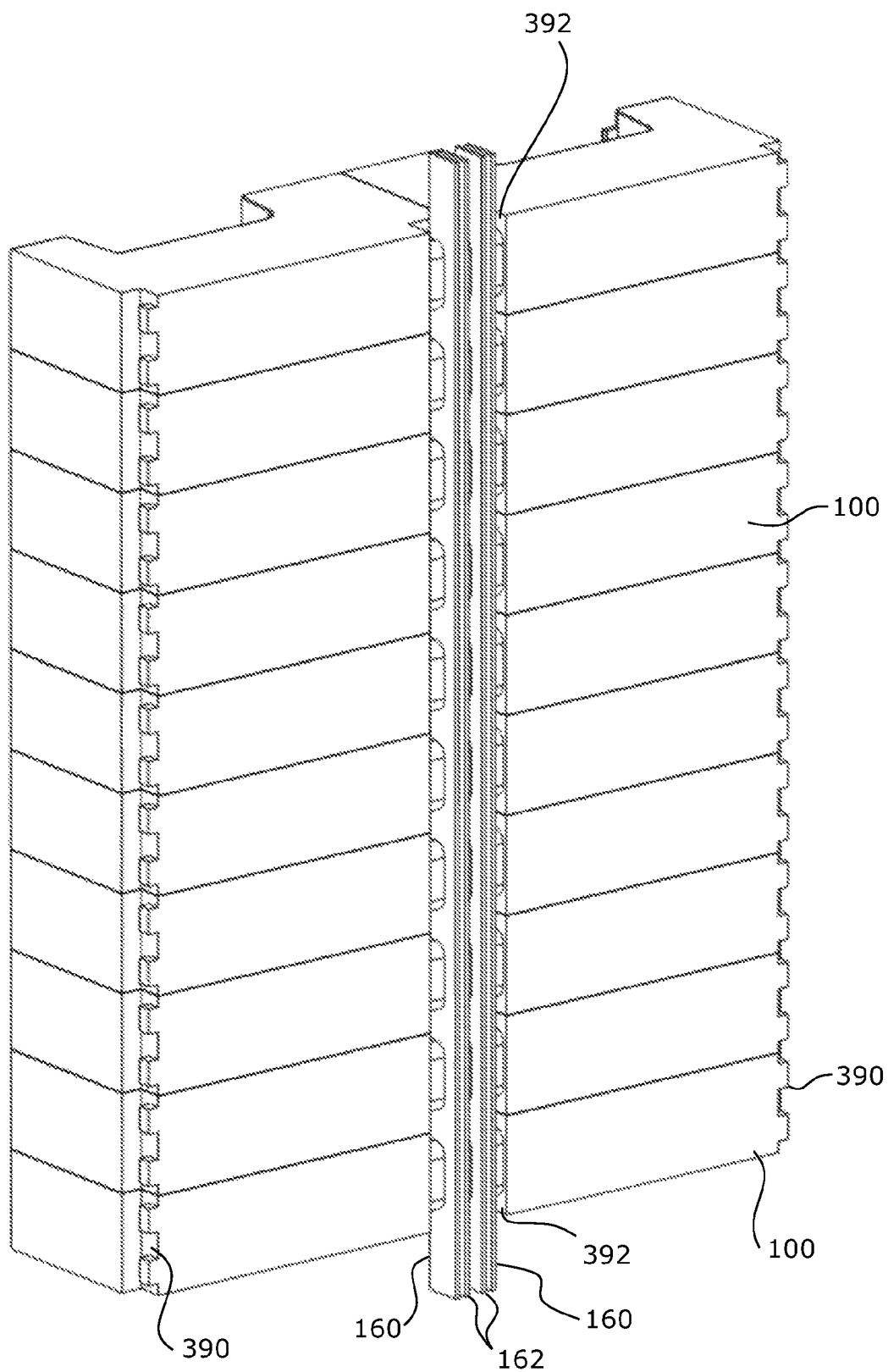
FIG. 17B is a partial perspective view of the group of circuit protection modules of FIG. 17A connected to bus bars.

Other termination or terminal blocks may be provided. Another example or embodiment is shown in FIGS. 16A-16C in which a module 100 is provided in accordance with the description above in respect of FIGS. 12-15, however the termination block is if a spring clamp or lever clamp form. Levers 352 rotate about exes 354 to clamp by a cam or spring action onto wires provided into openings 334. The module has connection formations 390 and 392 which in this example are provided at each end of the module. Region 390 has protrusions 394 that can mechanically engage with a complementary recess provided on the switchboard. Region 392 has recesses 396 that each include one or more conductive portions. These are configured to receive and electrically connect t the bus bars As described above, these modules may be mounted adjacent to each other in a side by side relationship. This is shown in the example of FIG. 17. Referring to FIG. 17, there are two rows of modules 100. Each row has modules connected adjacent to each other in a side by side relationship. The two rows of modules are provided in a back to back relationship. Thus the busbars 160, 162 may run centrally underneath the two rows, with each row being electrically connected to the bus bars. In some embodiments the modules 100 by be prewired in place. In some embodiments individual modules may be removed as shown in FIG. 17 so that they may be maintained or replaced as necessary. It will be seen that the arrangement of modules shown in FIG. 17 allows a cable tray 350 to be provided by, or in association with, each row of modules. The rows of modules provide a row of termination connections or electrical coupling elements which is parallel to the or each cable tray. It will be seen that a row of termination connections may be provided by a long termination block such as that described above under by reference numeral 12, and modules 100 may be pre-connected, or plugged into, the termination block at one end and the bus bars at the other. Moreover, as will be apparent from the drawings in the description below, the terminal connections or literal coupling elements such as 335 for example are grouped according to sub-circuit connection. In other words, each sub-circuit cable (which will include at least two and usually three insulated conductors) can be completely terminated using the adjacent coupling elements 335. Therefore, the phase and neutral conductors or the phase, neutral and as conductors for each sub-circuit cable can be terminated conveniently. This means the electrician or person connecting the sub-circuit cables can cut the cable at the required length and make determinations without having to have varying conductor lengths that follow different paths around the installation. This saves significant time and simplifies the process. Furthermore, since each circuit protection device or module is configurable, all of the sub-circuit terminations can be made and then appropriate configuration can be made to each module based on the requirements for the load (or generation source) on the sub-circuit.

Figure 18:
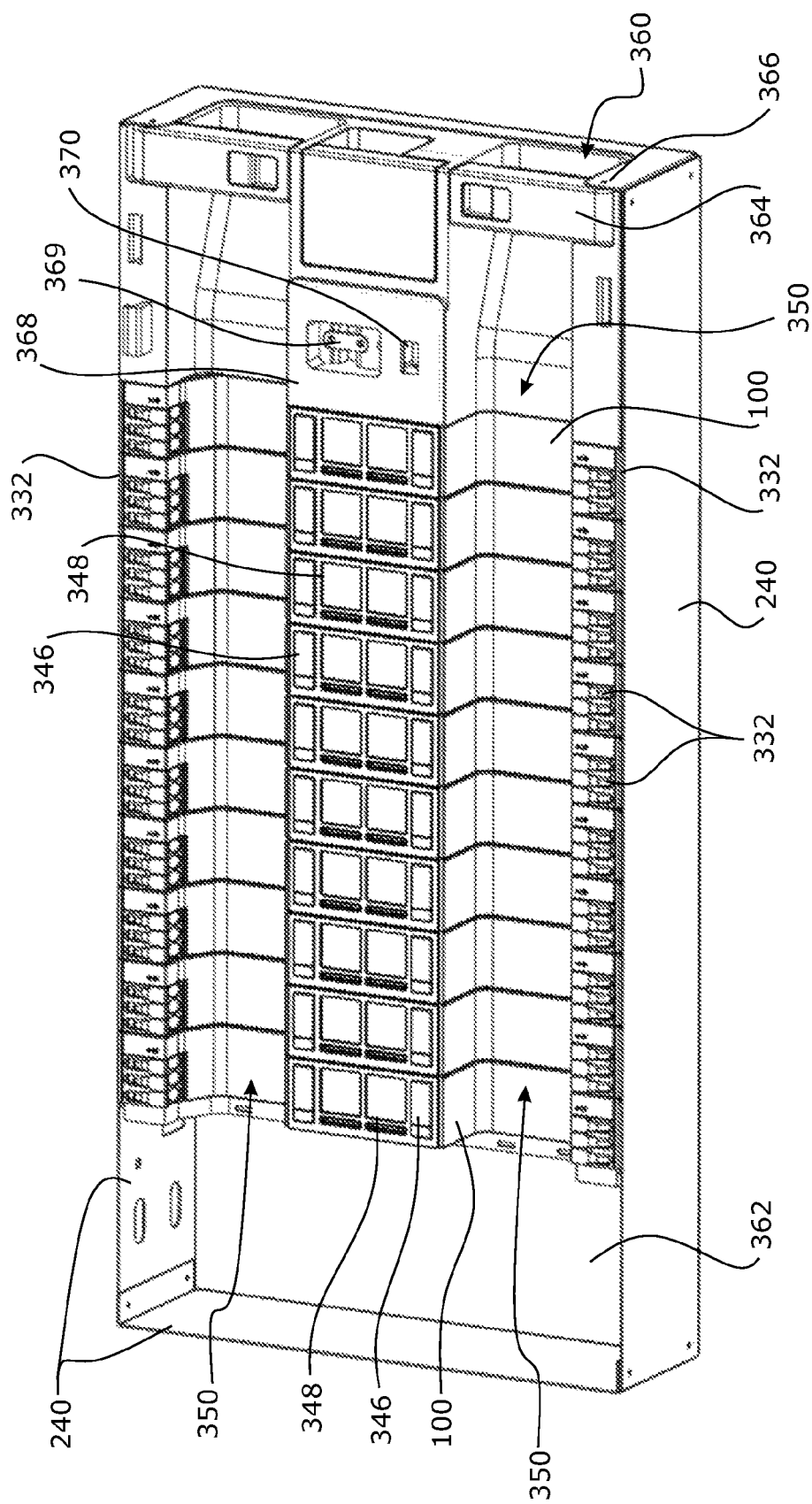
FIG. 18 is a partial perspective view of a switchboard according to an embodiment.

Turning now to FIG. 18 an embodiment or example is portrayed in which two rows of modules 100 are provided in a switchboard housing 240. The housing 240 is shown without a cover for clarity. A cover, door or similar closure may be provided as a separate component. In use the housing 240 is, or forms part of, a power distribution unit cabinet or a switchboard enclosure and/or cabinet.

Unit 368 provides the mains connection and isolation modules, and a central power isolation switch 370. A multiple earth neutral (MEN) link 369 is provided. This is conveniently located in an area of the housing which is easily accessed (for example in the vicinity or as part of the mains isolation module). The link can be easily removed or fitted as required. Cavity 362 at the base of the housing 240 provides space for other components such as a controller, communications interface, metering etc. Cable entrance and exit passageways 360 are provided which have closures 364 that pivot about end or axis 366 to secure the cables and to provide a seal about the cables to help to physically isolate the contents of the housing from the external environment, as will be described further below.

Figure 19:
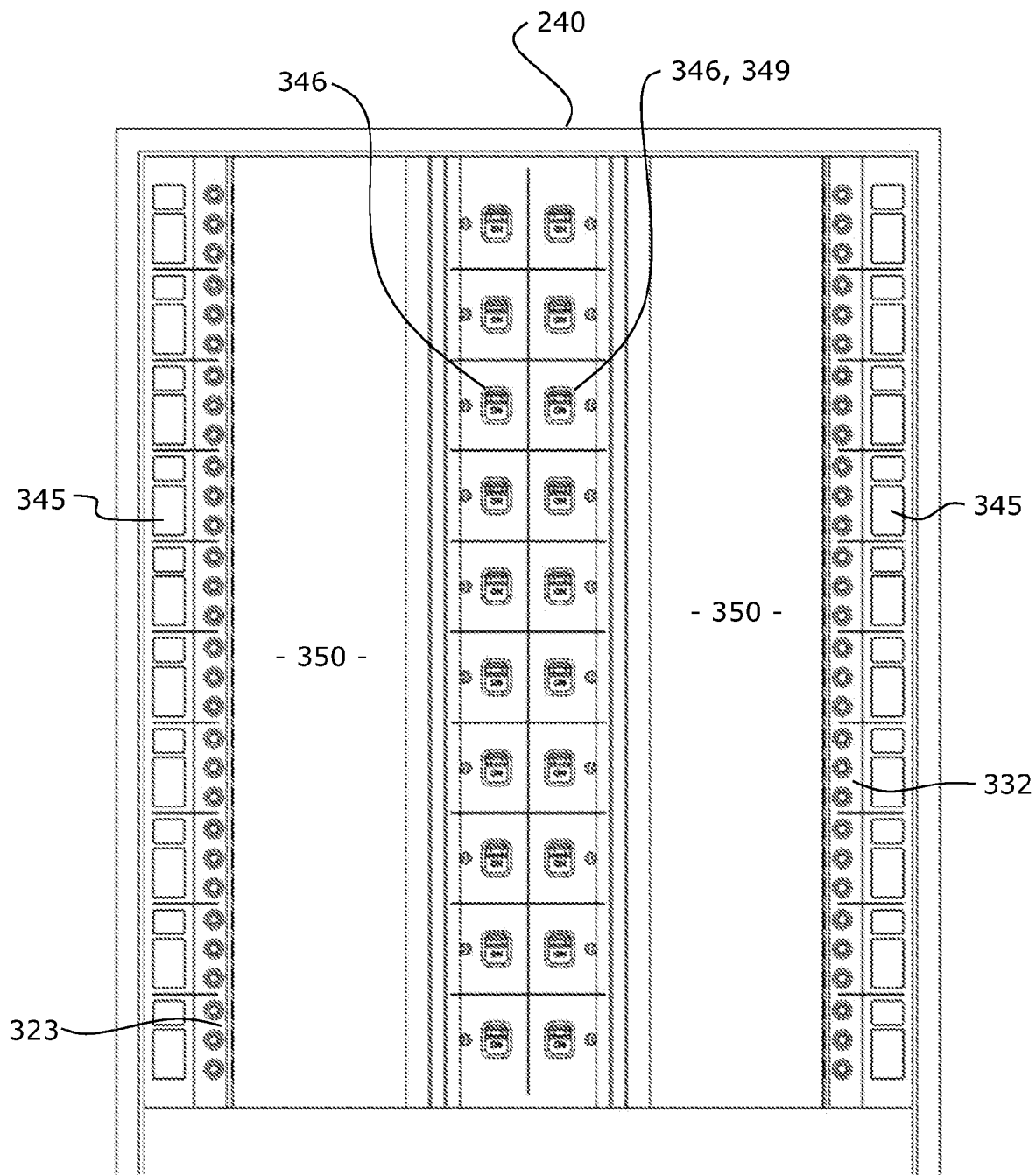
FIG. 19 is a partial front view of a switchboard according to an embodiment.

FIG. 19 shows a front elevation of an embodiment or example of the switchboard including assembled modules. In this Figure, the termination blocks 332 are provided peripherally or are mounted at or adjacent to the sides of the housing.

Figure 20:
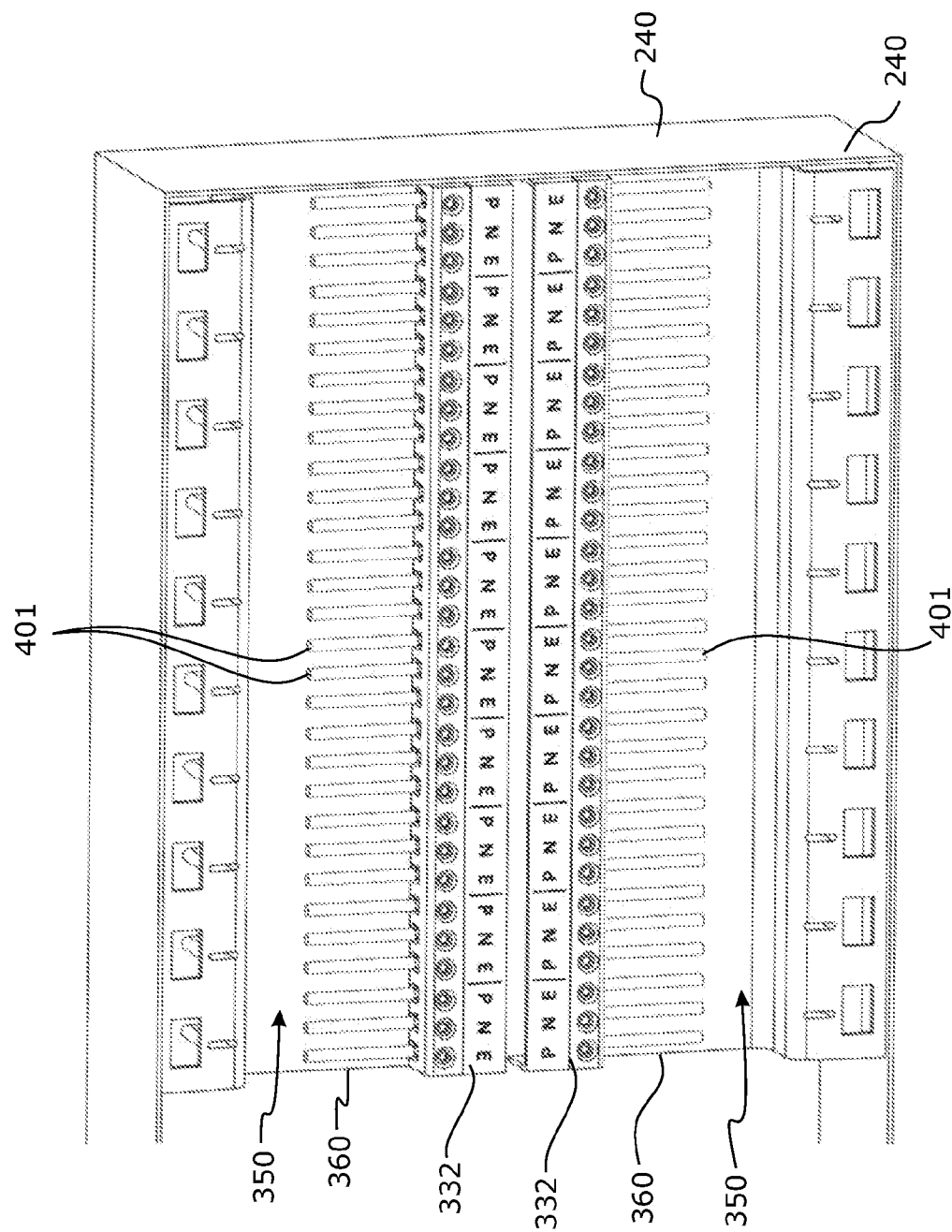
FIG. 20 is a partial perspective view of a switchboard according to an embodiment.

FIG. 20 shows a front elevation of an embodiment or example of the switchboard including assembled modules. In this Figure, the termination blocks 332 are provided centrally or are mounted at or adjacent centre of the housing.

It will be apparent that the switchboard may be mounted in use vertically or horizontally i.e. the modules 100 can provided in use in rows that extend horizontally or vertically. In some situations, dependent on regulations and requirements, the switchboard may be mounted flat.

Figure 21:
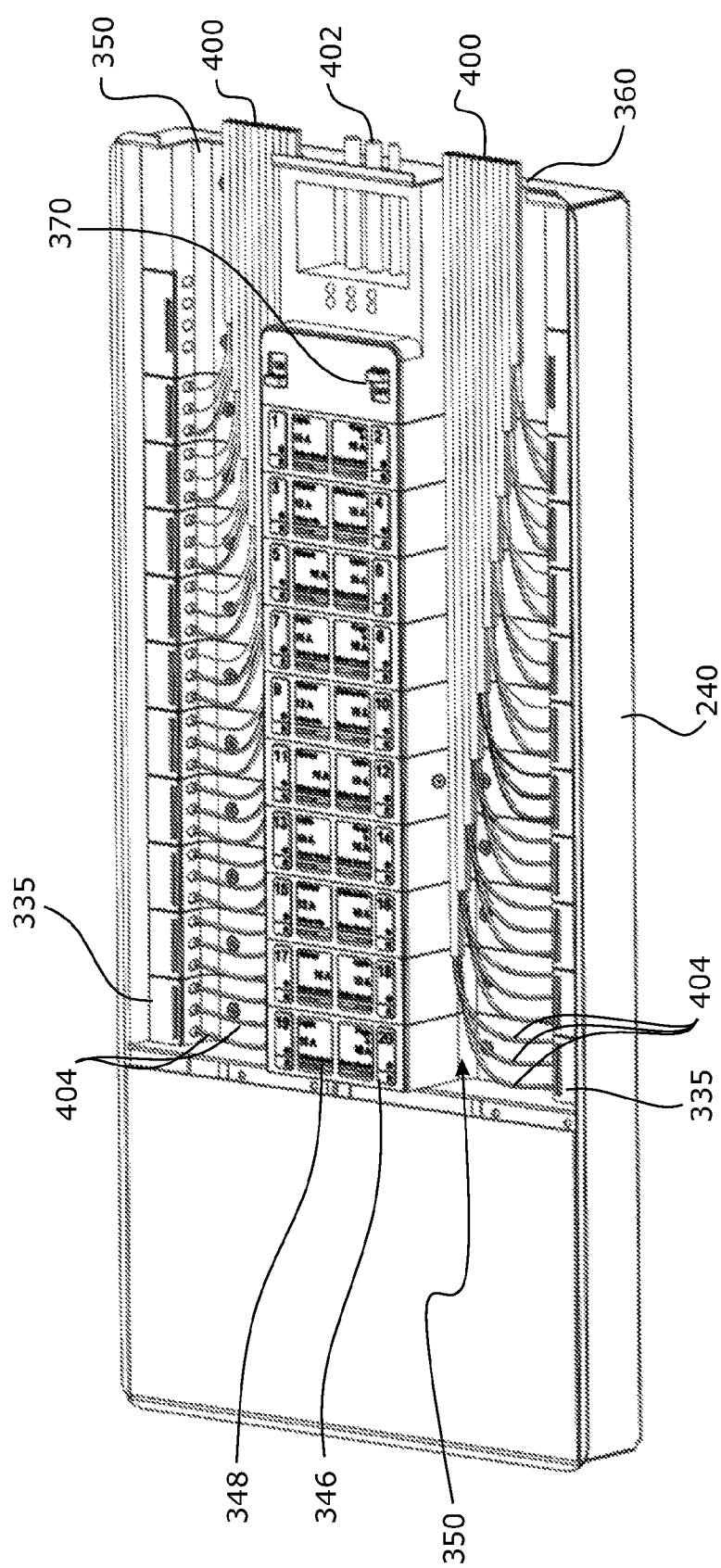
FIG. 21 is a partial perspective view of a switchboard according to an embodiment.

FIG. 21 shows a switchboard with cables 400 entering though openings or passageways 360 at one end of the housing 240 and extending along the cable trays 350, so that individual wires 404 of each cable are terminated at the appropriate positions in the termination blocks. The cables extend transversely as they enter the housing relative to the orientation of each module 100 i.e. the cable trays 350 extend substantially transversely or perpendicularly relative to the longitudinal axis of each module 100.

Figure 22:
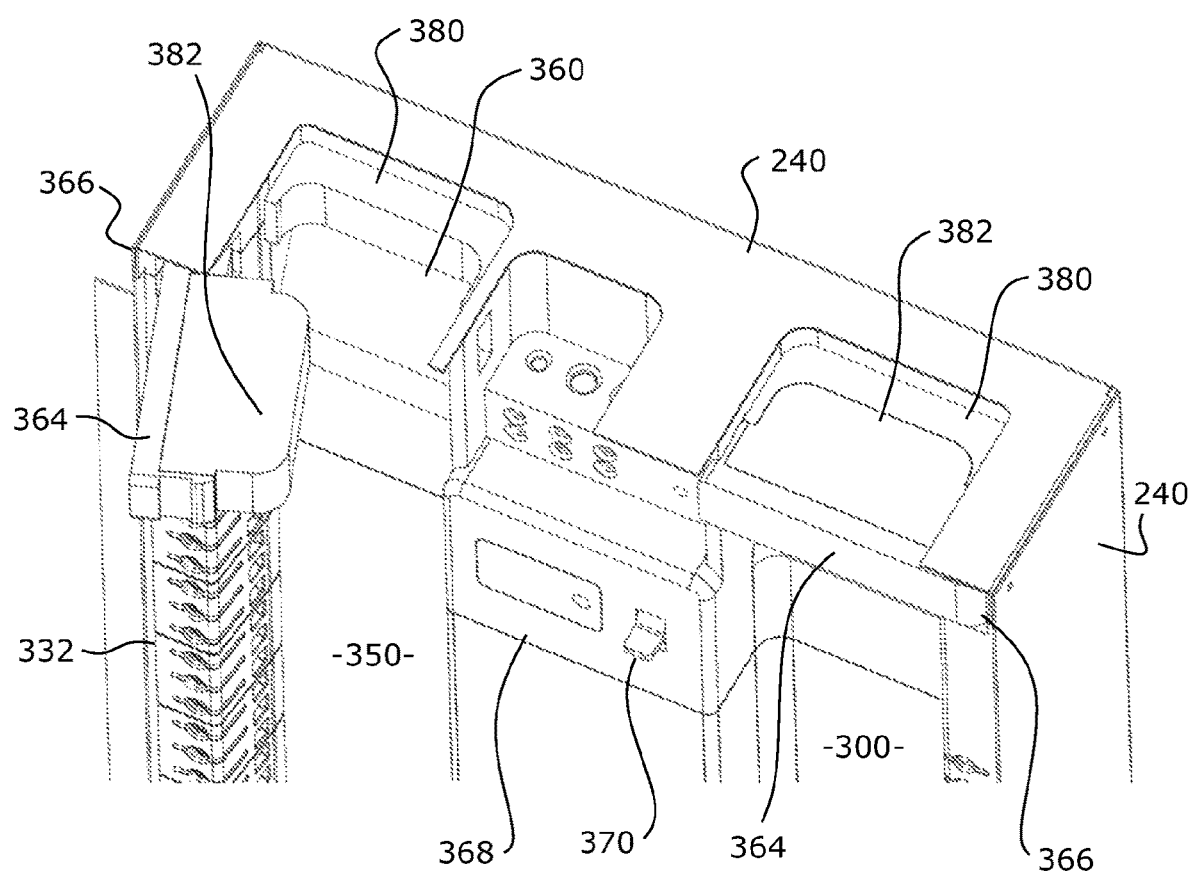
FIG. 22 is a partial perspective view of a switchboard according to an embodiment.

In FIG. 21 the closure members 364 are not shown for clarity. However, FIG. 22 shows the closure arrangement in some detail. Each cable entrance passageway 360 is provided with a liner or cushion 380 of a suitably resilient material such as a closed cell foam. Bristles or similar materials may also be used. Small gaps (for example less then 5 mm) may be present. Similarly, the interior face of each closure 364 in lined with a layer 382 of the same or a similar resilient material to that of liner 380. During cable installation the closures 364 are open, as shown in the left-hand side of FIG. 22. Once cables 400 have been installed, the closures 364 are rotated about pivot end or axis 366 to close them as shown on the right-hand side of the figure. Closing the members 364 has the effect of securely sandwiching the cables between the layers 380 and 382 of resilient material, thus securing the cables and providing a seal about the cables to help to physically isolate the contents of the housing from the external environment. In some examples the material from which layers 380 and 382 are formed is a fire-retardant material. It will be understood that a closure door of the housing 240 may provide the closure members 364. In other words, a door of the housing can carry layer 382.

3.2 Switchboard and Installation

Figure 23:
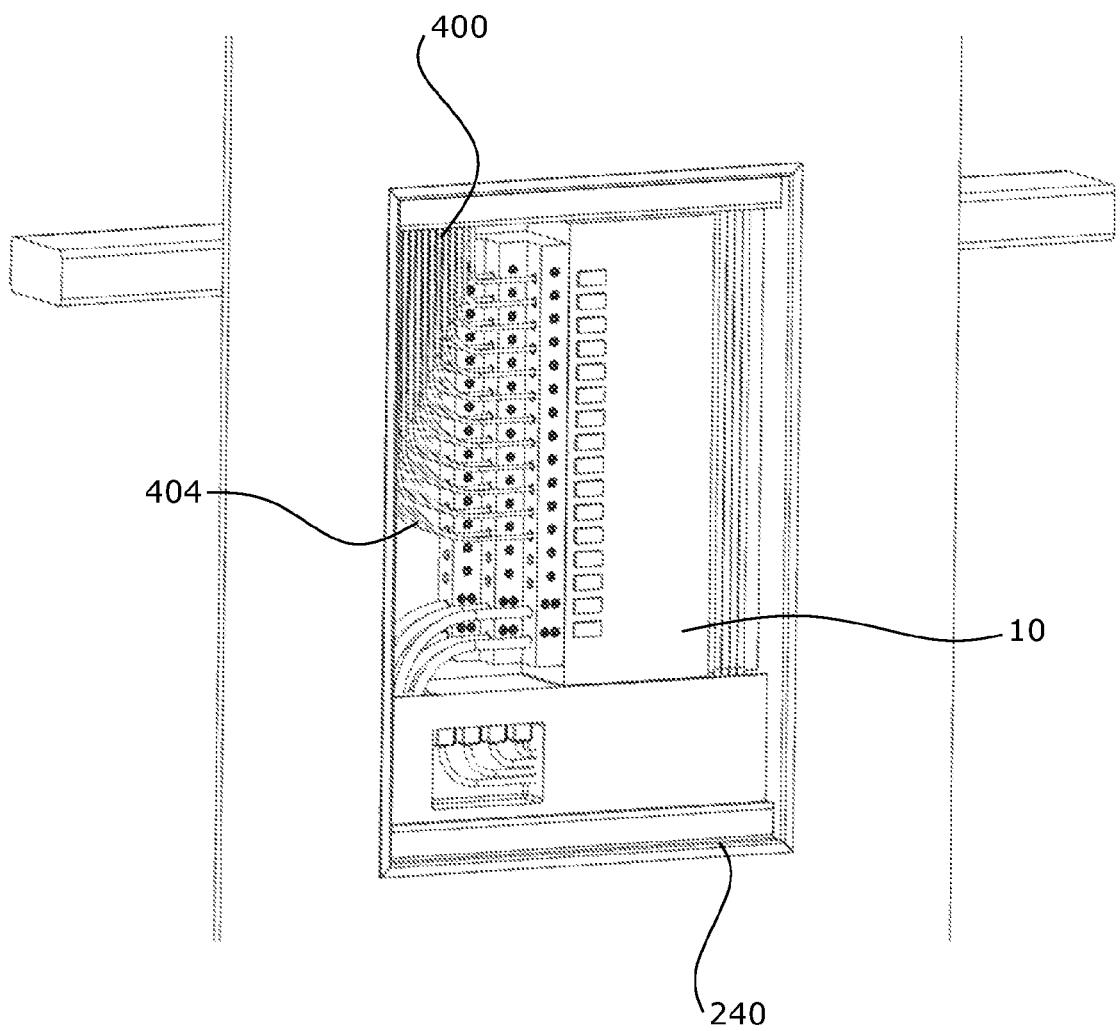
FIG. 23 is a perspective view of a switchboard according to an embodiment, illustrating possible installation.

The sub-circuit connection system 10 is configured to form a component of a residential switchboard or power distribution and management system. In an embodiment, the sub-circuit connection system 10 is further configured to be housed in a power distribution unit cabinet or a switchboard enclosure and/or cabinet. An example of use and installation of a switchboard including sub-circuit board 10 (as shown in FIGS. 10 and 11) is illustrated in FIG. 23.

The sub-circuit connection system 10 is configured to allow the wire 404 terminal ends from a sub-circuit to be easily installed or wired by an electrician to a residential switchboard or power distribution and management system. The spaced connection layers 14a, 14b, 14c of the housing 12 are intended to provide ease of installation of one or more sub-circuits, with the coupling elements or termination points for the conductors in each sub-circuit cable being grouped together i.e. located adjacent to each other so that the cable is easily cut to length and terminated without any complex cable paths needing to be adopted.

A method of connecting one or more external sub-circuits to the sub-circuit connection system 10 comprises: connecting the wire terminal end of one or more sub-circuit conductors to each of the plurality of sub-circuit conductor terminations 16a, 16b, 16c using the corresponding electrical coupling elements. The one or more external sub-circuits installed as a part of the method may comprise or have any one or more features mentioned in respect of the one or more external sub-circuits of the previous embodiments of the invention.

A method of installing a sub-circuit connection system 10 in a residential switchboard or power management system is also provided, the method comprising the steps of: connecting the wire terminal end of one or more sub-circuit conductors to each of the plurality of sub-circuit conductor terminations 16a, 16b, 16c using the corresponding electrical coupling element; and connecting each sub-circuit input termination 16a, 16b, 16c to a power distribution bus 20b, 20c and/or a ground connection 20a.

Referring now to FIGS. 23A-23D, installation according to one embodiment shown graphically. Beginning with FIG. 23A, a preassembled switchboard according to an embodiment of the invention as shown having housing 240 and a plurality of circuit protection devices such as modules 100, each module ending in a termination block 332 which has a plurality of coupling elements 334, 336 which therefore provide coupling elements grouped by sub-circuit. The cable channels or trays 350 are also shown. The switchboard is shown in FIG. 23 a substantially in a form which may be purchased ready for installation.

Figure 23A:
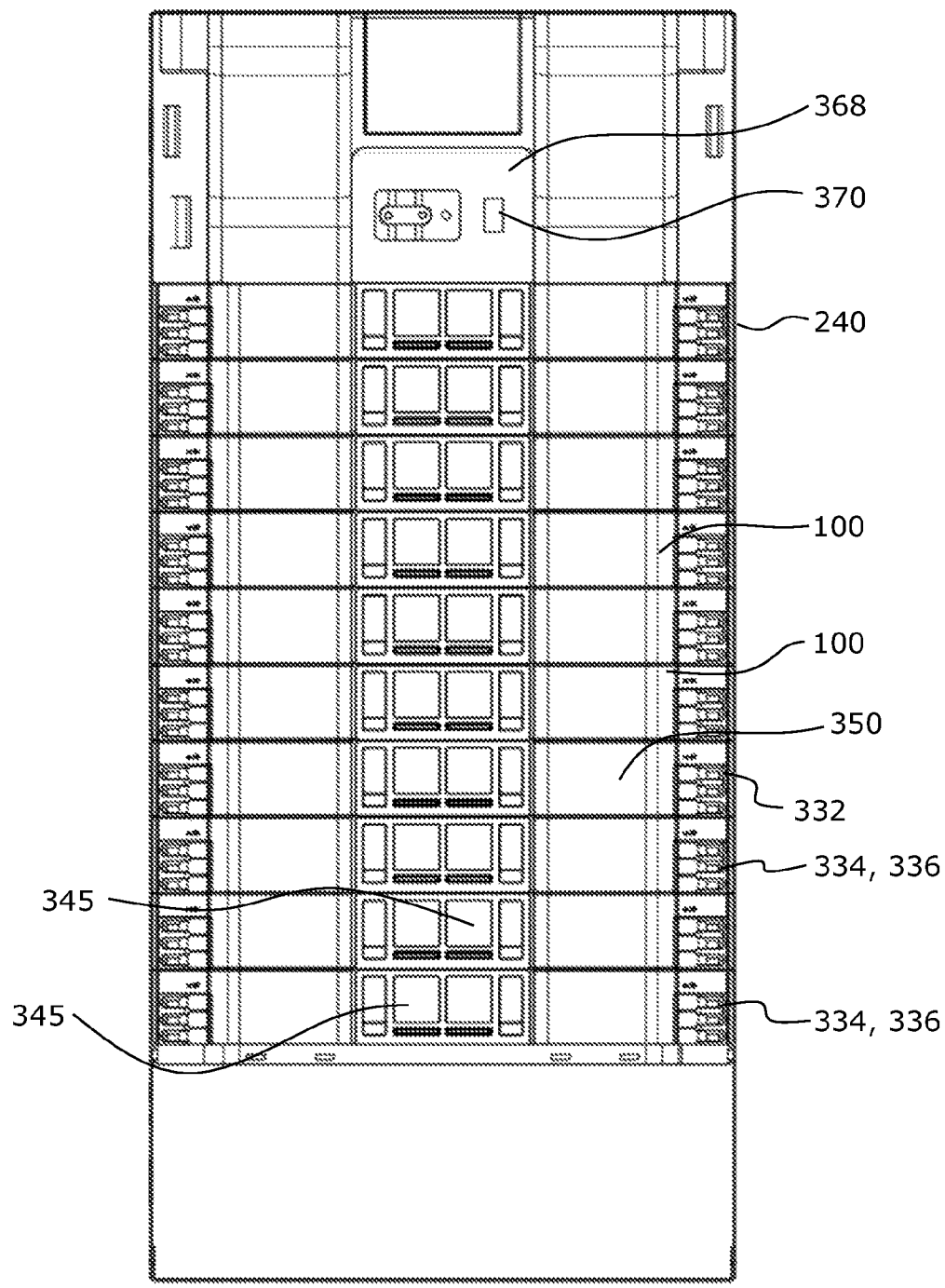
FIGS. 23A-23D show front views of a switchboard according to an embodiment in stages of installation.
Figure 23B:
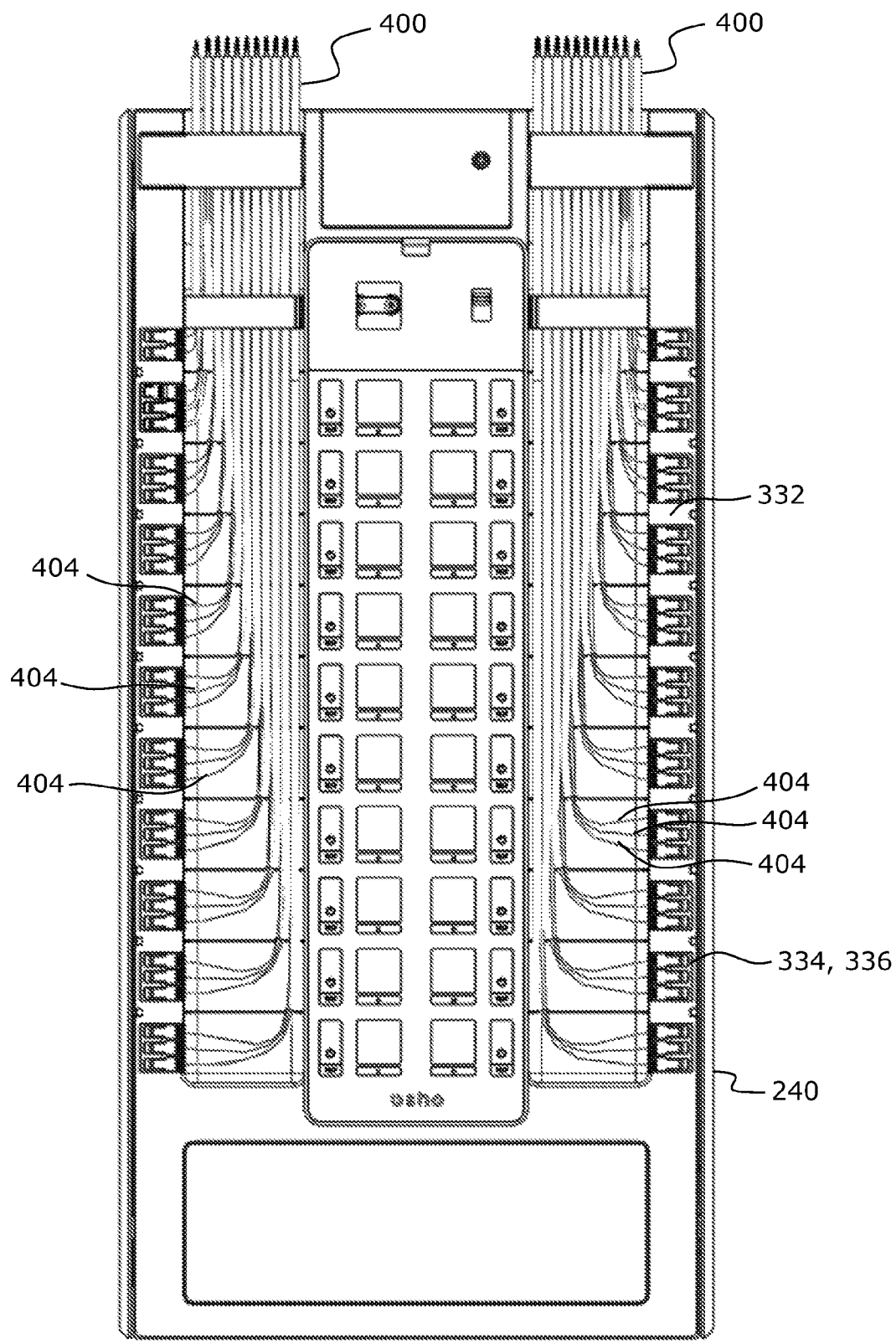

Turning out of FIG. 23B, the switchboard of FIG. 23A is shown with the sub-circuit cables 400 having been introduced into the switchboard housing, with each sub-circuit cable 400 being terminated at the coupling elements for the corresponding circuit protection device or module. The grouping of the coupling elements 334, 336 according to each sub-circuit is clearly illustrated.

Figure 23C:
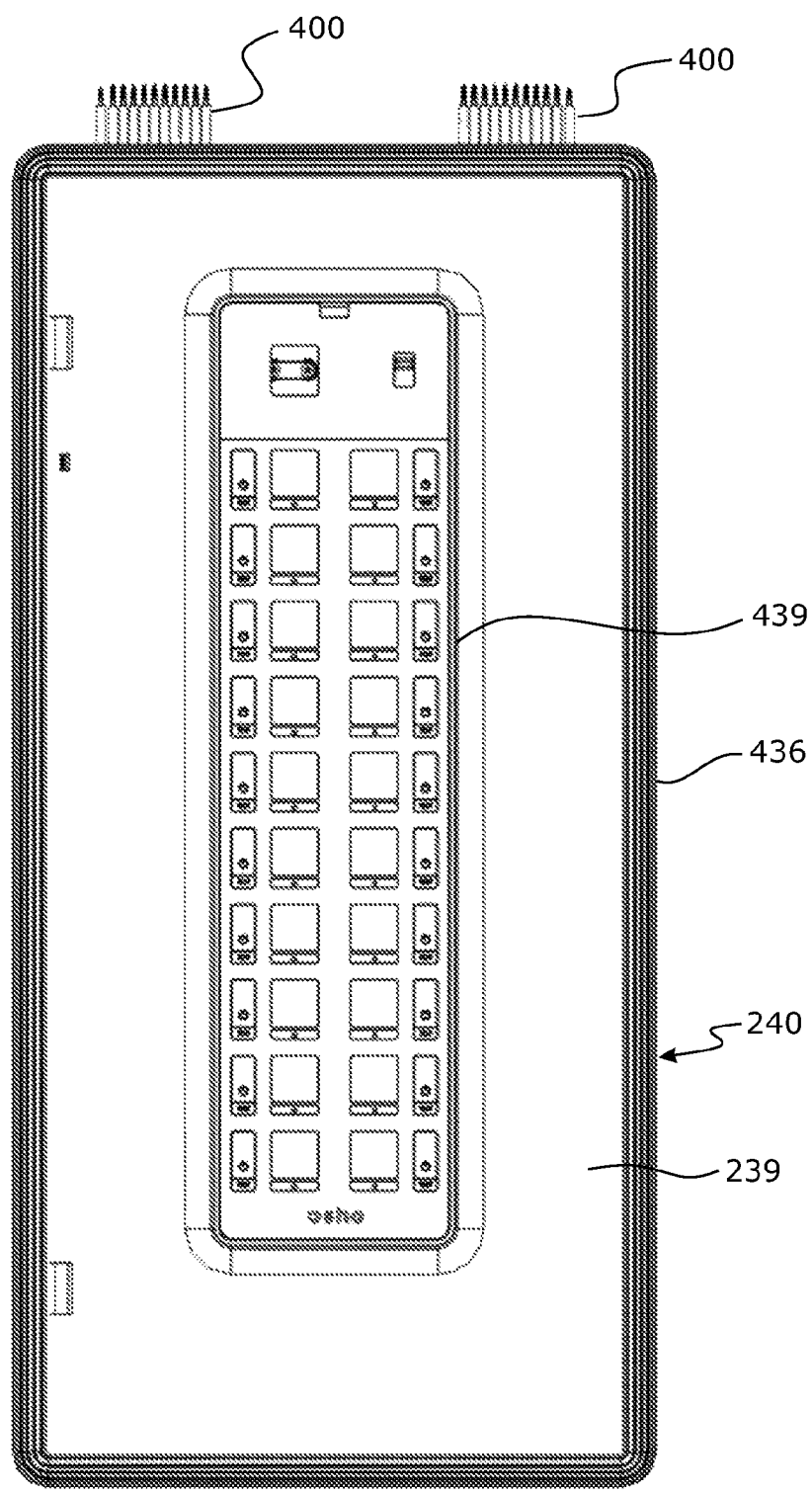

In FIG. 23C the next step in the installation as shown in which a cover 239 is placed over the housing 240. The cover 239 has a central aperture 439 which allows a user to interact with the circuit protection devices for example switching the devices honor for looking at the status of the devices is displayed. The cover 239 provides a protective installation portion exteriorly of the central aperture 439 which protects the user from contact with the connection blocks or connection coupling elements 334336. The cover 239 also provides optional venting 436.

Figure 23D:
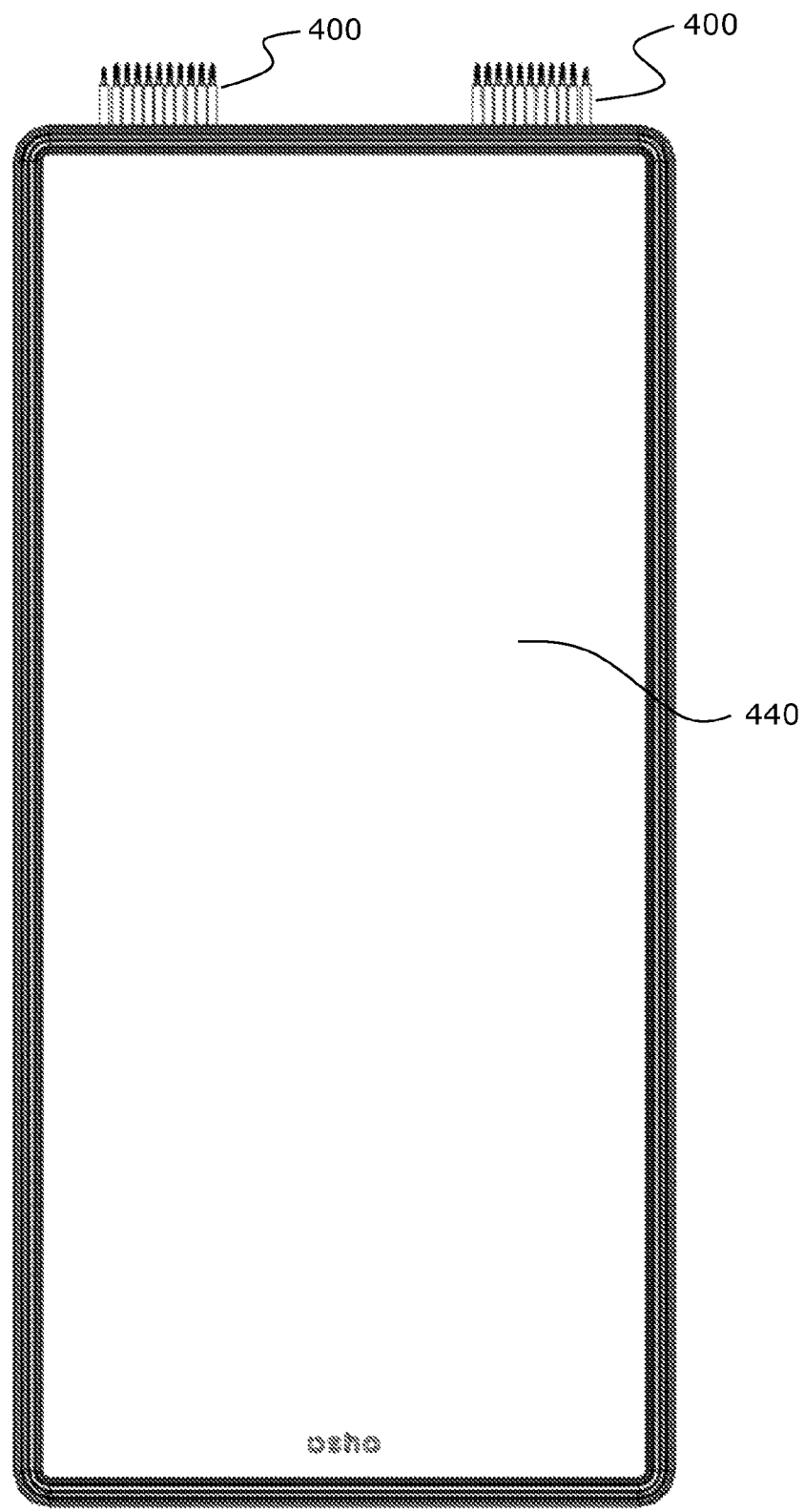

In FIG. 23D the installation is complete with the housing closure for 440 (which may be pivotally connected to the remainder of the housing) closed in place.

Figure 24:
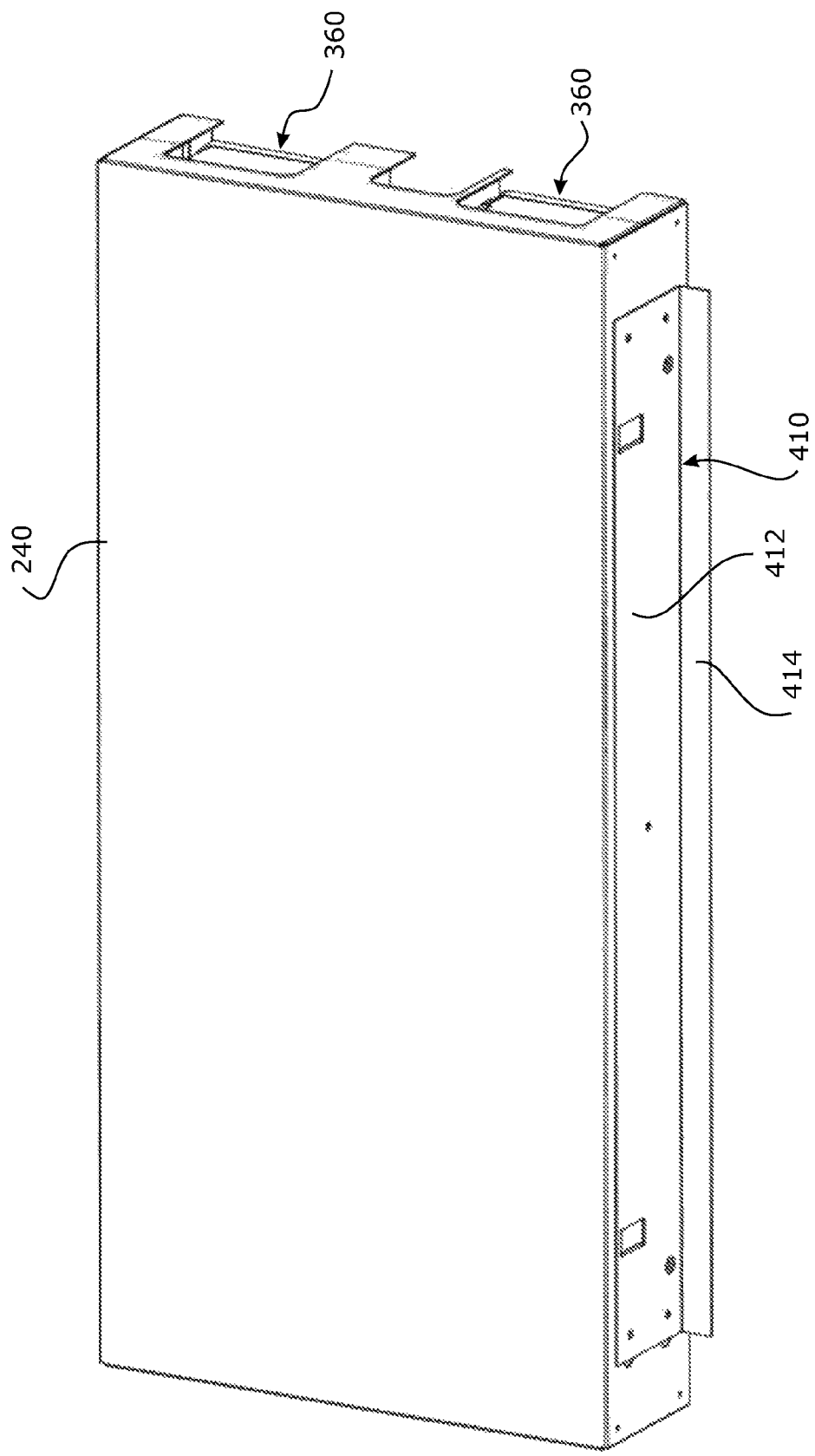
FIG. 24 shows a rear perspective view of a switchboard according to an embodiment.

The housing 240 may be flush mounted or surface mounted in or on an appropriate structure such as an internal or external wall. Surface mounting can be achieved using fasteners that pass though apertures or mounting lugs of the housing. Referring to FIG. 24, housing 240 may include as either part thereof, or as a separate component, a mounting member 410 that can facilitate flush mounting. Member 410 has a side wall 412 for engagement with a side wall of the housing 240, and a flange member 414. In use flange member 414 can sit against an object such as a wall framing member (e.g. a nog or stud) to allow the housing 240 to sit at a required distance into the wall and thus enable flush mounting.

Figure 25:
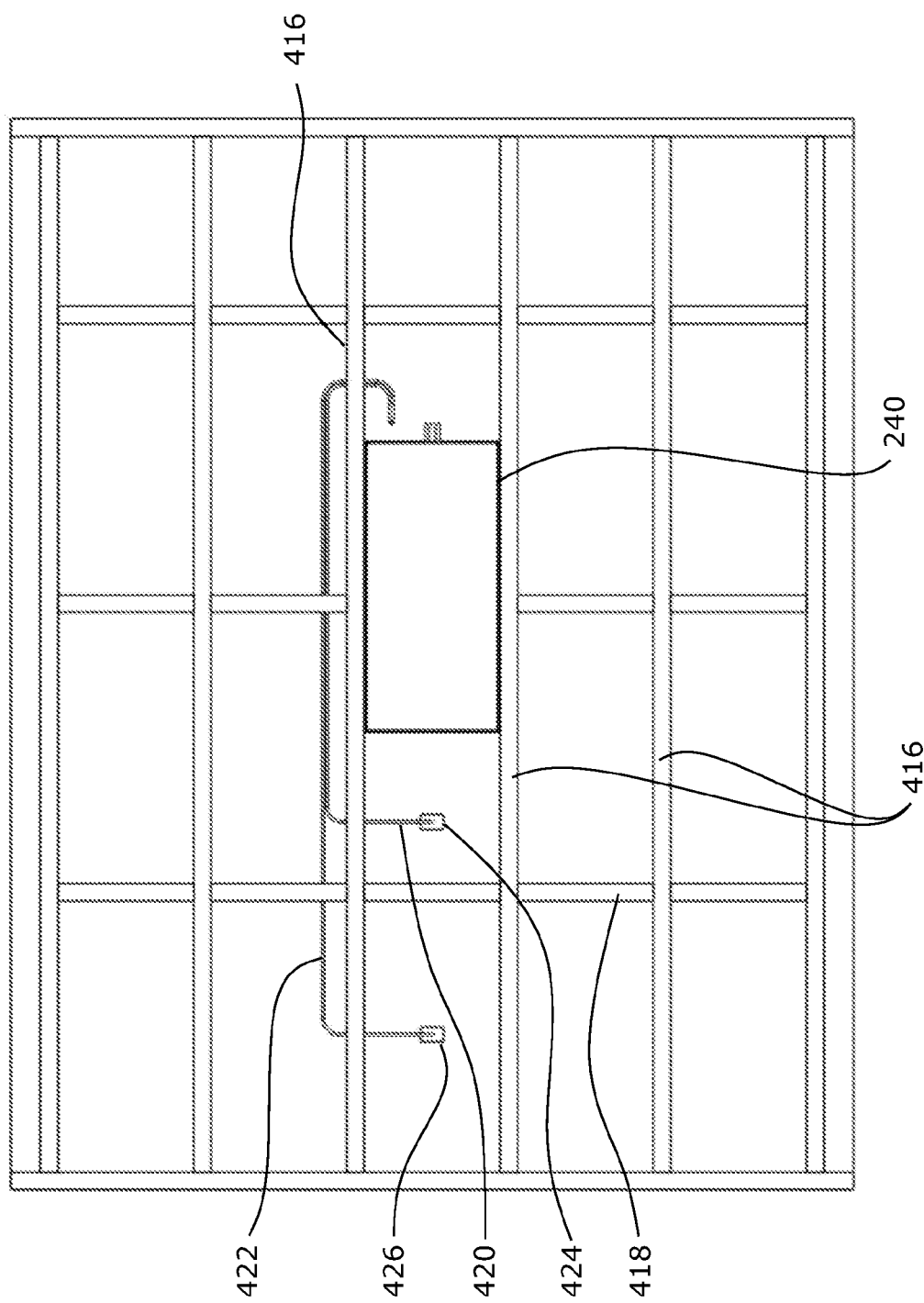
FIG. 25 shows a front view of a switchboard according to an embodiment partially installed.
Figure 26:
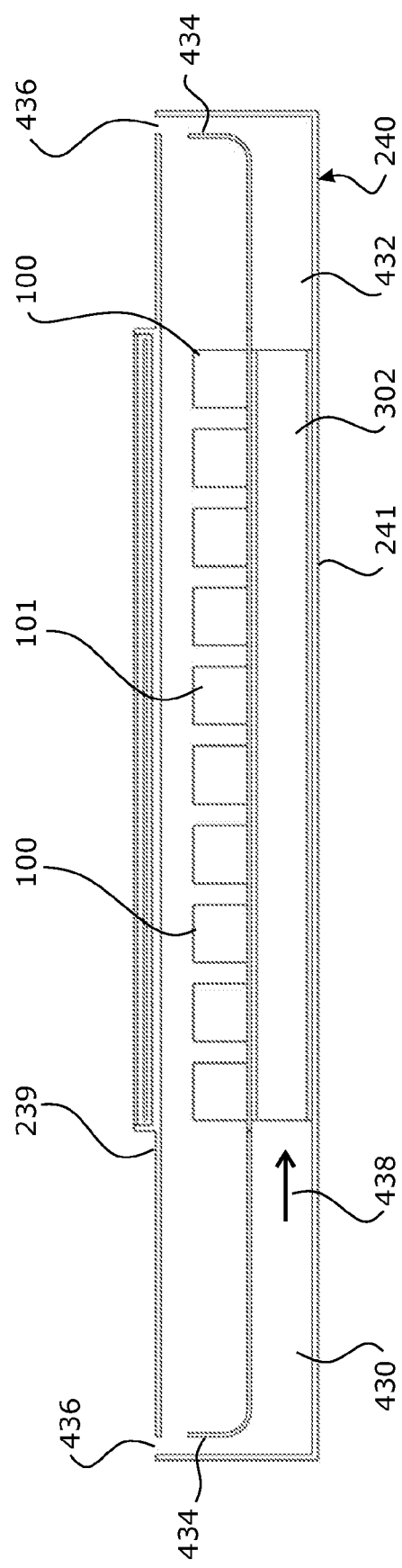
FIG. 26 shows a view in transverse cross-section of a switchboard according to an embodiment.

Examples of mounting set-ups are shown in FIGS. 25 and 26. In FIG. 25, the housing is mounted vertically between two wall studs 416. The apparatus could also be mounted horizontally if the wall studs were adjusted. Cables 420 and 422 have plugs 424 and 426 allowing connection to external components such as storage batteries or other interfaces.

FIG. 26 shows a diagrammatic cross section of an example of a switchboard according to an embodiment in which heatsinks 302 are shown located between modules 100 and a rear surface or wall 241 of housing 240. A front closure 239 for the housing is also shown. The heatsinks 302 may be provided as a group or row, and in some embodiments may be connected together or provided as a unitary item to which a plurality of modules are connected. In some embodiments heatsinks 302 are physically connected to each other or to the housing, and in other embodiments the connection may be a thermal connection only. Furthermore, the heatsinks 302 may in some embodiments be thermally coupled to wall 241 of the housing. In other embodiments the heatsinks 302 may be thermally coupled to other parts of housing 240. By thermally bonding heatsinks 302 to the housing 240, heat from solid-state switches 360 can be readily transferred to objects having a greater thermal mass and/or two objects that allow heat to be dissipated readily.

In some embodiments housing 240 can be thermally coupled to other appropriate heatsinks. In the example shown in FIG. 26, thermal management of the assembly can be achieved by providing regions in housing 240 in which you can circulate to provide thermal management. Therefore, referring to FIG. 26, regions 430 and 432 may be provided in the housing to allow air to circulate past the heatsinks or heatsink 302. Also, gaps 434 may be provided to allow air from other parts of the housing to circulate to the rear of the housing past the heatsinks 302. Moreover, ventilation gaps 436 may be provided in the housing 240, located between the housing sidewalls and the closure 232. Gaps 436 allow air to circulate from locations exteriorly of the housing into the housing and out again to thereby provide thermal management. A possible airflow path past heatsinks 302 as shown by Arrow 438. It will be apparent that gaps 434 and 436 may be provided at other locations in the assembly. Furthermore, in some embodiments active yes airflow circulation may be employed using any movement device such as a fan for example placed in housing 240.

4. Other Example Embodiments

A pre-configured or pre-wired switchboard or residential power distribution and management system is described with reference to the previous embodiments of the invention, the pre-wired switchboard comprising: a sub-circuit connection system 10 as mentioned above in section 3 of the description; a grid connection module configured to electrically connect the system to an external grid power supply; a mains isolation module electrically connected to the grid connection module through a pre-configured or pre-wired electrical connection and configured to provide electrical isolation of the external grid power supply; one or more auxiliary power modules each electrically connected to the mains isolation module through a pre-configured or pre-wired electrical connection, and each configured to electrically connect the system to an external or auxiliary power supply or source; one or more sub-circuit protection modules electrically connected to the mains isolation module and the one or more auxiliary power modules through a pre-configured or pre-wired electrical connection; and one or more sub-circuit protection modules electrically connected to the mains isolation module and the one or more auxiliary power modules through a pre-configured electrical connection, each sub-circuit protection module electrically connected to a sub-circuit connection module of the sub-circuit connection system through a pre-configured electrical connection.

The pre-configured or pre-wired switchboard or residential power distribution and management system as mentioned above may comprise or have any one or more features mentioned in respect of the pre-configured or pre-wired switchboard or residential power distribution and management system 200 discussed previously. For example, the grid connection module, mains isolation module, one or more auxiliary power modules, one or more sub-circuit connection modules, and/or one or more sub-circuit protections modules as mentioned above may each comprise or have any one or more features mentioned in respect of the circuit protection system of the circuit protection modules of the invention as previously discussed.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention.

The invention claimed is:

1. A pre-assembled switchboard for connection to a plurality of sub-circuit cables, each sub-circuit cable comprising a plurality of insulated conductors, the switchboard comprising:
   a housing having a plurality of bus bars and a cable entrance for the plurality of sub-circuit cables;
   one or more sub-circuit termination blocks having a plurality of conductor coupling elements configured for connection to the plurality of insulated conductors of the plurality of sub-circuit cables, wherein the plurality of conductor coupling elements are grouped by sub-circuit, and wherein the insulated conductors for each sub-circuit cable are configured to be terminated adjacent to each other; and
   a plurality of circuit protection devices electrically connected between the bus bars and the one or more sub-circuit termination blocks;
   wherein the housing comprises a cable channel extending between the cable entrance and the one or more sub-circuit termination blocks, and wherein the cable channel comprises a cable tray.

2. The pre-assembled switchboard of claim 1, wherein the plurality of circuit protection devices each comprise a module that is selectively removable from the housing.

3. The pre-assembled switchboard of claim 1, wherein the one or more sub-circuit termination blocks comprises a plurality of sub-circuit termination blocks.

4. The pre-assembled switchboard of claim 3, wherein the plurality of the sub-circuit termination blocks comprises a sub-circuit termination block for each circuit protection device, and wherein the sub-circuit termination block for each circuit protection device comprises a group of conductor coupling elements for terminating the conductors of the corresponding sub-circuit cable.

5. The pre-assembled switchboard of claim 1, wherein each circuit protection device comprises a corresponding sub-circuit termination block.

6. The pre-assembled switchboard of claim 1, wherein the plurality of conductor coupling elements are arranged in one or more rows.

7. The pre-assembled switchboard of claim 1, wherein a row of conductor coupling elements is provided at a side of the housing.

8. The pre-assembled switchboard of claim 1, wherein the cable channel extends adjacent to a plurality of groupings of conductor coupling elements.

9. The pre-assembled switchboard of claim 1, wherein each circuit protection device comprises a wall, and the wall comprises part of the cable channel.

10. The pre-assembled switchboard of claim 9, wherein the plurality of circuit protection devices extend adjacent to one another to form the cable channel.

11. The pre-assembled switchboard of claim 1, wherein a longitudinal axis of each circuit protection device is oriented substantially transversely relative to a longitudinal axis of the cable channel.

12. The pre-assembled switchboard of claim 1, wherein each circuit protection device comprises a button or switch operable by a user, and wherein the cable channel is provided between the button or switch and the corresponding grouping of conductor coupling elements.

13. The pre-assembled switchboard of claim 1, wherein the cable channel is provided between at least one of the bus bars and the one or more sub-circuit termination blocks.

14. The pre-assembled switchboard of claim 1, wherein each circuit protection device comprises:
   a first termination for connection to one of the plurality of bus bars and a second termination for connection to a corresponding one of the one or more sub-circuit termination blocks; and
   a disconnect means configured to electrically isolate the first termination from the second termination upon receipt of a disconnect signal.

15. The pre-assembled switchboard of claim 14, wherein each circuit protection device further comprises an outer wall defining part of the cable channel, and the first and second terminations are provided on either side of the cable channel.

16. The pre-assembled switchboard of claim 14, further comprising a user operated button or switch operable to actuate the disconnect means and wherein the cable channel is provided between the second termination and the button or switch.

17. The pre-assembled switchboard of claim 14, wherein each circuit protection device further comprises a load monitoring device electrically connected to the one or more sub-circuit termination blocks associated with the circuit protection device, and operable to determine one or more characteristics or attributes of one or more electrical circuits connected to the load monitoring device.

18. The pre-assembled switchboard of claim 17, further comprising a controller configured to:
receive the one or more characteristics or attributes of one or more electrical circuits determined by the load monitoring device of one or more of the circuit protection devices;
determine if one or more fault conditions are present in the one or more electrical circuits based on analysis of the one or more characteristics or attributes of the one or more electrical circuits; and
send a control signal to actuate the disconnect means based on determination of the one or more fault conditions to electrically isolate the first termination from the second termination.

19. The pre-assembled switchboard of claim 18, wherein the controller is configured or configurable to adjust one or more thresholds and/or one or more criteria associated with the one or more fault conditions.

20. The pre-assembled switchboard of claim 1, wherein the grouping of conductor coupling elements for each sub-circuit cable comprises a phase coupling element and a neutral coupling element.

21. The pre-assembled switchboard of claim 1, wherein the grouping of conductor coupling elements for each sub-circuit cable comprises a phase coupling element, a neutral coupling element, and an earth coupling element.

22. The pre-assembled switchboard of claim 1, wherein a row of conductor coupling elements is provided at each of two opposing sides of the housing.

23. The pre-assembled switchboard of claim 1 wherein a plurality of groupings of conductor coupling elements are arranged in a row along a side of the housing or within the housing.

24. A circuit protection device comprising:
a first termination for connection to a bus bar and a second termination for connection to a sub-circuit;
a disconnect means configured to electrically isolate the first termination from the second termination upon receipt of a disconnect signal; and
an outer wall defining part of a cable receiving channel;
wherein the first and second terminations are provided on either side of the cable receiving channel.

25. The circuit protection device of claim 24, further comprising a user operated button or switch operable to actuate the disconnect means and wherein the cable receiving channel is provided between the second termination and the button or switch.

26. The circuit protection device of claim 24, wherein the cable receiving channel comprises a cable tray.

27. A pre-assembled switchboard for connection to a plurality of sub-circuit cables, each sub-circuit cable comprising a plurality of insulated conductors, the switchboard comprising:
a housing having a plurality of bus bars and a cable entrance for the plurality of sub-circuit cables;
one or more sub-circuit termination blocks having a plurality of conductor coupling elements configured for connection to the plurality of insulated conductors of the plurality of sub-circuit cables, wherein the plurality of conductor coupling elements are grouped by sub-circuit, and wherein the insulated conductors for each sub-circuit cable are configured to be terminated adjacent to each other; and
a plurality of circuit protection devices electrically connected between the bus bars and the one or more sub-circuit termination blocks;
wherein the housing comprises a cable channel extending between the cable entrance and the one or more sub-circuit termination blocks;
wherein each circuit protection device comprises a wall, and the wall comprises part of the cable channel; and
wherein the plurality of circuit protection devices extend adjacent to one another to form the cable channel.

28. The pre-assembled switchboard of claim 27, wherein a plurality of groupings of conductor coupling elements are arranged in a row along a side of the housing or within the housing.

29. The pre-assembled switchboard of claim 27, wherein the cable channel extends adjacent to a plurality of groupings of conductor coupling elements.

30. The pre-assembled switchboard of claim 27, wherein each circuit protection device comprises a button or switch operable by a user, and wherein the cable channel is provided between the button or switch and the corresponding grouping of conductor coupling elements.

31. The pre-assembled switchboard of claim 27, wherein the cable channel is provided between at least one of the bus bars and the one or more sub-circuit termination blocks.

32. The pre-assembled switchboard of claim 27, wherein each circuit protection device comprises:
a first termination for connection to one of the plurality of bus bars and a second termination for connection to a corresponding one of the one or more sub-circuit termination blocks; and
a disconnect means configured to electrically isolate the first termination from the second termination upon receipt of a disconnect signal.

33. The pre-assembled switchboard of claim 32, wherein the first and second terminations are provided on either side of the cable channel.

34. The pre-assembled switchboard of claim 32, wherein each circuit protection device further comprises a load monitoring device electrically connected to the one or more sub-circuit termination blocks associated with the circuit protection device, and operable to determine one or more characteristics or attributes of one or more electrical circuits connected to the load monitoring device, and the pre-assembled switchboard further comprises a controller configured to:
receive the one or more characteristics or attributes of one or more electrical circuits determined by the load monitoring device of one or more of the circuit protection devices;
determine if one or more fault conditions are present in the one or more electrical circuits based on analysis of the one or more characteristics or attributes of the one or more electrical circuits; and
send a control signal to actuate the disconnect means based on determination of the one or more fault conditions to electrically isolate the first termination from the second termination.

35. The pre-assembled switchboard of claim 34, wherein the controller is configured or configurable to adjust one or more thresholds and/or one or more criteria associated with the one or more fault conditions.

36. The pre-assembled switchboard of claim 27, wherein the grouping of conductor coupling elements for each sub-circuit cable comprises a phase coupling element, a neutral coupling element, and an earth coupling element.

37. A pre-assembled switchboard for connection to a plurality of sub-circuit cables, each sub-circuit cable comprising a plurality of insulated conductors, the switchboard comprising:
- a housing having a plurality of bus bars and a cable entrance for the plurality of sub-circuit cables;
- one or more sub-circuit termination blocks having a plurality of conductor coupling elements configured for connection to the plurality of insulated conductors of the plurality of sub-circuit cables, wherein the plurality of conductor coupling elements are grouped by sub-circuit, and wherein the insulated conductors for each sub-circuit cable are configured to be terminated adjacent to each other; and
- a plurality of circuit protection devices electrically connected between the bus bars and the one or more sub-circuit termination blocks;
- wherein the housing comprises a cable channel extending between the cable entrance and the one or more sub-circuit termination blocks; and
- wherein each circuit protection device comprises a button or switch operable by a user, and wherein the cable channel is provided between the button or switch and the corresponding grouping of conductor coupling elements.

38. The pre-assembled switchboard of claim 37, wherein a plurality of groupings of conductor coupling elements are arranged in a row along a side of the housing or within the housing.

39. The pre-assembled switchboard of claim 37, wherein the cable channel extends adjacent to a plurality of groupings of conductor coupling elements.

40. The pre-assembled switchboard of claim 37, wherein the plurality of circuit protection devices extend adjacent to one another to form the cable channel.

41. The pre-assembled switchboard of claim 37, wherein the cable channel is provided between at least one of the bus bars and the one or more sub-circuit termination blocks.

42. The pre-assembled switchboard of claim 37, wherein each circuit protection device comprises:
- a first termination for connection to one of the plurality of bus bars and a second termination for connection to a corresponding one of the one or more sub-circuit termination blocks; and
- a disconnect means configured to electrically isolate the first termination from the second termination upon receipt of a disconnect signal.

43. The pre-assembled switchboard of claim 42, wherein the first and second terminations are provided on either side of the cable channel.

44. The pre-assembled switchboard of claim 42, wherein each circuit protection device further comprises a load monitoring device electrically connected to the one or more sub-circuit termination blocks associated with the circuit protection device, and operable to determine one or more characteristics or attributes of one or more electrical circuits connected to the load monitoring device, and the pre-assembled switchboard further comprises a controller configured to:
- receive the one or more characteristics or attributes of one or more electrical circuits determined by the load monitoring device of one or more of the circuit protection devices;
- determine if one or more fault conditions are present in the one or more electrical circuits based on analysis of the one or more characteristics or attributes of the one or more electrical circuits; and
- send a control signal to actuate the disconnect means based on determination of the one or more fault conditions to electrically isolate the first termination from the second termination.

45. The pre-assembled switchboard of claim 44, wherein the controller is configured or configurable to adjust one or more thresholds and/or one or more criteria associated with the one or more fault conditions.

46. The pre-assembled switchboard of claim 37, wherein the grouping of conductor coupling elements for each sub-circuit cable comprises a phase coupling element, a neutral coupling element, and an earth coupling element.

47. A pre-assembled switchboard for connection to a plurality of sub-circuit cables, each sub-circuit cable comprising a plurality of insulated conductors, the switchboard comprising:
- a housing having a plurality of bus bars and a cable entrance for the plurality of sub-circuit cables;
- one or more sub-circuit termination blocks having a plurality of conductor coupling elements configured for connection to the plurality of insulated conductors of the plurality of sub-circuit cables, wherein the plurality of conductor coupling elements are grouped by sub-circuit, and wherein the insulated conductors for each sub-circuit cable are configured to be terminated adjacent to each other; and
- a plurality of circuit protection devices electrically connected between the bus bars and the one or more sub-circuit termination blocks;
- wherein the housing comprises a cable channel extending between the cable entrance and the one or more sub-circuit termination blocks; and
- wherein the cable channel is provided between at least one of the bus bars and the one or more sub-circuit termination blocks.

48. The pre-assembled switchboard of claim 47, wherein a plurality of groupings of conductor coupling elements are arranged in a row along a side of the housing or within the housing.

49. The pre-assembled switchboard of claim 47, wherein the cable channel extends adjacent to a plurality of groupings of conductor coupling elements.

50. The pre-assembled switchboard of claim 47, wherein the plurality of circuit protection devices extend adjacent to one another to form the cable channel.

51. The pre-assembled switchboard of claim 47, wherein each circuit protection device comprises:
- a first termination for connection to one of the plurality of bus bars and a second termination for connection to a corresponding one of the one or more sub-circuit termination blocks; and
- a disconnect means configured to electrically isolate the first termination from the second termination upon receipt of a disconnect signal.

52. The pre-assembled switchboard of claim 51, wherein the first and second terminations are provided on either side of the cable channel.

53. The pre-assembled switchboard of claim 51, wherein each circuit protection device further comprises a load monitoring device electrically connected to the one or more sub-circuit termination blocks associated with the circuit protection device, and operable to determine one or more characteristics or attributes of one or more electrical circuits connected to the load monitoring device, and the pre-assembled switchboard further comprises a controller configured to:
- receive the one or more characteristics or attributes of one or more electrical circuits determined by the load monitoring device of one or more of the circuit protection devices;
- determine if one or more fault conditions are present in the one or more electrical circuits based on analysis of the one or more characteristics or attributes of the one or more electrical circuits; and
- send a control signal to actuate the disconnect means based on determination of the one or more fault conditions to electrically isolate the first termination from the second termination.

54. The pre-assembled switchboard of claim 53, wherein the controller is configured or configurable to adjust one or more thresholds and/or one or more criteria associated with the one or more fault conditions.

55. The pre-assembled switchboard of claim 47, wherein the grouping of conductor coupling elements for each sub-circuit cable comprises a phase coupling element, a neutral coupling element, and an earth coupling element.

* * * * *